US011546529B2

(12) United States Patent
Yoshimura et al.

(10) Patent No.: US 11,546,529 B2
(45) Date of Patent: Jan. 3, 2023

(54) IMAGE-CAPTURING DEVICE AND IMAGE TRANSMISSION RECORDING SYSTEM

(71) Applicant: NIKON CORPORATION, Tokyo (JP)

(72) Inventors: Takahiro Yoshimura, Ichikawa (JP); Hiroaki Shimizu, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 17/045,567

(22) PCT Filed: Apr. 5, 2019

(86) PCT No.: PCT/JP2019/015177
§ 371 (c)(1),
(2) Date: Dec. 23, 2020

(87) PCT Pub. No.: WO2019/194307
PCT Pub. Date: Oct. 10, 2019

(65) Prior Publication Data
US 2021/0120192 A1    Apr. 22, 2021

(30) Foreign Application Priority Data

Apr. 6, 2018  (JP) .............................. JP2018-074272

(51) Int. Cl.
*H04N 5/268*    (2006.01)
*H04N 5/77*    (2006.01)

(52) U.S. Cl.
CPC ............... *H04N 5/268* (2013.01); *H04N 5/77* (2013.01)

(58) Field of Classification Search
CPC .......... H04N 5/268; H04N 5/77; H04N 5/232; H04N 21/436
See application file for complete search history.

(56) References Cited

U.S. PATENT DOCUMENTS

2015/0016538 A1    1/2015  Yamashita

FOREIGN PATENT DOCUMENTS

| JP | 2013-115666 A | | 6/2013 |
| JP | 2013115666 A | * | 6/2013 |
| JP | 2015-19182 A | | 1/2015 |

OTHER PUBLICATIONS

Jun. 4, 2019 International Search Report issued in International Patent Application No. PCT/JP2019/015177.
"EOS C200 EOS C200B Digital Cinema Camera Instruction Manual". Canon Inc., 2017, pp. 139-140.
Jan. 6, 2022 Office Action issued in Chinese Patent Application No. 201980037152.X.
Nov. 15, 2022 Office Action issued in Japanese Patent Application No. 2020-512336.

* cited by examiner

*Primary Examiner* — Nelson D. Hernández Hernández
(74) *Attorney, Agent, or Firm* — Oliff PLC

(57) ABSTRACT

An image-capturing device includes: an image sensor that captures an image of a subject to output an image-capturing signal; a development processing unit that generates development data based on the image-capturing signal; and an output control unit that outputs the development data to an external device in a predetermined transmission format via a connecting member that connects the image-capturing device to the external device. The output control unit outputs the image-capturing signal to the external device via the connecting member in the predetermined transmission format.

6 Claims, 22 Drawing Sheets

(a)

(b)

(c)

(d)

(e)

(f)

(a)

(b)

(c)

(a)

(b)

(c)

(a)

(b)

(c)

(a)

(b)

(c)

(a)

(b)

(c)

(a)

(b)

(c)

(a)

(b)

(c)

(a)

(b)

(c)

(a)

(b)

(c)

(a)

(b)

(c)

(a)

(b)

(c)

(a)

(b)

(c)

(a)

(b)

(c)

(a)

(b)

(c)

(a)

(b)

(c)

(a)

(b)

(c)

(a)

(b)

(c)

IMAGE-CAPTURING DEVICE AND IMAGE TRANSMISSION RECORDING SYSTEM

TECHNICAL FIELD

The present invention relates to an image-capturing device and an image transmission recording system.

BACKGROUND ART

With an image-capturing device described in Non-Patent Literature 1, a moving image developed by the image-capturing device can be transmitted to an external recording device that is connected to the image-capturing device via a SDI (Serial Digital Interface) cable or a HDMI (High Definition Multimedia Interface) (registered trademark) cable. The image transmission recording system according to the prior art has a problem that only the developed image is to be transmitted.

CITATION LIST

Non-Patent Literature

NPTL1: EOS C200 EOS C200B Digital Cinema Camera Instruction Manual, Canon Inc., 2017, p. 139-p. 140

SUMMARY OF INVENTION

Technical Problem

According to the first aspect of the present invention, an image-capturing device comprises: an image sensor that captures an image of a subject to output an image-capturing signal; a development processing unit that generates development data based on the image-capturing signal; and an output control unit that outputs the development data to an external device in a predetermined transmission format via a connecting member that connects the image-capturing device to the external device. The output control unit outputs the image-capturing signal to the external device via the connecting member in the predetermined transmission format.

According to the second aspect of the present invention, an image transmission recording system comprises: the image-capturing device according to the first aspect; and an image recording device. The image recording device is the external device connected to the image-capturing device via the connection member and records the development data and the image-capturing signal output from the image-capturing device.

DESCRIPTION OF EMBODIMENTS

Figure 1:
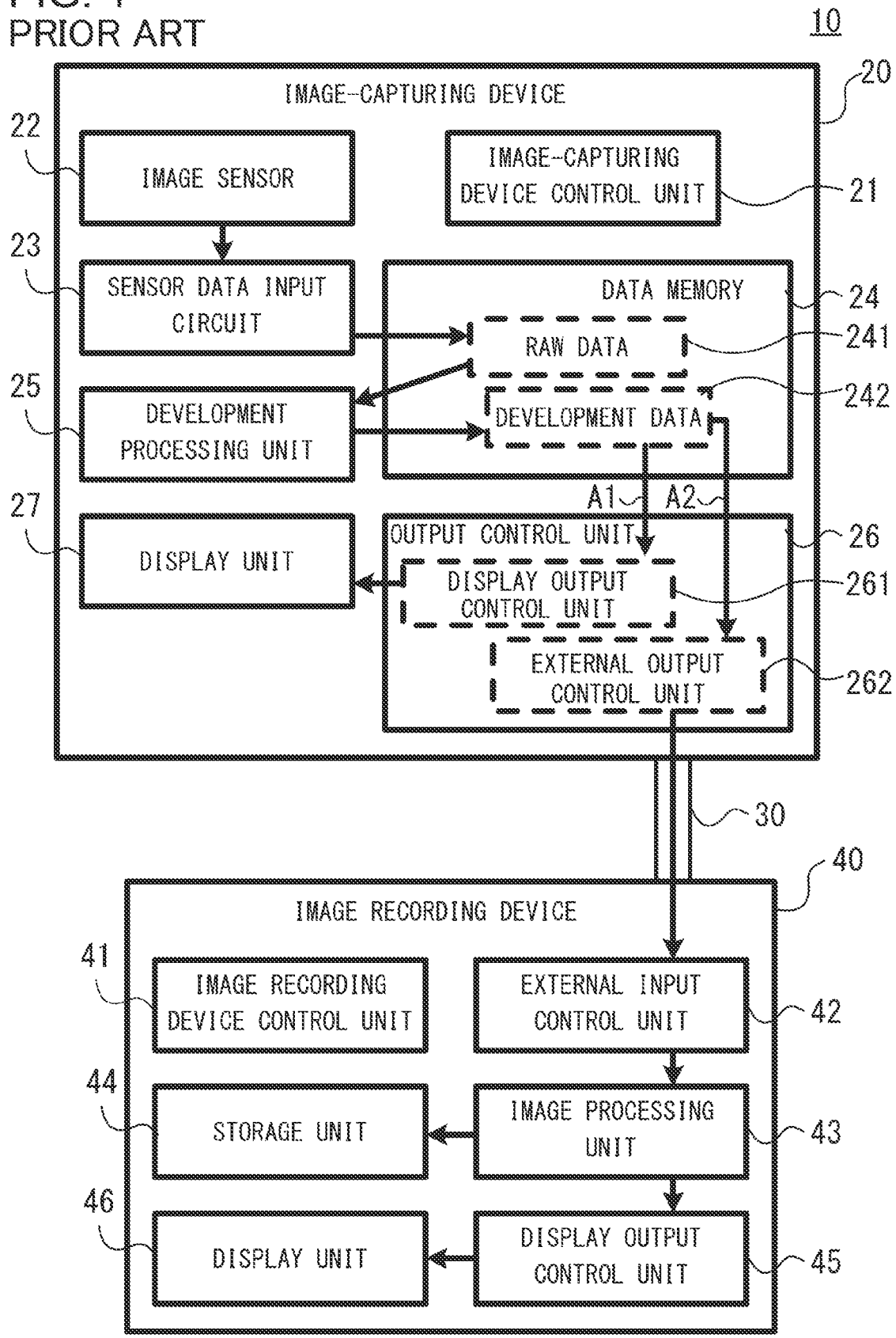
FIG. 1 is an example of a block diagram of an image transmission recording system according to the prior art.

An image transmission recording system according to the prior art will be described below with reference to FIGS. 1 to 4. FIG. 1 is an example of a block diagram of the image transmission recording system 10 according to the prior art. The conventional image transmission recording system 10 includes an image-capturing device 20, an image recording device 40 which is an external device of the image-capturing device 20, and a HDMI cable 30 which is a connecting member for connecting the image-capturing device 20 to the image recording device 40.

The image-capturing device 20 includes an image-capturing device control unit 21, an image sensor 22, a sensor data input circuit 23, a data memory 24, a development processing unit 25, an output control unit 26, and a display unit 27. The image-capturing device control unit 21 includes a microprocessor and a memory, for example, and computer program is run to control the entire image-capturing device 20, that is, the image-capturing device control unit 21, the image sensor 22, the sensor data input circuit 23, the data memory 24, the development processing unit 25, the output control unit 26, and the display unit 27.

The image sensor 22 has a plurality of photoelectric conversion elements and captures an image of a subject via an optical system (not shown) to output an image-capturing signal. The sensor data input circuit 23 performs wave detection processing on the image-capturing signal output from the image sensor 22 and performs synchronization processing between the image-capturing signal and an audio signal and calculation processing of white balance data and gamma data by unit of frame, for example. RAW data 241 of the image-capturing signal, the audio signal data, the white balance data, and the gamma data are stored in a register region of the sensor data input circuit unit 23 or the data memory 24 by unit of frame. Here, the RAW data 241 is data based on the image-capturing signal which is output from the image sensor 22. Color information that can be recognized from data of one pixel in the RAW data 241 is color information for one pixel with a color filter (not shown) provided in the image sensor 22. The color filter transmits only light having a predetermined color, for example, only a red component R. The image sensor 22 is provided with color filters, each transmitting one of a red component R, a green component and a blue component B. For example, the color filters that transmit the red component R, the green component and the blue component B are arranged in a Bayer array. The RAW data 241 is data based on the image-capturing signal before being debayered.

The development processing unit 25 generates development data 242 such as YUV data and/or RGB data based on the RAW data 241 stored in the data memory 24. The RGB data is generated by representing the color information of the pixel with a combination of the red component R, the green component and the blue component B, which are the three primary colors of light. The YUV data is generated by representing the color information of the pixel with a combination of a luminance component Y, a color difference (chrominance) component U between the luminance component and a blue component, and the color difference (chrominance) component V between the luminance component and a red component. Additionally, display output adjustment processing is performed based on the white balance data and the gamma data. In the following, the YUV data will be described as development data, but the RGB data can be treated in the same way. The development data 242 generated by the development processing unit 25 is stored in the data memory 24. The development data 242 is data that can be displayed on the display unit 27.

The output control unit 26 includes a display output control unit 261 and an external output control unit 262, and reads out the development data 242 stored in the data memory 24. Under the control of the image-capturing device control unit 21, the display output control unit 261 causes the display unit 27 to display images by unit of frame by subjecting the development data 242 to synchronization processing with the audio signal by unit of frame. At that time, the display output control unit 261 causes a speaker or earphone (not shown) to output audio based on the audio signal associated with the frame. Note that the output control unit 26 may perform the display output adjustment processing A1 based on the white balance data and the gamma data.

Under the control of the image-capturing device control unit 21, the external output control unit 262 performs read-out processing A2 in which the development data 242 is read out by associating the development data 242 with an audio signal by unit of frame. The external output control unit 262 can transmit the development data 242 and the audio signal to the image recording device 40 via the HDMI cable 30 by arranging the development data 242 and the audio signal in predetermined fields on a HDMI transmission format.

The image recording device 40 includes an image recording device control unit 41, an external input control unit 42, an image processing unit 43, a storage device 44, a display output control unit 45, and a display unit 46. The image recording device control unit 41 includes a microprocessor and a memory, for example, and computer program is run to control the entire image recording device 40, that is, the image recording device control unit 41, the external input control unit 42, the image processing unit 43, the storage device 44, the display output control unit 45, and the display unit 46.

The external input control unit 42 receives the development data 242 and the audio signal from the image-capturing device 20 via the HDMI cable 30, that is, acquires the development data 242 and the audio signal arranged in predetermined fields on the HDMI transmission format and then transfers them to the image processing unit 43. The image processing unit 43 stores the development data 242 and the audio signal in the storage device 44 by unit of frame and delivers them to the display output control unit 45.

Under the control of the image recording device control unit 41, the display output control unit 45 causes the display unit 46 to display images thereon by unit of frame by subjecting the development data 242 received from the image processing unit 43 to synchronization processing with an audio signal and display output adjustment processing based on the white balance data and the gamma data, by unit of frame. At that time, the display output control unit 261 causes a speaker or earphone (not shown) to output audio based on the audio signal associated with the frame.

Figure 2:
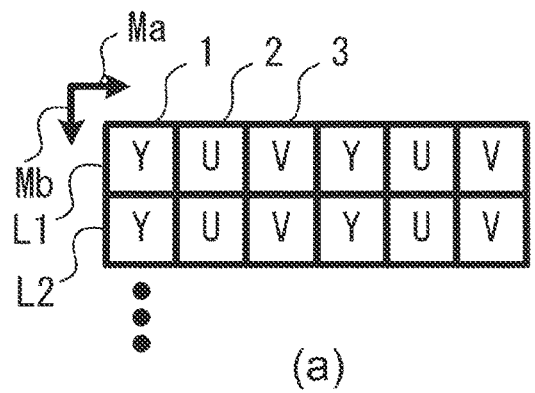
FIG. 2 is a view illustrating development data stored in a data memory in an image-capturing device according to the prior art, and images displayed on a display unit based on the development data.
Figure 2:
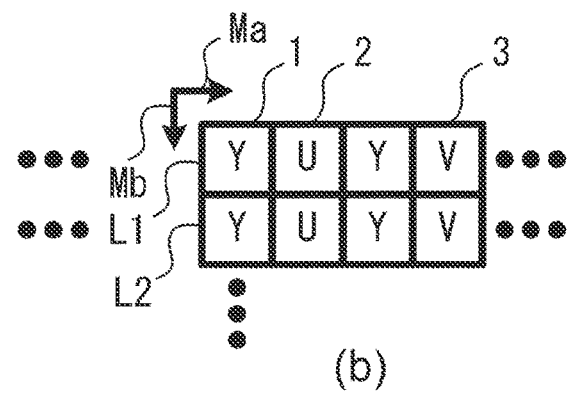
Figure 2:
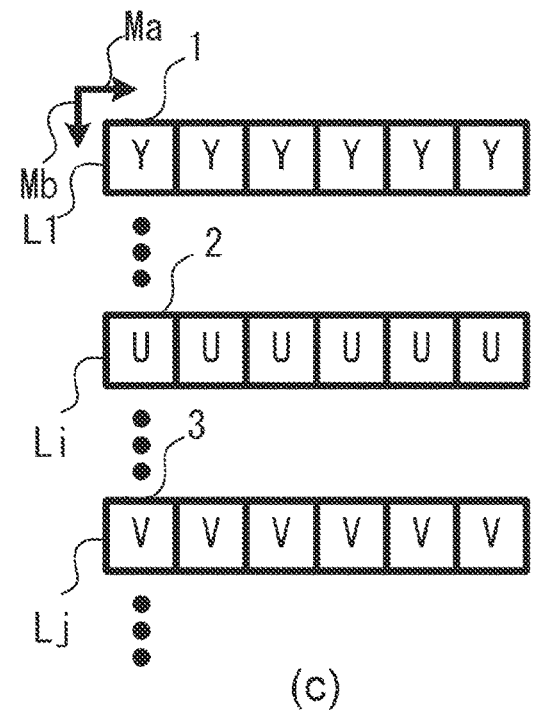
Figure 2:
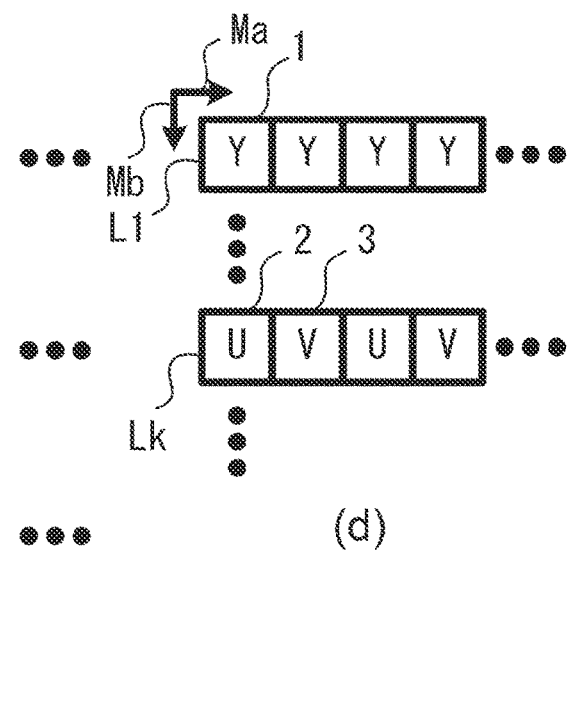
Figure 2:
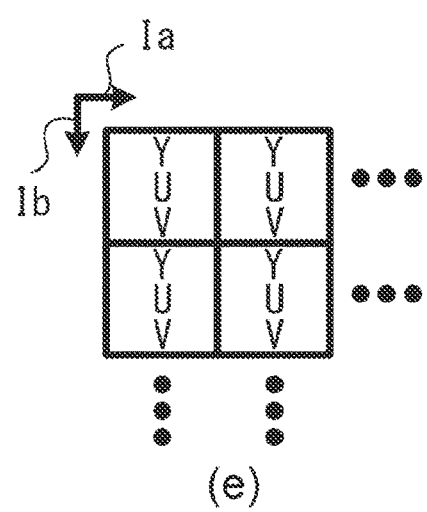
Figure 2:
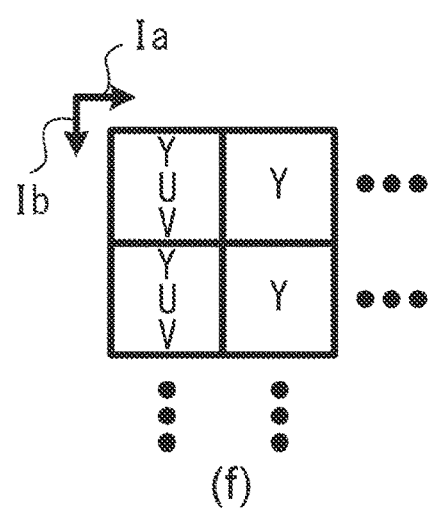

FIG. 2 is a view illustrating the development data 242 stored in the data memory 24 of the image-capturing device 20 according to the prior art, and images displayed on the display unit 27 based on the development data 242. FIG. 2(*a*) shows an example of an arrangement of Y pixel data 1, U pixel data 2, and V pixel data 3 in the data memory 24 based on a pixel interleaving format in a case where YUV data is configured in a YUV444 format as the development data 242, for example. The Y pixel data 1, the U pixel data 2, and the V pixel data 3 are repeatedly arranged in sequence in a horizontal direction Ma of the data memory 24, and YUV pixel data strings thus formed are juxtaposed in a vertical direction Mb of the data memory 24. FIG. 2(*a*) illustrates a first row L1 and the next row L2, among others.

FIG. 2(*b*) shows an example of an arrangement of Y pixel data 1, U pixel data 2, and V pixel data 3 in the data memory 24 based on a pixel interleaving format in a case where YUV data is configured in a YUV422 format as the development data 242, for example. The Y pixel data 1, the U pixel data 2, the Y pixel data 1, and the V pixel data 3 are arranged in sequence in a horizontal direction Ma of the data memory 24, and the arrangement of these four pixels are repeated. YUV pixel data strings thus formed are juxtaposed in a vertical direction Mb of the data memory 24. FIG. 2(b) illustrates a first row L1 and the next row L2, among others.

FIG. 2(c) shows an example of an arrangement of Y pixel data 1, U pixel data 2, and V pixel data 3 in the data memory 24 based on a planar format in a case where YUV data is configured in the YUV444 format or YUV422 format as the development data 242, for example. Only the Y pixel data 1 is repeatedly arranged in the horizontal direction Ma in each row from a first row L1 to a row Li−1 of the data memory 24; only the U pixel data 2 is repeatedly arranged in the horizontal direction Ma in each row from a row Li to a row Lj−1; and only the V pixel data 3 is repeatedly arranged in the horizontal direction Ma in each row from a row Lj. These rows are juxtaposed in the vertical direction Mb of the data memory 24. FIG. 2(c) illustrates, among others, the first row L1 of the rows in which only the Y pixel data 1 is repeatedly arranged, the first row Li of the rows in which only the U pixel data 2 is repeatedly arranged, and the first row Lj of the rows in which only the V pixel data 3 is repeatedly arranged.

FIG. 2(d) shows an example of an arrangement of Y pixel data 1, U pixel data 2, and V pixel data 3 in the data memory 24 based on a semi-planar format in a case where YUV data is configured in the YUV422 format as the development data 242, for example. Only the Y pixel data 1 is repeatedly arranged in the horizontal direction Ma in each row from a first row L1 to a row Lk−1 of the data memory 24; the U pixel data 2 and the V pixel data 3 are repeatedly arranged in sequence in the horizontal direction Ma in each row from a row Lk. These rows are juxtaposed in the vertical direction Mb of the data memory 24. FIG. 2(d) illustrates, among others, the first row L1 of the rows in which only the Y pixel data 1 is repeatedly arranged, and the first row Lk of the rows in which the U pixel data 2 and the V pixel data 3 are repeatedly arranged in sequence.

FIG. 2(e) is a view illustrating an image developed in the YUV444 format, which is input to the display unit 27 of the image-capturing device 20. This image is composed of a plurality of pixels arranged in a horizontal direction Ia and a vertical direction Ib, and data of each pixel includes Y pixel data 1, U pixel data 2, and V pixel data 3 for one pixel.

FIG. 2(f) is a view illustrating an image developed in the YUV422 format, which is input to the display unit 27 of the image-capturing device 20. This image is composed of a plurality of pixels arranged in a horizontal direction Ia and a vertical direction Ib, and pixel data in each row includes two types of pixel data repeatedly arranged in sequence: pixel data including the Y pixel data 1, the U pixel data 2, and the V pixel data 3 for one pixel; and pixel data including only the Y pixel data 1.

Figure 3:
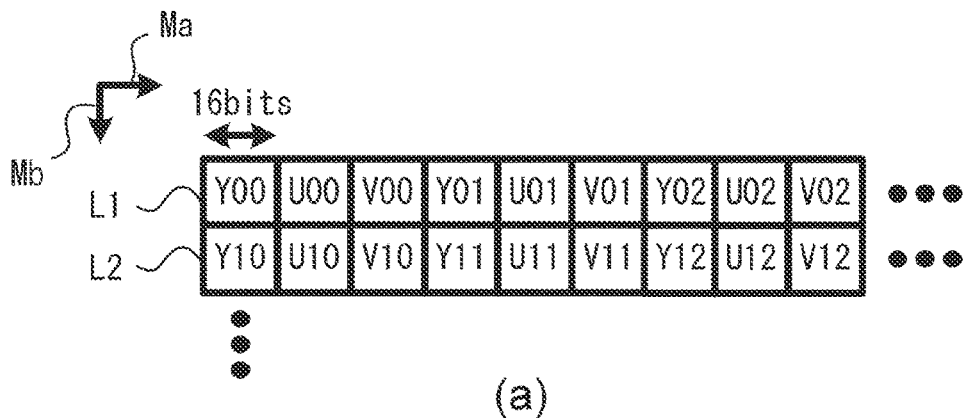
FIG. 3 is a view for illustrating an example of a transmission format in a case where the development data is output from the image-capturing device according to the prior art via the HDMI cable.
Figure 3:
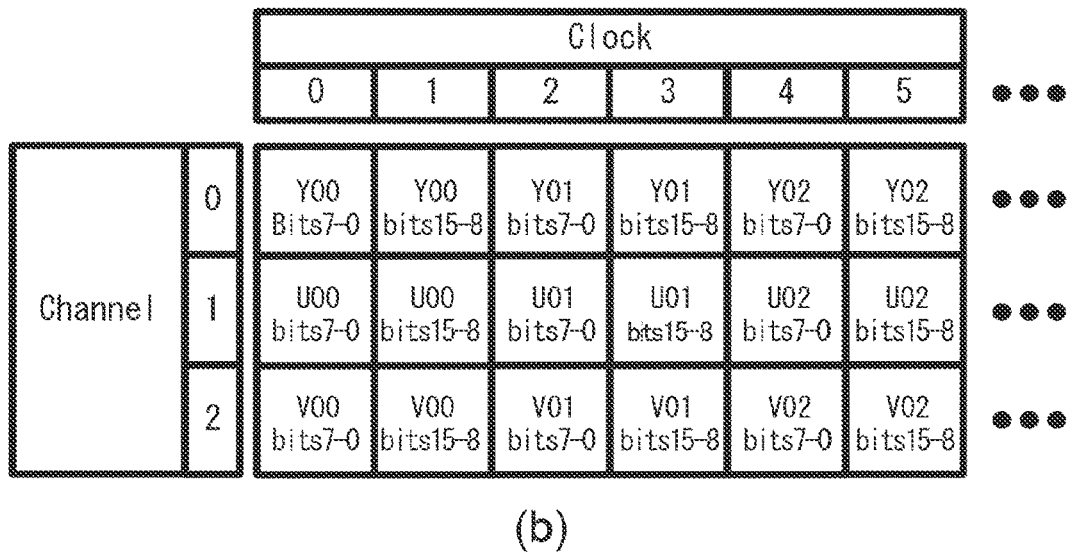
Figure 3:
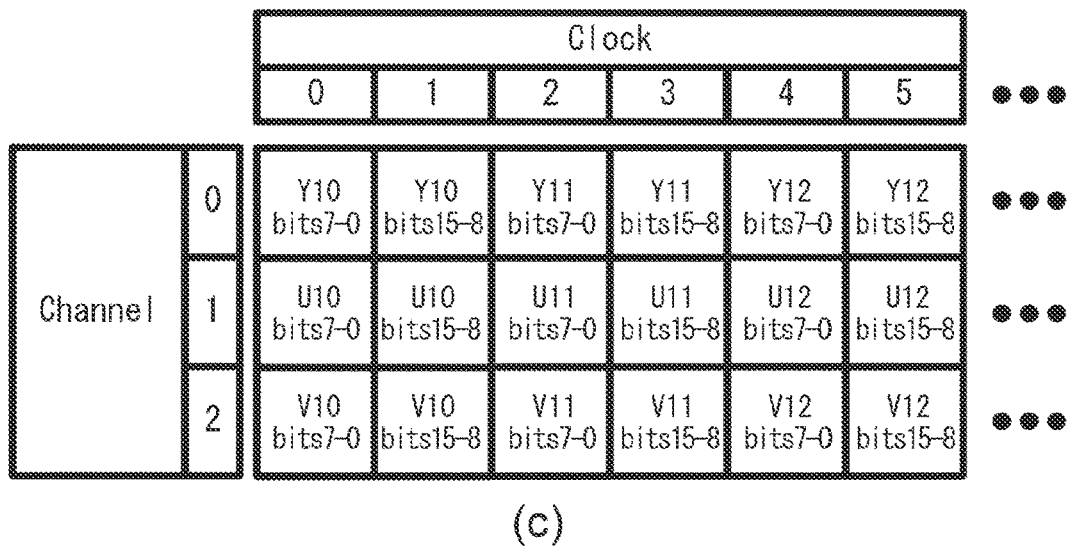

FIG. 3 is a view for illustrating an example of a transmission format in a case where the development data 242 is output from the image-capturing device 20 according to the prior art via the HDMI cable 30. FIG. 3(a) shows an example of an arrangement of Y pixel data 1, U pixel data 2, and V pixel data 3, each data having 16 bits, in the data memory 24 based on a pixel interleaving format in a case where YUV data is configured in a YUV444 format 48-bit mode as the development data 242, for example. As shown, in a row L1, pixel data of the 16-bit pixels Y00, U00, V00, Y01, U01, V01, Y02, U02, and V02 are arranged in sequence in the horizontal direction Ma. As shown, in a row L2 subsequent to the row L1, pixel data of the 16-bit pixels Y10, U10, V10, Y11, U11, V11, Y12, U12, and V12 are arranged in sequence in the horizontal direction Ma.

FIGS. 3(b) and 3(c) are views showing an example of a transmission format. FIGS. 3(b) and 3(c) show a transmission format to be used by the external output control unit 262 of the image-capturing device 20 in order to transmit the pixel data arranged in the rows L1 and L2 shown in FIG. 3(a) via the HDMI cable. In the horizontal direction, clock sections 0 to 5 are illustrated and the flow of time is from the clock section 0 to the clock section 5. Three channels 0 to 2 are provided in each clock section, and a field assigned to each channel can contain 8 bits of data. In other words, in FIGS. 3(b) and 3(c), a total of 24 bits of data can be contained in each clock section. Since the YUV data is here in the YUV444 format 48-bit mode, two clock sections are used to contain a total of 48 bits of data including the Y pixel data 1 for one pixel, the U pixel data 2 for one pixel, and the V pixel data 3 for one pixel, in a total of six fields each containing 8 bits of data.

Therefore, in the example shown in FIG. 3(b), bits 0 to 7 of the 16-bit pixel data of the pixel Y00 arranged in the row L1 are contained in the channel 0 during the clock section 0 and bits 8 to 15 of the 16-bit pixel data of the pixel Y00 are contained in the channel 0 during the clock section 1. Bits 0 to 7 of the 16-bit pixel data of the pixel U00 arranged in the row L1 are contained in the channel 1 during the clock section 0 and bits 8 to 15 of the 16-bit pixel data of the pixel U00 are contained in the channel 1 during the clock section 1. Bits 0 to 7 of the 16-bit pixel data of the pixel V00 arranged in the row L1 are contained in the channel 2 during the clock section 0 and bits 8 to 15 of the 16-bit pixel data of the pixel V00 are contained in the channel 2 during the clock section 1. Pixel data of the pixels Y01, U01, V01, Y02, U02, and V02 arranged in the row L1 are also subjected to the same mapping processing.

In the example shown in FIG. 3(c), bits 0 to 7 of the 16-bit pixel data of the pixel Y10 arranged in the row L2 are contained in the channel 0 during the clock section 0 and bits 8 to 15 of the 16-bit pixel data of the pixel Y10 are contained in the channel 0 during the clock section 1. Bits 0 to 7 of the 16-bit pixel data of the pixel U10 arranged in the row L2 are contained in the channel 1 during the clock section 0 and bits 8 to 15 of the 16-bit pixel data of the pixel U10 are contained in the channel 1 during the clock section 1. Bits 0 to 7 of the 16-bit pixel data of the pixel V10 arranged in the row L2 are contained in the channel 2 during the clock section 0 and bits 8 to 15 of the 16-bit pixel data of the pixel V10 are contained in the channel 2 during the clock section 1. Pixel data of the pixels Y11, U11, V11, Y12, U12, and V12 arranged in the row L2 are also subjected to the same mapping processing.

A case where YUV422 data composed of respective 12-bit components is transmitted in the transmission format according to the prior art for transmission in the YUV422 format 24-bit mode as shown in FIG. 2(b) will be described below.

Bits 0 to 3 of the 12-bit pixel data of the pixel Y00 arranged in the row L1 and bits 0 to 3 of the 12-bit pixel data of the pixel Y01 arranged in the row L1 are contained in the channel 0 during the clock section 0. Further, bits 0 to 3 of the 12-bit pixel data of the pixel U00 arranged in the row L1 and bits 0 to 3 of the 12-bit pixel data of the pixel V00 arranged in the row L1 are contained in the channel 0 during the clock section 1.

Bits 4 to 11 of the 12-bit pixel data of the pixel Y00 arranged in the row L1 are contained in the channel 1 during the clock section 0 and bits 4 to 11 of the 12-bit pixel data of the pixel U00 are contained in the channel 1 during the clock section 1.

Bits 4 to 11 of the 12-bit pixel data of the pixel Y01 arranged in the row L1 are contained in the channel 2 during the clock section 0 and bits 4 to 11 of the 12-bit pixel data of the pixel V00 arranged in the row L1 are contained in the channel 2 during the clock section 1. Pixel data of the pixels Y10, U10, Y11, and V10 arranged in the row L2 are also subjected to the same mapping processing.

Figure 4:
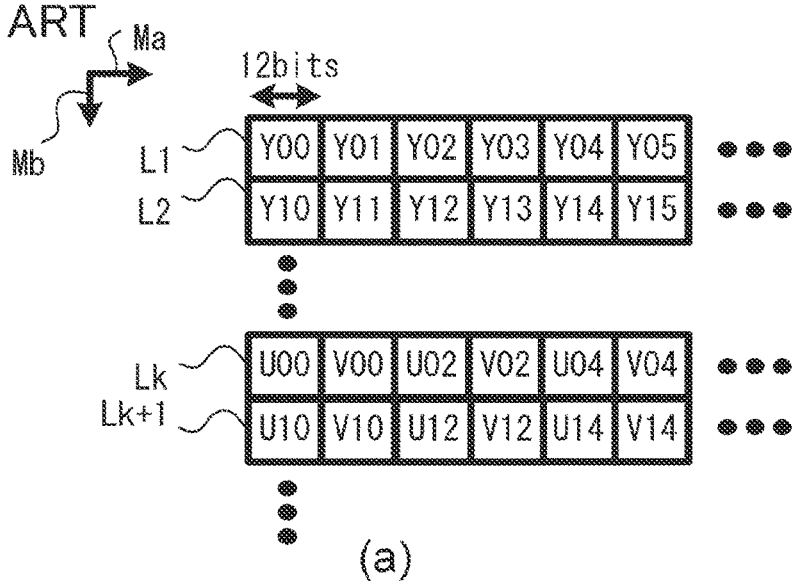
FIG. 4 is a view for illustrating an example of the transmission format in a case where the development data is output from the image-capturing device 20 according to the prior art via the HDMI cable.
Figure 4:
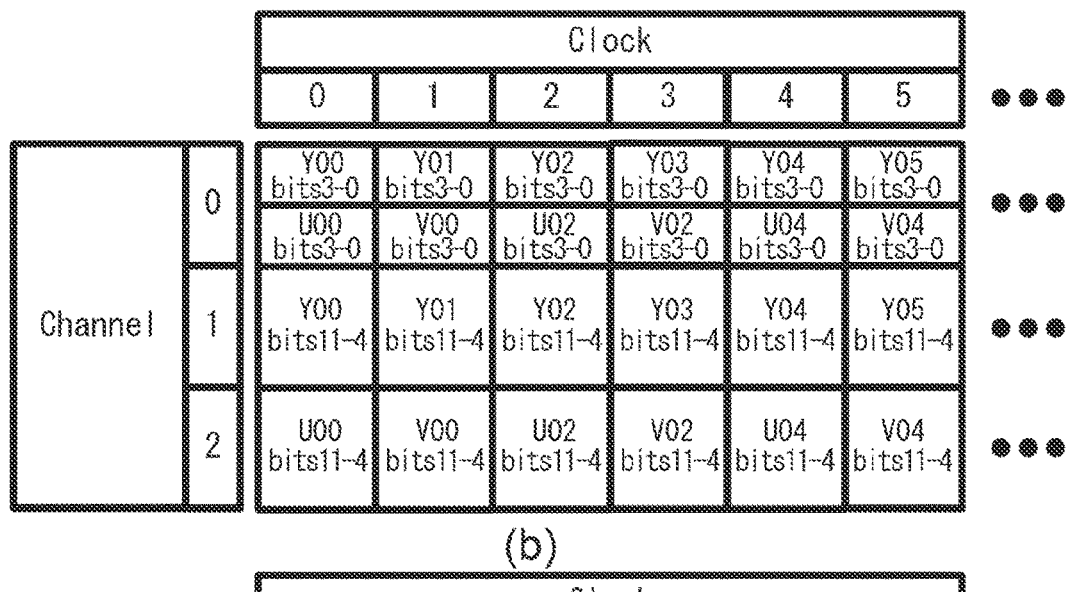
Figure 4:
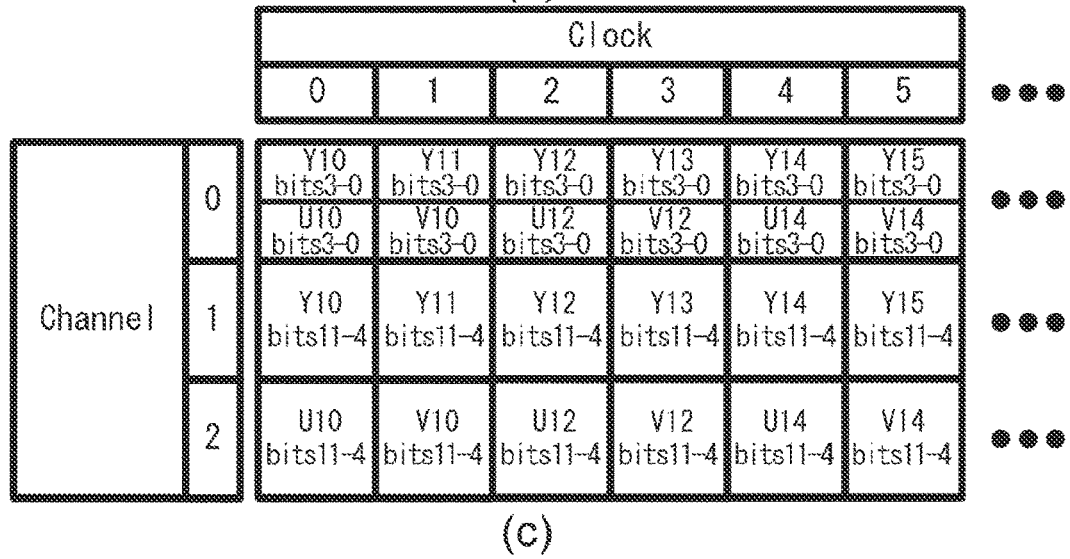

FIG. 4 is a view for illustrating an example of a transmission format in a case where the development data 242 is output from the image-capturing device 20 according to the prior art via the HDMI cable 30. FIG. 4(*a*) shows an example of an arrangement of Y pixel data 1, U pixel data 2, and V pixel data 3, each data having 12 bits, in the data memory 24 based on a semi-planar format in a case where YUV data is configured in a YUV422 format 24-bit mode as the development data 242, for example. As shown, in a row L1, pixel data of the 12-bit pixels Y00, Y01, Y02, Y03, Y04, and Y05 are arranged in sequence in the horizontal direction Ma. As shown, in a row L2 subsequent to the row L1, pixel data of the 12-bit pixels Y10, Y11, Y12, Y13, Y14, and Y15 are arranged in sequence in the horizontal direction Ma. Further, in a row Lk after all the Y pixel data 1 are arranged, pixel data of the 12-bit pixels U00, V00, U02, V02, U04, and V04 are arranged in sequence in the horizontal direction Ma. Further, as shown, in a row Lk+1 subsequent to the row Lk, pixel data of the 12-bit pixels U10, V10, U12, V12, U14, and V14 are arranged in sequence in the horizontal direction Ma.

FIGS. 4(*b*) and 4(*c*) are views showing an example of a transmission format. FIGS. 4(*b*) and 4(*c*) show a transmission format to be used by the external output control unit 262 of the image-capturing device 20 in order to transmit the pixel data arranged in the rows L1, L2, Lk, and Lk+1 shown in FIG. 4(*a*) via the HDMI cable. In the horizontal direction, clock sections 0 to 5 are illustrated and the flow of time is from the clock section 0 to the clock section 5. Three channels 0 to 2 are provided in each clock section, and a field assigned to each channel can contain 8 bits of data. In other words, in FIGS. 4(*b*) and 4(*c*), a total of 24 bits of data can be contained in each clock section. Since the YUV data is here in the YUV422 format 24-bit mode, a total of 24 bits of data including the Y pixel data 1 for one pixel and either the U pixel data 2 or the V pixel data 3 for one pixel, alternately, are contained in a total of three fields each containing 8 bits of data during one clock section.

Therefore, in the example shown in FIG. 4(*b*), bits 0 to 3 of the 12-bit pixel data of the pixel Y00 arranged in the row L1 are contained in the channel 0 during the clock section 0 and bits 4 to 11 of the 12-bit pixel data of the pixel Y00 are contained in the channel 1 during the same clock section 0. Bits 0 to 3 of the 12-bit pixel data of the pixel U00 arranged in the row Lk are contained in the channel 0 during the clock section 0 and bits 4 to 11 of the 12-bit pixel data of the pixel U00 are contained in the channel 2 during the same clock section 0. Bits 0 to 3 of the 12-bit pixel data of the pixel Y01 arranged in the row L1 are contained in the channel 0 during the clock section 1 and bits 4 to 11 of the 12-bit pixel data of the pixel Y01 are contained in the channel 1 during the same clock section 1. Bits 0 to 3 of the 12-bit pixel data of the pixel V00 arranged in the row Lk are contained in the channel 0 during the clock section 1 and bits 4 to 11 of the 12-bit pixel data of the pixel V00 are contained in the channel 2 during the same clock section 1. Pixel data of the pixels Y02, Y03, Y04, and Y05 arranged in the row L1 and pixel data of the pixels U02, V02, U04, and V04 arranged in the row Lk are also subjected to the same mapping processing.

In the example shown in FIG. 4(*c*), bits 0 to 3 of the 12-bit pixel data of the pixel Y10 arranged in the row L2 are contained in the channel 0 during the clock section 0 and bits 4 to 11 of the 12-bit pixel data of the pixel Y10 are contained in the channel 1 during the same clock section 0. Bits 0 to 3 of the 12-bit pixel data of the pixel U10 arranged in the row Lk+1 are contained in the channel 0 during the clock section 0 and bits 4 to 11 of the 12-bit pixel data of the pixel U10 are contained in the channel 2 during the same clock section 0. Bits 0 to 3 of the 12-bit pixel data of the pixel Y11 arranged in the row L2 are contained in the channel 0 during the clock section 1 and bits 4 to 11 of the 12-bit pixel data of the pixel Y11 are contained in the channel 1 during the same clock section 1. Bits 0 to 3 of the 12-bit pixel data of the pixel V10 arranged in the row Lk+1 are contained in the channel 0 during the clock section 1 and bits 4 to 11 of the 12-bit pixel data of the pixel V10 are contained in the channel 2 during the same clock section 1. Pixel data of the pixels Y12, Y13, Y14, and Y15 arranged in the row L2 and pixel data of the pixels U12, V12, U14, and V14 arranged in the row Lk+1 are subjected to the same mapping processing.

Figure 5:
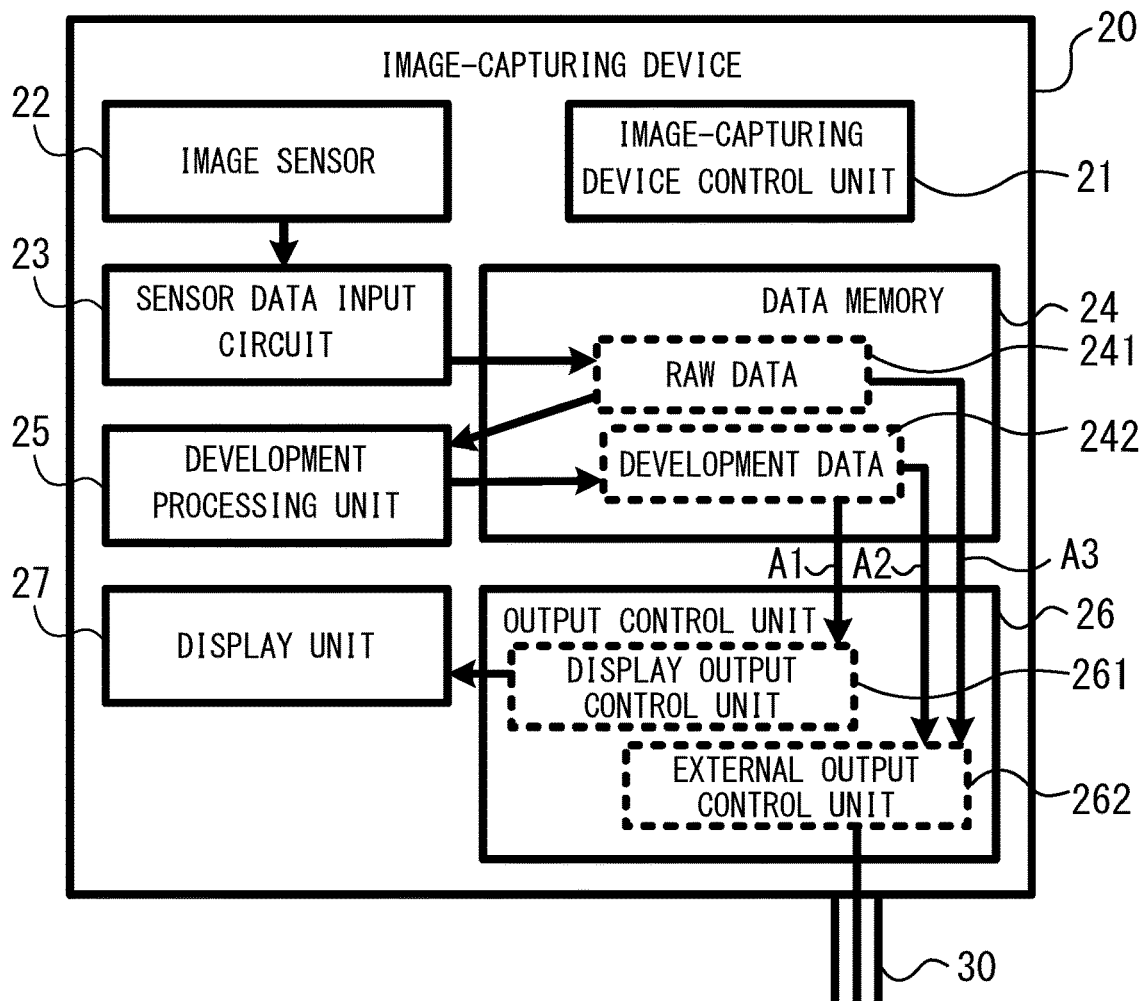
FIG. 5 is an example of a block diagram of an image transmission recording system in embodiments and those variations according to the present invention.
Figure 5:
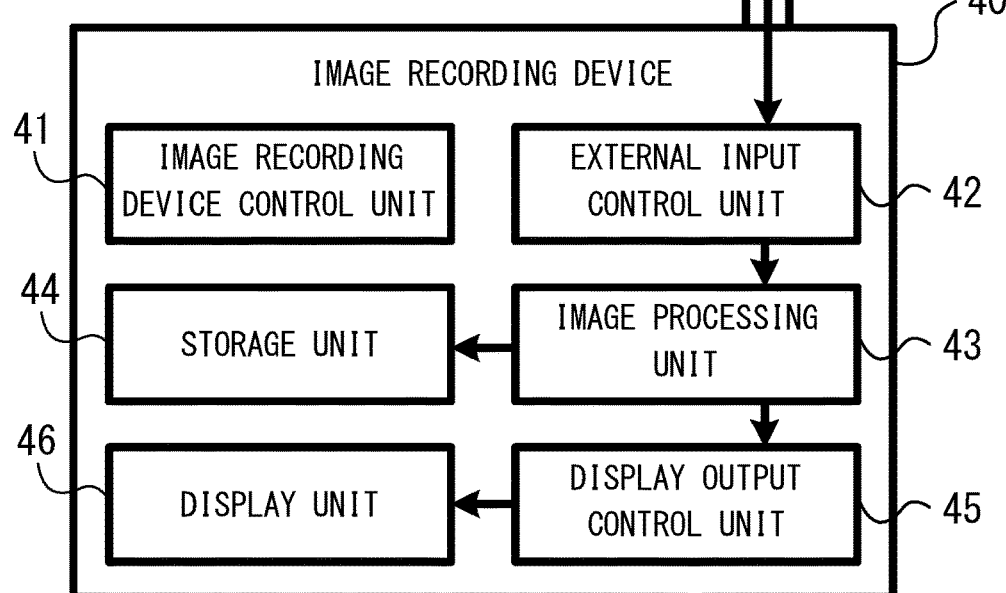

Now, embodiments and those variations according to the present invention will be described with reference to FIG. 5 and subsequent figures. FIG. 5 is an example of a block diagram of an image transmission recording system 11 in embodiments and those variations according to the present invention. The image transmission recording system 11 includes an image-capturing device 20, an image recording device 40 which is an external device of the image-capturing device 20, and a HDMI cable 30 that connects the image-capturing device 20 to the image recording device 40.

The image-capturing device 20 includes an image-capturing device control unit 21, an image sensor 22, a sensor data input circuit 23, a data memory 24, a development processing unit 25, an output control unit 26, and a display unit 27. The image-capturing device control unit 21 includes a microprocessor and a memory, for example, and computer program is run to control the entire image-capturing device 20, that is, the image-capturing device control unit 21, the image sensor 22, the sensor data input circuit 23, the data memory 24, the development processing unit 25, the output control unit 26, and the display unit 27.

The image sensor 22 has a plurality of photoelectric conversion elements and captures an image of a subject via an optical system (not shown) to output an image-capturing signal. The sensor data input circuit 23 performs wave detection processing on the image-capturing signal output from the image sensor 22 and performs synchronization processing between the image-capturing signal and an audio signal and calculation processing of white balance data and gamma data by unit of frame, for example. RAW data 241 of the image-capturing signal, the audio signal data, the white balance data, and the gamma data are stored in a register region of the sensor data input circuit unit 23 or the data memory 24 by unit of frame.

The development processing unit 25 generates development data 242 such as YUV data and/or RGB data based on the RAW data 241 stored in the data memory 24. The RGB data is generated by representing the color information of the pixel with a combination of a red component R, a green component and a blue component B, which are the three primary colors of light. YUV data is generated by representing the color information of the pixel with a combination of a luminance component Y, a color difference (chrominance) component U between the luminance component and a blue component, and the color difference (chrominance) component V between the luminance component and a red component. Additionally, display output adjustment processing A1 is performed based on the white balance data and the gamma data. In the following, the YUV data will be described as development data, but the RGB data can be treated in the same way. The development data 242 generated by the development processing unit 25 is stored in the data memory 24.

The output control unit 26 includes a display output control unit 261 and an external output control unit 262, and reads out the development data 242 stored in the data memory 24. Under the control of the image recording device control unit 21, the display output control unit 261 causes the display unit 27 to display images by unit of frame by subjecting the development data 242 to synchronization processing with an audio signal and display output adjustment processing A1 based on the white balance data and the gamma data, by unit of frame. At that time, the display output control unit 261 causes a speaker or earphone (not shown) to output audio based on the audio signal associated with the frame. Note that the output control unit 26 may perform the display output adjustment processing A1 based on the white balance data and the gamma data.

Under the control of the image-capturing device control unit 21, the external output control unit 262 performs read-out processing A2 in which the development data 242 is read out by associating the development data 242 with an audio signal by unit of frame. The external output control unit 262 can transmit the development data 242 and the audio signal to the image recording device 40 via the HDMI cable 30 by arranging the development data 242 and the audio signal in predetermined fields on a HDMI transmission format.

Additionally, under the control of the image-capturing device control unit 21, the external output control unit 262 performs read-out processing A3 in which the RAW data 241 is read out by associating the RAW data 241 with an audio signal, the white balance data, and the gamma data by unit of frame. The external output control unit 262 arranges the RAW data 241, the white balance data, and the gamma data in a given field on the HDMI transmission format, and arranges the audio signal in a predetermined field on the HDMI transmission format. In this way, the external output control unit 262 can transmit the RAW data 241, the audio signal, the white balance data, and the gamma data to the image recording device 40 via the HDMI cable 30.

The image recording device 40 includes an image recording device control unit 41, an external input control unit 42, an image processing unit 43, a storage device 44, a display output control unit 45, and a display unit 46. The image recording device control unit 41 includes a microprocessor and a memory, for example, and computer program is run to control the entire image recording device 40, that is, the image recording device control unit 41, the external input control unit 42, the image processing unit 43, the storage device 44, the display output control unit 45, and the display unit 46.

The external input control unit 42 receives the development data 242 and the audio signal from the image-capturing device 20 via the HDMI cable 30, that is, acquires the development data 242 and the audio signal arranged in predetermined fields on the HDMI transmission format and then transfers them to the image processing unit 43. The image processing unit 43 stores the development data 242 and the audio signal in the storage device 44 by unit of frame and delivers them to the display output control unit 45.

Under the control of the image recording device control unit 41, the display output control unit 45 causes the display unit 46 to display images by unit of frame by subjecting the development data 242 received from the image processing unit 43 to synchronization processing with an audio signal and display output adjustment processing based on the white balance data and the gamma data, by unit of frame. At that time, the display output control unit 261 causes a speaker or earphone (not shown) to output audio based on the audio signal associated with the frame.

Further, the external input control unit 42 receives the RAW data 241, the white balance data, the gamma data, and and the audio signal from the image-capturing device 20 via the HDMI cable 30, that is, acquires the RAW data 241, the white balance data, the gamma data, and and the audio signal arranged in given/predetermined fields on the HDMI transmission format and then transfers them to the image processing unit 43. The image processing unit 43 generates development data such as YUV data and/or RGB data based on the RAW data 241. The image processing unit 43 stores the RAW data 241, and the white balance data, the gamma data, and the audio signal acquired from the image-capturing device 20 via the external input control unit 42 in the storage device 44 by unit of frame. Further, the generated development data is delivered to the display output control unit 45. Note that the image processing unit 43 may perform compression processing (encoding processing) on the RAW data 241 and then deliver the data to the storage device.

Under the control of the image recording device control unit 41, the display output control unit 45 causes the display unit 46 to display images thereon by unit of frame by subjecting development data generated by the the image processing unit 43 to synchronization processing with an audio signal and display output adjustment processing based on the white balance data and the gamma data, by unit of frame, based on the white balance data, the gamma data, and the audio signal acquired from the image-capturing device 20. At that time, the display output control unit 261 causes a speaker or earphone (not shown) to output audio based on the audio signal associated with the frame.

Figure 6:
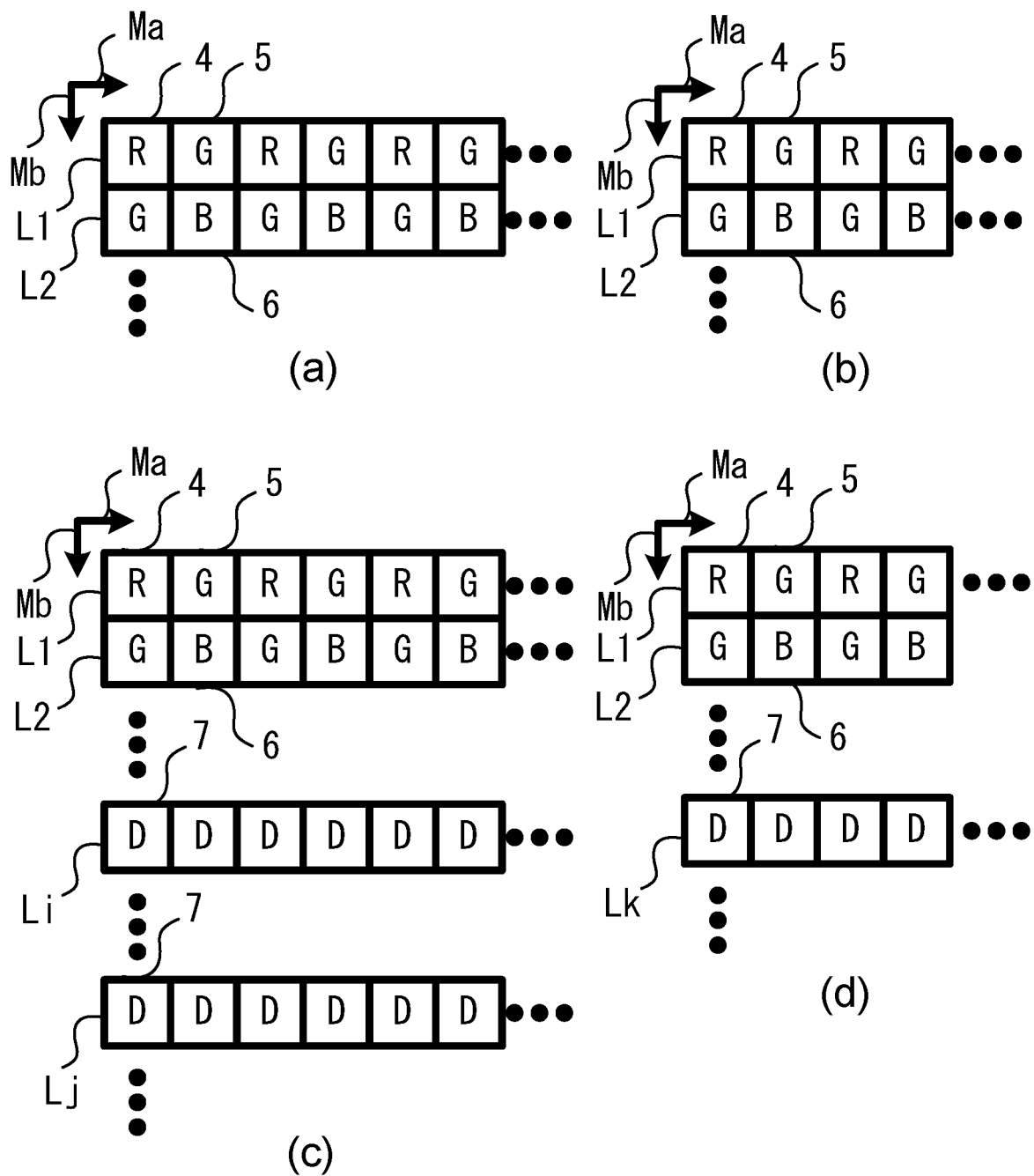
FIG. 6 is a view illustrating RAW data stored in the data memory in the image-capturing device in embodiments and those variations according to the present invention.

FIG. 6 is a view illustrating RAW data 241 stored in the data memory 24 in the image-capturing device 20 in embodiments and those variations according to the present invention. FIG. 6(a) shows an example of an arrangement of R pixel data 4, G pixel data 5, and B pixel data 6 constituting the RAW data 241 in the data memory 24 in a pixel interleaving format in a case where the RAW data 241 is stored instead of the YUV data configured in the YUV444 format illustrated in FIG. 2(a). In odd-numbered rows of the data memory 24, the R pixel data 4 and the G pixel data 5 are repeatedly arranged in sequence in the horizontal direction Ma, while in even-numbered rows, the G pixel data 5 and the B pixel data 6 are repeatedly arranged in sequence in the horizontal direction Ma. RAW pixel data strings of the odd-numbered rows and even-numbered rows thus formed are juxtaposed in the vertical direction Mb of the data memory 24. FIG. 6(a) illustrates a first row L1 (an example of the odd-numbered row) and the next row L2 (an example of the even-numbered row), among others.

FIG. 6(b) shows an example of an arrangement of R pixel data 4, G pixel data 5, and B pixel data 6 constituting the RAW data 241 in the data memory 24 in a pixel interleaving format in a case where the RAW data 241 is stored instead of the YUV data configured in the YUV422 format illustrated in FIG. 2(b). In odd-numbered rows of the data memory 24, the R pixel data 4 and the G pixel data 5 are repeatedly arranged in sequence in the horizontal direction Ma, while in even-numbered rows, the G pixel data 5 and the B pixel data 6 are repeatedly arranged in sequence in the horizontal direction Ma. RAW pixel data strings of the odd-numbered rows and even-numbered rows thus formed are juxtaposed in the vertical direction Mb of the data memory 24. RAW pixel data strings of the odd-numbered rows and even-numbered rows thus formed are juxtaposed in the vertical direction Mb of the data memory 24. FIG. 6(*b*) illustrates a first row L1 (an example of the odd-numbered row) and the next row L2 (an example of the even-numbered row), among others.

FIG. 6(*c*) shows an example of an arrangement of R pixel data 4, G pixel data 5, and B pixel data 6 constituting the RAW data 241, and D pixel data 7 which is dummy data different from the RAW data 241, in the data memory 24 in a planar format in a case where the RAW data 241 is stored instead of the YUV data configured in the YUV444 format or the YUV422 format illustrated in FIG. 2(*c*). In each of a first row L1 to a row Li−1 of the data memory 24, the RAW data 241 is arranged in the horizontal direction Ma at positions where only the Y pixel data 1 is repeatedly arranged in the case of the YUV data. In odd-numbered rows thereof, the R pixel data 4 and the G pixel data 5 are repeatedly arranged in sequence in the horizontal direction Ma, while in even-numbered rows, the G pixel data 5 and the B pixel data 6 are repeatedly arranged in sequence in the horizontal direction Ma. RAW pixel data strings of the odd-numbered rows and even-numbered rows thus formed are juxtaposed in the vertical direction Mb of the data memory 24. In each of rows Li to Lj−1, the D pixel data 7, which is dummy data, is repeatedly arranged in the horizontal direction Ma at positions where only U pixel data 2 is repeatedly arranged in the case of the YUV data. In each of a row Lj and subsequent rows, the D pixel data 7, which is dummy data, is repeatedly arranged in the horizontal direction Ma at positions where only V pixel data 3 is repeatedly arranged in the case of the YUV data. These rows are juxtaposed in the vertical direction Mb of the data memory 24. FIG. 6(*c*) illustrates, among others, only the first row L1 (an example of the odd-numbered row) and the next row L2 (an example of the even-numbered row) of the rows in which the RAW data 241 is arranged, and the first row Li of the rows in which only D pixel data 7 is repeatedly arranged, and a row Lj in which only the D pixel data 7 is also repeatedly arranged. Note that it is not necessary for the D pixel data 7, which is dummy data, to be stored in the data memory 24.

FIG. 6(*d*) shows an example of an arrangement of R pixel data 4, G pixel data 5, and B pixel data 6 constituting the RAW data 241, and D pixel data 7 which is dummy data different from the RAW data 241, in the data memory 24 in a planar format in a case where the RAW data 241 is stored instead of the YUV data configured in the YUV422 format illustrated in FIG. 2(*d*). In each of a first row L1 to a row Lk−1 of the data memory 24, the RAW data 241 is arranged in the horizontal direction Ma at positions where only the Y pixel data 1 is repeatedly arranged in the case of the YUV data. In odd-numbered rows thereof, the R pixel data 4 and the G pixel data 5 are repeatedly arranged in sequence in the horizontal direction Ma, while in even-numbered rows, the G pixel data 5 and the B pixel data 6 are repeatedly arranged in sequence in the horizontal direction Ma. RAW pixel data strings of the odd-numbered rows and even-numbered rows thus formed are juxtaposed in the vertical direction Mb of the data memory 24. In each of a row Lk and subsequent rows, the D pixel data 7, which is dummy data, is repeatedly arranged in the horizontal direction Ma at positions where U pixel data 2 and V pixel data 3 are repeatedly arranged in sequence in the case of the YUV data. These rows are juxtaposed in the vertical direction Mb of the data memory 24. FIG. 6(*d*) illustrates, among others, only the first row L1 (an example of the odd-numbered row) and the next row L2 (an example of the even-numbered row) of the rows in which the RAW data 241 is arranged, and the first row Lk of the rows in which only D pixel data 7 is repeatedly arranged. Note that it is not necessary for the D pixel data 7, which is dummy data, to be stored in the data memory 24.

First Embodiment

Figure 7:
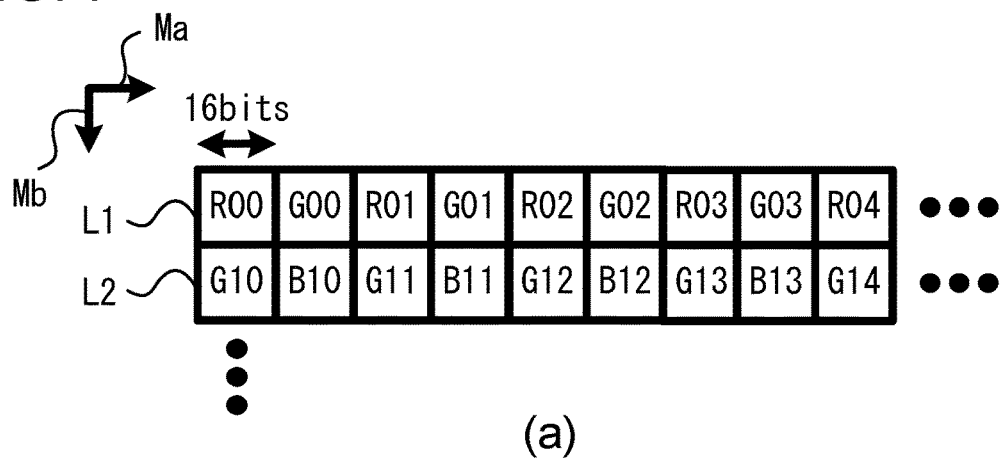
FIG. 7 is a view for illustrating an example of RAW data output using a transmission format for YUV data in a first embodiment according to the present invention.
Figure 7:
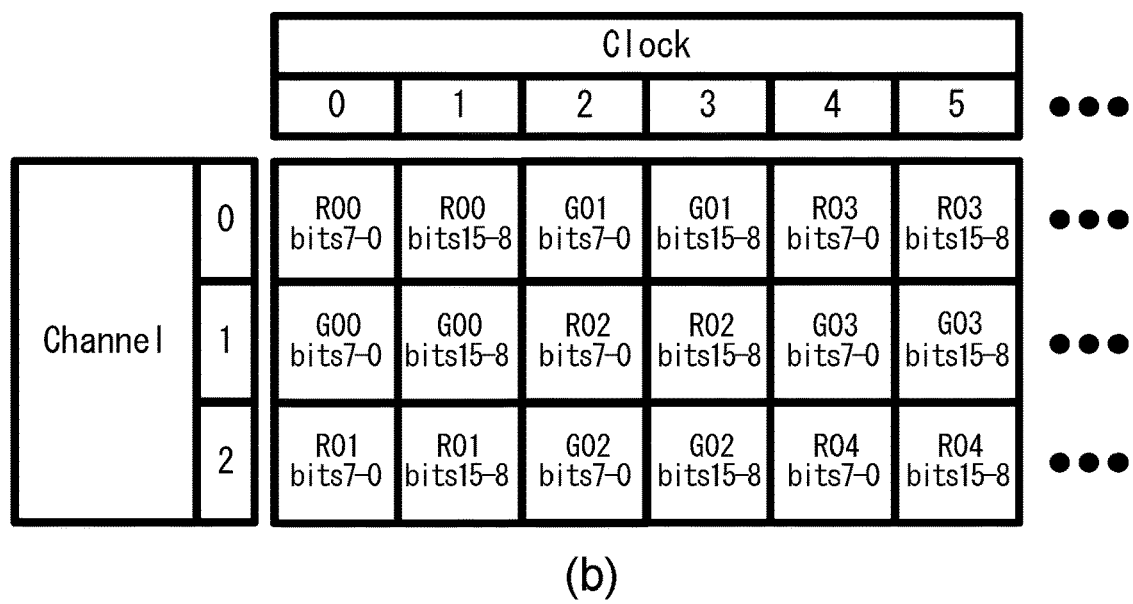
Figure 7:
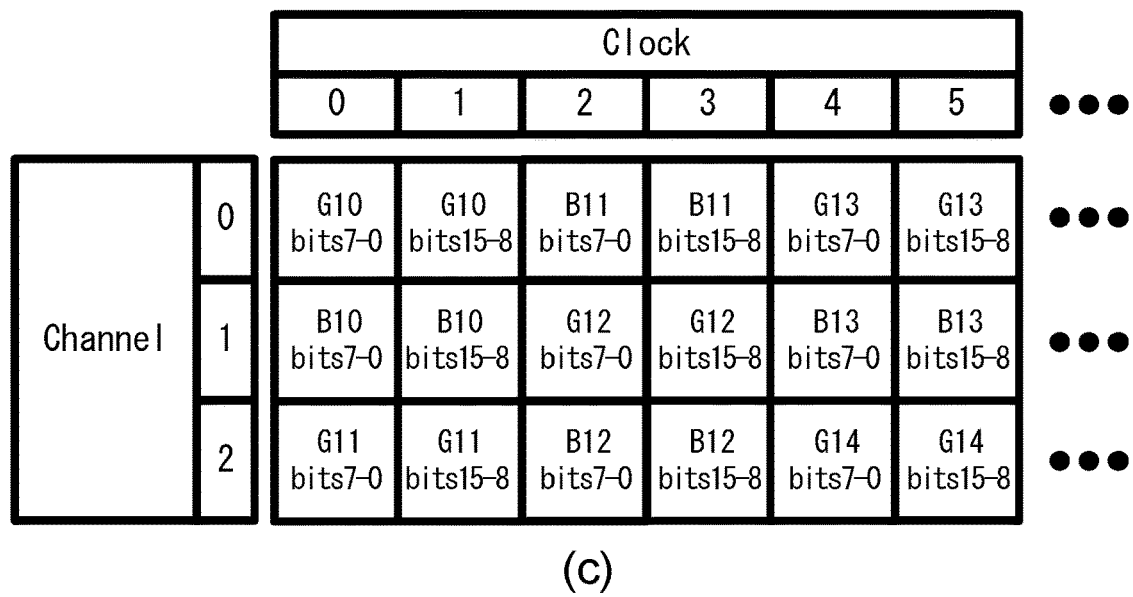

A transmission format of RAW data 241 in a first embodiment according to the present invention will be described with reference to FIG. 7. FIG. 7 is a view for illustrating an example of RAW data output using a transmission format for YUV data in the first embodiment according to the present invention. FIG. 7(*a*) shows an example of an arrangement of R pixel data 4, G pixel data 5, and B pixel data 6 of the RAW data 241, each pixel data having 16 bits, in the data memory 24 in a pixel interleaving format in a case where the RAW data 241 is stored instead of the YUV data configured in the YUV444 format 48-bit mode illustrated in FIG. 3(*a*). As shown, in a row L1, pixel data of the 16-bit pixels R00, G00, R01, G01, R02, G02, R03, G03, and R04 are arranged in sequence in the horizontal direction Ma. Further, as shown, in a row L2 subsequent to the row L1, pixel data of the 16-bit pixels G10, B, G11, B11, G12, B12, G13, B13, and G14 are arranged in sequence in the horizontal direction Ma.

FIGS. 7(*b*) and 7(*c*) show how an external output control unit 262 of an image-capturing device 20 performs mapping of each pixel data of the RAW data 241 arranged in the rows L1 and L2 shown in FIG. 7(*a*) to the transmission format for YUV data in order to transmit the pixel data via the HDMI cable 30. In the horizontal direction, clock sections 0 to 5 are illustrated and the flow of time is from the clock section 0 to the clock section 5. Three channels 0 to 2 are provided in each clock section, and a field assigned to each channel can contain 8 bits of data. In other words, in FIGS. 7(*b*) and 7(*c*), a total of 24 bits of data can be contained in each clock section. As with the example of the YUV444 format 48-bit mode shown in FIGS. 3(*b*) and 3(*c*), two clock sections are used to contain a total of 48 bits of data for a total of three pixels, that is, two pixels for one of the R pixel data 4 and the G pixel data 5 and one pixel for the other pixel data, or two pixels for one of the G pixel data 5 and the B pixel data 6 and one pixel for the other pixel data, in a total of six fields each containing 8 bits.

Therefore, in the example shown in FIG. 7(*b*), bits 0 to 7 of the 16-bit pixel data of the pixel R00 arranged in the row L1 are contained in the channel 0 during the clock section 0 and bits 8 to 15 of the 16-bit pixel data of the pixel R00 are contained in the channel 0 during the clock section 1. Bits 0 to 7 of the 16-bit pixel data of the pixel G00 arranged in the row L1 are contained in the channel 1 during the clock section 0 and bits 8 to 15 of the 16-bit pixel data of the pixel G00 are contained in the channel 1 during the clock section 1. Bits 0 to 7 of the 16-bit pixel data of the pixel R01 arranged in the row L1 are contained in the channel 2 during the clock section 0 and bits 8 to 15 of the 16-bit pixel data of the pixel R01 are contained in the channel 2 during the clock section 1. Comparing and referring to FIG. 7(*b*) and FIG. 3(*b*), positions of container boundaries between pixel data of the pixel R00, the pixel G00, and the pixel R01 of the RAW data 241 are included in positions of container boundaries between pixel data of the pixel Y00, the pixel U00, and the pixel V00 of the development data 242 in the YUV444 format 48-bit mode. Pixel data of the pixels G01, R02, G02, R03, G03, and R04 arranged in the row L1 are also subjected to the same mapping processing as that for pixel data of the pixels R00, G00, and R01.

In the example shown in FIG. 7(c), bits 0 to 7 of the 16-bit pixel data of the pixel G10 arranged in the row L2 are contained in the channel 0 during the clock section 0 and bits 8 to 15 of the 16-bit pixel data of the pixel G10 are contained in the channel 0 during the clock section 1. Bits 0 to 7 of the 16-bit pixel data of the pixel B10 arranged in the row L2 are contained in the channel 1 during the clock section 0 and bits 8 to 15 of the 16-bit pixel data of the pixel B10 are contained in the channel 1 during the clock section 1. Bits 0 to 7 of the 16-bit pixel data of the pixel G11 arranged in the row L2 are contained in the channel 2 during the clock section 0 and bits 8 to 15 of the 16-bit pixel data of the pixel G11 are contained in the channel 2 during the clock section 1. Comparing and referring to FIG. 7(c) and FIG. 3(c), positions of container boundaries between pixel data of the pixel G10, the pixel B10, and the pixel G11 of the RAW data 241 are included in positions of container boundaries between pixel data of the pixel Y10, the pixel U10, and the pixel V10 of the development data 242 in the YUV444 format 48-bit mode. Pixel data of the pixels B11, G12, B12, G13, B13, and G14 arranged in the row L2 are also subjected to the same mapping processing as that for pixel data of the pixels G10, B10, and G11.

According to the first embodiment described above, the following actions and effects can be achieved.

(1) An image-capturing device 20 of an image transmission recording system 10 includes: an image sensor 22 that captures an image of a subject to output an image-capturing signal; a development processing unit 25 that generates development data 242 of the image based on RAW data 241 of the image-capturing signal; and an output control unit 26 that outputs the development data 242 to an image recording device 40 via a HDMI cable 30 in a predetermined transmission format. The output control unit 26 outputs the RAW data 241 to the image recording device 40 via the HDMI cable 30 by containing the RAW data 241 in a transmission channel according to a predetermined transmission format. Accordingly, the image-capturing device 20 can efficiently output the RAW data 241 to the outside, using the existing HDMI cable 30.

(2) In the image-capturing device 20, a position of a pixel data container boundary in a case where the RAW data 241 is contained in the transmission channel according to the predetermined transmission format is included in positions of pixel data container boundaries in a case where the development data 242 is contained in the transmission channel according to the predetermined transmission format. Thus, it is not necessary for the image-capturing device 20 to support transmission specifications specific to the RAW data 241 as long as the image-capturing device 20 supports the transmission format for the development data 242. Further, also in the image recording device 40, the processing of specifying the development data 242 on the transmission format can be diverted to the processing of specifying the RAW data 241 on the transmission format.

Second Embodiment

Figure 8:
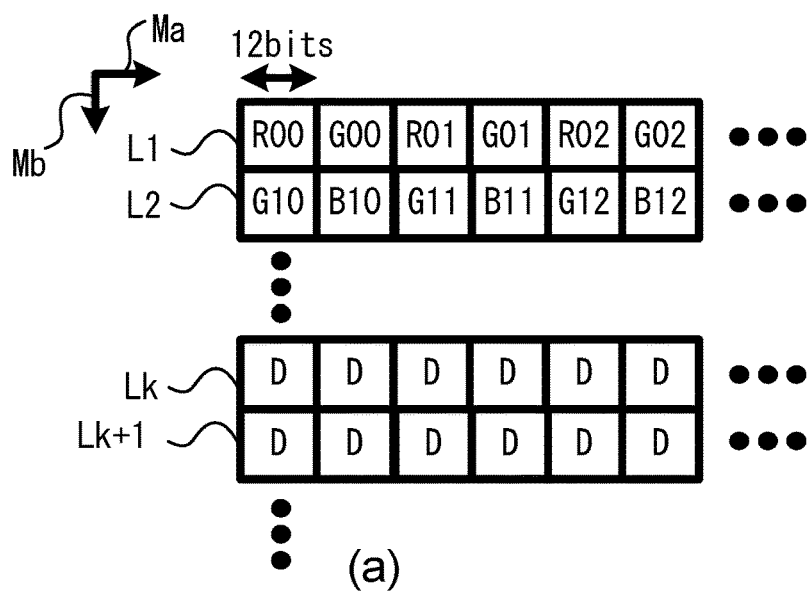
FIG. 8 is a view for illustrating an example of RAW data output using a transmission format for YUV data in a second embodiment according to the present invention.
Figure 8:
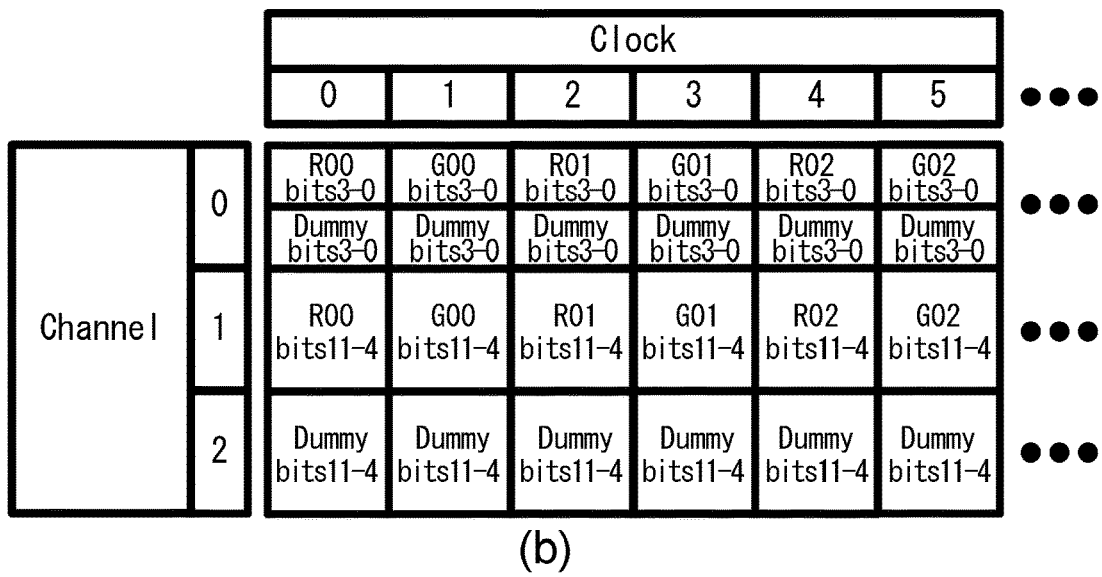
Figure 8:
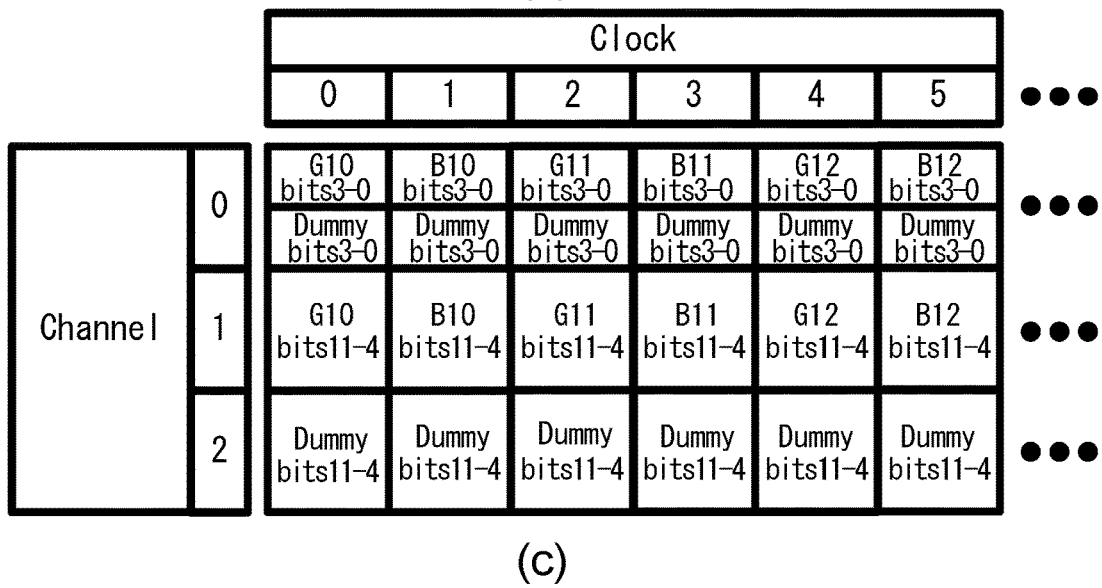

A transmission format of RAW data 241 in a second embodiment according to the present invention will be described with reference to FIG. 8. FIG. 8 is a view for illustrating an example of RAW data output using a transmission format for YUV data in the second embodiment according to the present invention. FIG. 8(a) shows an example of an arrangement of R pixel data 4, G pixel data 5, and B pixel data 6 of the RAW data 241 and D pixel data 7 which is dummy data, each pixel data having 12 bits, in the data memory 24 in a semi-planar format in a case where the RAW data 241 is stored instead of the YUV422 data configured of 12-bit components for transmission in the YUV422 format 24-bit mode illustrated in FIG. 4(a). As shown, in a row L1, pixel data of the 12-bit pixels R00, G00, R01, G01, R02, and G02 are arranged in sequence in the horizontal direction Ma. As shown, in a row L2 subsequent to the row L1, pixel data of the 12-bit pixels G10, B10, G11, B11, G12, and B12 are arranged in sequence in the horizontal direction Ma. Further, as shown, in a row Lk after all the RAW data 241 are arranged, a plurality of D pixel data 7, each being 12-bit dummy data, is arranged in sequence in the horizontal direction Ma. Further, as shown, in a row Lk+1 subsequent to the row Lk, a plurality of D pixel data 7, each being 12-bit dummy data, is arranged in sequence in the horizontal direction Ma.

FIGS. 8(b) and 8(c) show how an external output control unit 262 of an image-capturing device 20 performs mapping of each pixel data arranged in the rows L1, L2, Lk, and Lk+1 shown in FIG. 8(a) to the transmission format for YUV data in order to transmit the pixel data via the HDMI cable 30. In the horizontal direction, clock sections 0 to 5 are illustrated and the flow of time is from the clock section 0 to the clock section 5. Three channels 0 to 2 are provided in each clock section, and a field assigned to each channel can contain 8 bits of data. In other words, in FIGS. 8(b) and 8(c), a total of 24 bits of data can be contained in each clock section. As with the example of the YUV422 format 24-bit mode shown in FIGS. 4(b) and 4(c), one clock section is used to contain a total of 24 bits of data in a total of three fields each containing 8 bits: the R pixel data 4, the G pixel data 5, or the B pixel data 6 for one pixel, and the D pixel data 7 which is dummy data for one pixel.

Therefore, in the example shown in FIG. 8(b), bits 0 to 3 of the 12-bit pixel data of the pixel R00 arranged in the row L1 are contained in the channel 0 during the clock section 0 and bits 4 to 11 of the 12-bit pixel data of the pixel R00 are contained in the channel 1 during the same clock section 0. Bits 0 to 3 of the 12-bit pixel data of the D pixel data 7 which is dummy data arranged in the row Lk are contained in the channel 0 during the clock section 0 and bits 4 to 11 of the 12-bit pixel data of the D pixel data 7 which is dummy data are contained in the channel 2 during the same clock section 0. Comparing and referring to FIG. 8(b) and FIG. 4(b), positions of container boundaries between pixel data of the pixel R00 of the RAW data 241 and the D pixel data 7 which is dummy data are included in positions of container boundaries between pixel data of the pixel Y00 and the pixel U00 of the development data 242 in the YUV422 format 24-bit mode.

Bits 0 to 3 of the 12-bit pixel data of the pixel G00 arranged in the row L1 are contained in the channel 0 during the clock section 1 and bits 4 to 11 of the 12-bit pixel data of the pixel G00 are contained in the channel 1 during the same clock section 1. Bits 0 to 3 of the 12-bit pixel data of the D pixel data 7 which is dummy data arranged in the row Lk are contained in the channel 0 during the clock section 1 and bits 4 to 11 of the 12-bit pixel data of the D pixel data 7 which is dummy data are contained in the channel 2 during the same clock section 1. Comparing and referring to FIG. 8(b) and FIG. 4(b), positions of container boundaries between pixel data of the pixel G00 of the RAW data 241 and the D pixel data 7 which is dummy data are included in positions of container boundaries between pixel data of the pixel Y01 and the pixel V00 of the development data 242 in the YUV422 format 24-bit mode. Pixel data of the pixels R01, G01, R02, and G02 arranged in the row L1 and a plurality of the D pixel data 7 which is dummy data arranged in the row Lk are also subjected to the same mapping processing.

In the example shown in FIG. 8(*c*), bits 0 to 3 of the 12-bit pixel data of the pixel G10 arranged in the row L2 are contained in the channel 0 during the clock section 0 and bits 4 to 11 of the 12-bit pixel data of the pixel G10 are contained in the channel 1 during the same clock section 0. Bits 0 to 3 of the 12-bit pixel data of the D pixel data 7 which is dummy data arranged in the row Lk+1 are contained in the channel 0 during the clock section 0 and bits 4 to 11 of the 12-bit pixel data of the D pixel data 7 which is dummy data are contained in the channel 2 during the same clock section 0. Comparing and referring to FIG. 8(*c*) and FIG. 4(*c*), positions of container boundaries between pixel data of the pixel G10 of the RAW data 241 and the D pixel data 7 which is dummy data are included in positions of container boundaries between pixel data of the pixel Y10 and the pixel U10 of the development data 242 in the YUV422 format 24-bit mode.

Bits 0 to 3 of the 12-bit pixel data of the pixel B10 arranged in the row L2 are contained in the channel 0 during the clock section 1 and bits 4 to 11 of the 12-bit pixel data of the pixel B10 are contained in the channel 1 during the clock section 1. Bits 0 to 3 of the 12-bit pixel data of the D pixel data 7 which is dummy data arranged in the row Lk+1 are contained in the channel 0 during the clock section 1 and bits 4 to 11 of the 12-bit pixel data of the D pixel data 7 which is dummy data are contained in the channel 2 during the same clock section 1. Comparing and referring to FIG. 8(*c*) and FIG. 4(*c*), positions of container boundaries between pixel data of the pixel B10 of the RAW data 241 and the D pixel data 7 which is dummy data are included in positions of container boundaries between pixel data of the pixel Y11 and the pixel V10 of the development data 242 in the YUV422 format 24-bit mode. Pixel data of the pixels G11, B11, G12, and B12 arranged in the row L2 and a plurality of the D pixel data 7 which is dummy data arranged in the row Lk+1 are also subjected to the same mapping processing.

According to the second embodiment described above, the following actions and effects can be achieved. In the image-capturing device 20, a position of a pixel data container boundary in a case where the RAW data 241 is contained in the transmission channel according to the predetermined transmission format is included in positions of pixel data container boundaries in a case where the development data 242 is contained in the transmission channel according to the predetermined transmission format. Thus, it is not necessary for the image-capturing device 20 to support transmission specifications specific to the RAW data 241 as long as the image-capturing device 20 supports the transmission format for the development data 242. Further, also in the image recording device 40, the processing of specifying the development data 242 on the transmission format can be diverted to the processing of specifying the RAW data 241 on the transmission format.

—Variations—

The following variations are also within the scope of the present invention.

Figure 9:
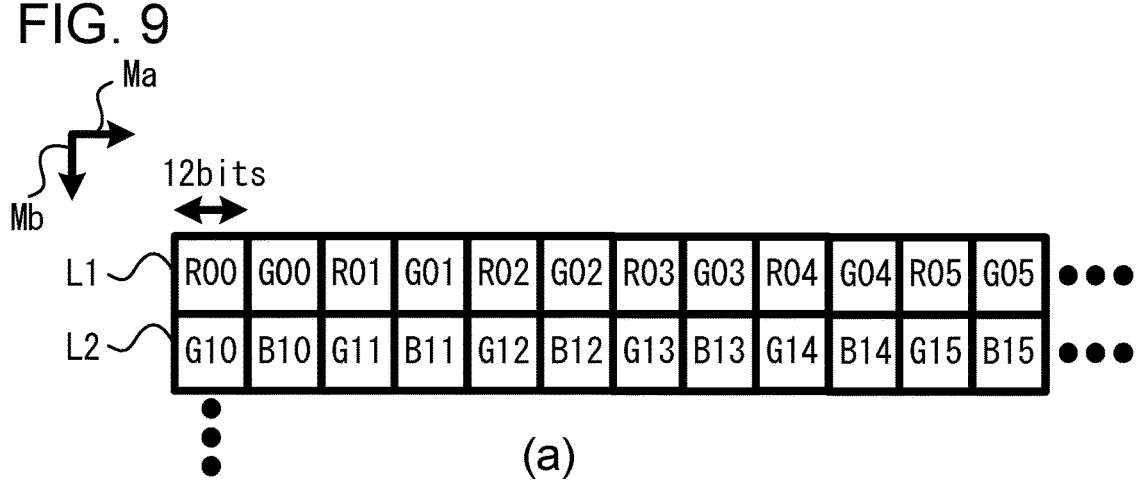
FIG. 9 is a view for illustrating an example of a transmission format in a case where the RAW data is output from an image-capturing device in a first variation via the HDMI cable.
Figure 9:
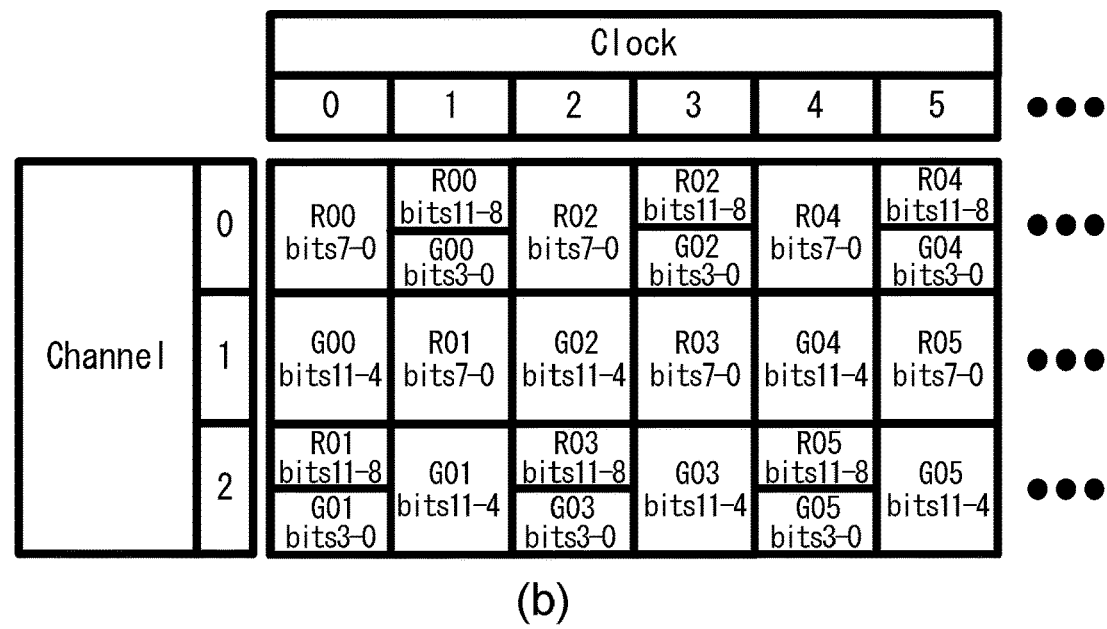
Figure 9:
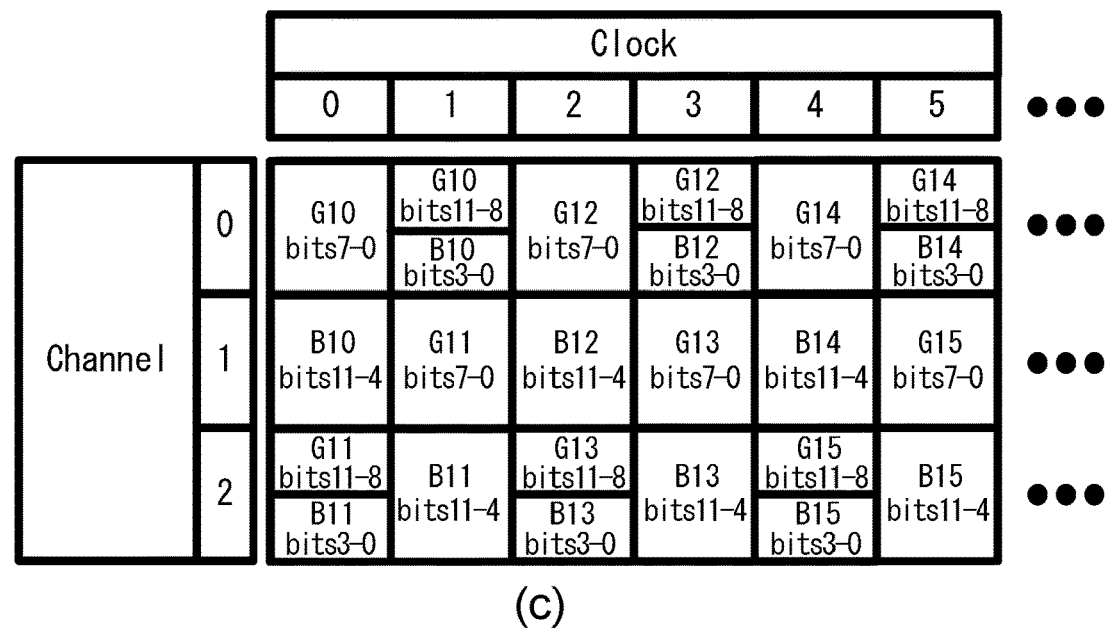

(1) FIG. 9 is a view for illustrating an example of a transmission format in a case where the RAW data 241 is output from an image-capturing device 20 in a first variation via the HDMI cable 30. FIG. 9(*a*) shows an example of an arrangement of R pixel data 4, G pixel data 5, and B pixel data 6 of the RAW data 241, each pixel data having 12 bits, in the data memory 24 in a pixel interleaving format in a case where the RAW data 241 is stored instead of the YUV444 data configured of 16-bit components for transmission in the YUV444 format 48-bit mode. As shown, in a row L1, pixel data of the 12-bit pixels R00, G00, R01, G01, R02, G02, R03, G03, R04, G04, R05, and G05 are arranged in sequence in the horizontal direction Ma. As shown, in a row L2 subsequent to the row L1, pixel data of the 12-bit pixels G10, B10, G11, B11, G12, B12, G13, B13, G14, B14, G15, and B15 are arranged in sequence in the horizontal direction Ma.

In FIGS. 9(*b*) and 9(*c*), a total of 24 bits of data can be contained in each clock section. As with the example of the YUV444 format 48-bit mode, two clock sections are used to contain a total of 48 bits of data for four pixels constituting the RAW data 241, that is 12 bits for each pixel, in a total of six fields in transmission channels each containing 8 bits.

In the example shown in FIG. 9(*b*), bits 0 to 7 of the 12-bit pixel data of the pixel R00 arranged in the row L1 are contained in the channel 0 during the clock section 0 and bits 8 to 11 of the 12-bit pixel data of the pixel R00 are contained in the channel 0 during the clock section 1. Bits 0 to 3 of the 12-bit pixel data of the pixel G00 arranged in the row L1 are contained in the channel 0 during the clock section 1 and bits 4 to 11 of the 12-bit pixel data of the pixel G00 are contained in the channel 1 during the clock section 0. Bits 0 to 7 of the 12-bit pixel data of the pixel R01 arranged in the row L1 are contained in the channel 2 during the clock section 1 and bits 8 to 11 of the 12-bit pixel data of the pixel R01 are contained in the channel 2 during the clock section 0. Bits 0 to 3 of the 12-bit pixel data of the pixel G01 arranged in the row L1 are contained in the channel 2 during the clock section 0 and bits 8 to 11 of the 12-bit pixel data of the pixel G01 are contained in the channel 2 during the clock section 1. Pixel data of the pixels R02, G02, R03, G03, R04, G04, R05, and G05 arranged in the row L1 are also subjected to the same mapping processing as that for pixel data of the pixels R00, G00, R01, and G01.

In the example shown in FIG. 9(*c*), bits 0 to 7 of the 12-bit pixel data of the pixel G10 arranged in the row L2 are contained in the channel 0 during the clock section 0 and bits 8 to 11 of the 12-bit pixel data of the pixel G10 are contained in the channel 0 during the clock section 1. Bits 0 to 3 of the 12-bit pixel data of the pixel B10 arranged in the row L2 are contained in the channel 0 during the clock section 1 and bits 4 to 11 of the 12-bit pixel data of the pixel B10 are contained in the channel 1 during the clock section 0. Bits 0 to 7 of the 12-bit pixel data of the pixel G11 arranged in the row L2 are contained in the channel 2 during the clock section 1 and bits 8 to 11 of the 12-bit pixel data of the pixel G11 are contained in the channel 2 during the clock section 0. Bits 0 to 3 of the 12-bit pixel data of the pixel B11 arranged in the row L2 are contained in the channel 2 during the clock section 0 and bits 8 to 11 of the 12-bit pixel data of the pixel B11 are contained in the channel 2 during the clock section 1. Pixel data of the pixels G12, B12, G13, B13, G14, B14, G15, and B15 arranged in the row L2 are also subjected to the same mapping processing as that for pixel data of the pixels G10, B10, G11, and B11. According to the first variation, the image-capturing device 20 can efficiently output the RAW data 241 to the outside, using the existing HDMI cable 30.

Figure 10:
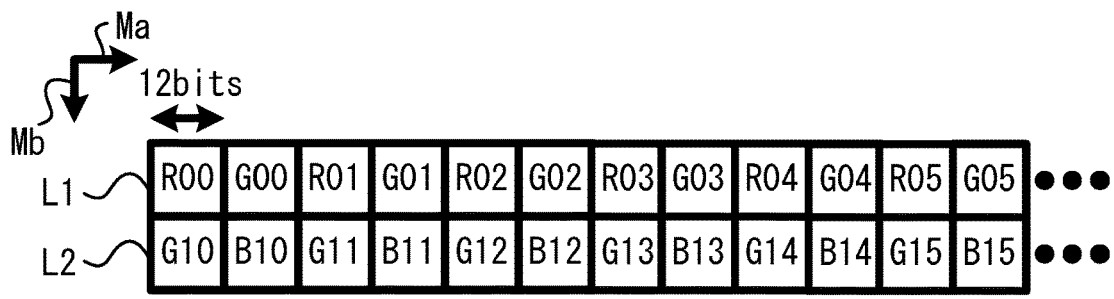
FIG. 10 is a view for illustrating an example of RAW data output using a transmission format for YUV data in a second variation.
Figure 10:
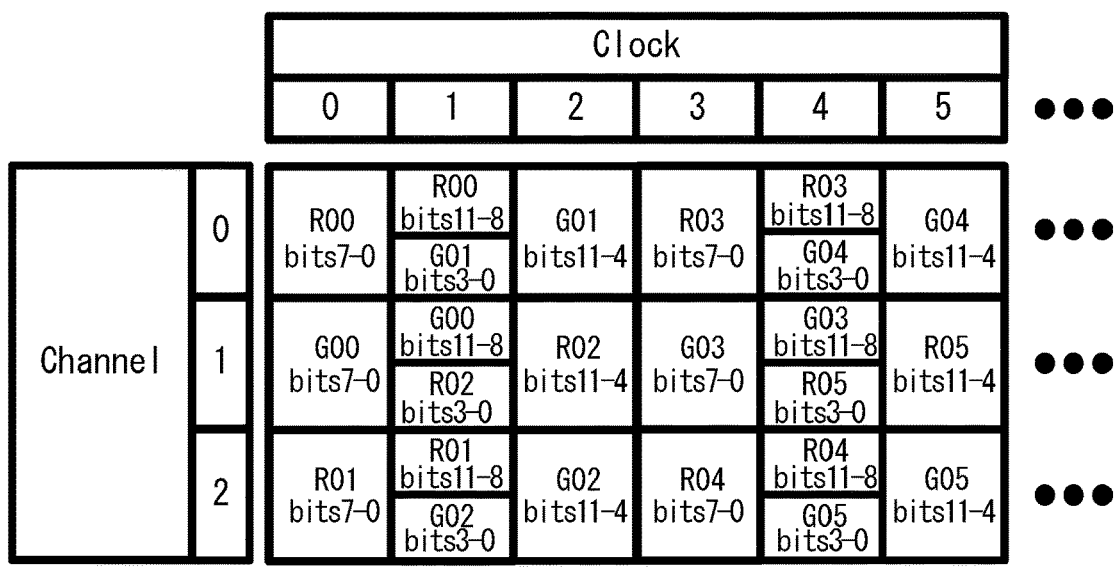
Figure 10:
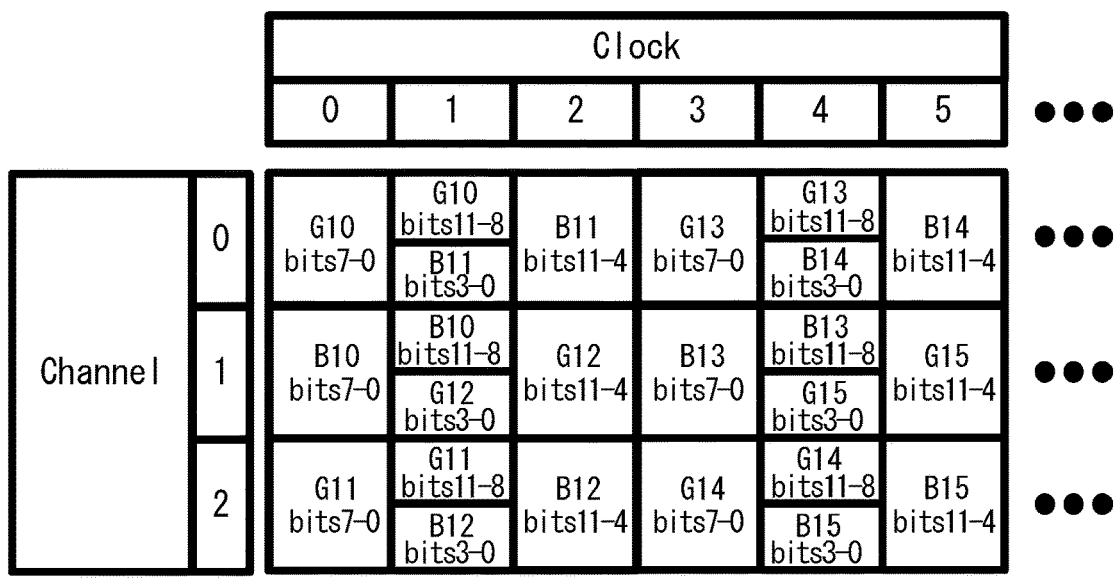

(2) FIG. 10 is a view for illustrating an example of a transmission format in a case where the RAW data 241 is output from an image-capturing device 20 in a second variation via the HDMI cable 30. FIG. 10(*a*) shows an example of an arrangement of R pixel data 4, G pixel data 5, and B pixel data 6 of the RAW data 241, each pixel data having 12 bits, in the data memory 24 in a pixel interleaving format in a case where the RAW data 241 is stored instead of the YUV444 data configured of 12-bit components for transmission in the YUV444 format 36-bit mode. As shown, in a row L1, pixel data of the 12-bit pixels R00, G00, R01, G01, R02, G02, R03, G03, R04, G04, R05, and G05 are arranged in sequence in the horizontal direction Ma. As shown, in a row L2 subsequent to the row L 1, pixel data of the 12-bit pixels G10, B10, G11, B11, G12, B12, G13, B13, G14, B14, G15, and B15 are arranged in sequence in the horizontal direction Ma.

In FIGS. 10(*b*) and 10(*c*), a total of 24 bits of data can be contained in each clock section. As with the example of the YUV444 format 36-bit mode, 36 bits of data for a total of three pixels each having 12 bits constituting the RAW data 241 are contained in fields in transmission channels each containing 8 bits in one of two clock sections, and in fields in transmission channels each containing 4 bits in the other section.

In the example shown in FIG. 10(*b*), bits 0 to 7 of the 12-bit pixel data of the pixel R00 arranged in the row L1 are contained in the channel 0 during the clock section 0 and bits 8 to 11 of the 12-bit pixel data of the pixel R00 are contained in the channel 0 during the clock section 1. Bits 0 to 7 of the 12-bit pixel data of the pixel G00 arranged in the row L1 are contained in the channel 1 during the clock section 0 and bits 8 to 11 of the 12-bit pixel data of the pixel G00 are contained in the channel 1 during the clock section 1. Bits 0 to 7 of the 12-bit pixel data of the pixel R01 arranged in the row L1 are contained in the channel 2 during the clock section 0 and bits 8 to 11 of the 12-bit pixel data of the pixel R01 are contained in the channel 2 during the clock section 1.

Bits 0 to 3 of the 12-bit pixel data of the pixel G01 arranged in the row L1 are contained in the channel 0 during the clock section 1 and bits 4 to 11 of the 12-bit pixel data of the pixel G01 are contained in the channel 0 during the clock section 2. Bits 8 to 11 of the 12-bit pixel data of the pixel R02 arranged in the row L1 are contained in the channel 1 during the clock section 1 and bits 0 to 7 of the 12-bit pixel data of the pixel R02 are contained in the channel 1 during the clock section 2. Bits 0 to 3 of the 12-bit pixel data of the pixel G02 arranged in the row L1 are contained in the channel 2 during the clock section 1 and bits 4 to 11 of the 12-bit pixel data of the pixel G02 are contained in the channel 2 during the clock section 2. Pixel data of the pixels R03, G03, R04, G04, R05, and G05 arranged in the row L1 are also subjected to the same mapping processing as that for pixel data of the pixels R00, G00, R01, G01, R02, and G02.

In the example shown in FIG. 10(*c*), bits 0 to 7 of the 12-bit pixel data of the pixel G10 arranged in the row L2 are contained in the channel 0 during the clock section 0 and bits 8 to 11 of the 12-bit pixel data of the pixel G10 are contained in the channel 0 during the clock section 1. Bits 0 to 7 of the 12-bit pixel data of the pixel B10 arranged in the row L2 are contained in the channel 1 during the clock section 0 and bits 8 to 11 of the 12-bit pixel data of the pixel B10 are contained in the channel 1 during the clock section 1. Bits 0 to 7 of the 12-bit pixel data of the pixel G11 arranged in the row L2 are contained in the channel 2 during the clock section 0 and bits 8 to 11 of the 12-bit pixel data of the pixel G11 are contained in the channel 2 during the clock section 1.

Bits 0 to 3 of the 12-bit pixel data of the pixel B11 arranged in the row L2 are contained in the channel 0 during the clock section 1 and bits 4 to 11 of the 12-bit pixel data of the pixel B11 are contained in the channel 0 during the clock section 2. Bits 8 to 11 of the 12-bit pixel data of the pixel G12 arranged in the row L2 are contained in the channel 1 during the clock section 1 and bits 0 to 7 of the 12-bit pixel data of the pixel G12 are contained in the channel 1 during the clock section 2. Bits 0 to 3 of the 12-bit pixel data of the pixel B12 arranged in the row L2 are contained in the channel 2 during the clock section 1 and bits 4 to 11 of the 12-bit pixel data of the pixel B12 are contained in the channel 2 during the clock section 2. Pixel data of the pixels G13, B13, G14, B14, G15, and B15 arranged in the row L2 are also subjected to the same mapping processing as that for pixel data of the pixels G10, B10, G11, B11, G12, and B12.

According to the second variation, the image-capturing device 20 can efficiently output the RAW data 241 to the outside, using the existing HDMI cable 30. Further, positions of container boundaries between pixel data of the RAW data 241 are included in positions of container boundaries between pixel data of the development data 242 in the YUV444 format 36-bit mode. The image-capturing device 20 and the image recording device 40 can support the transmission process of the RAW data 241 as long as they support the transmission format for the development data 242.

Figure 11:
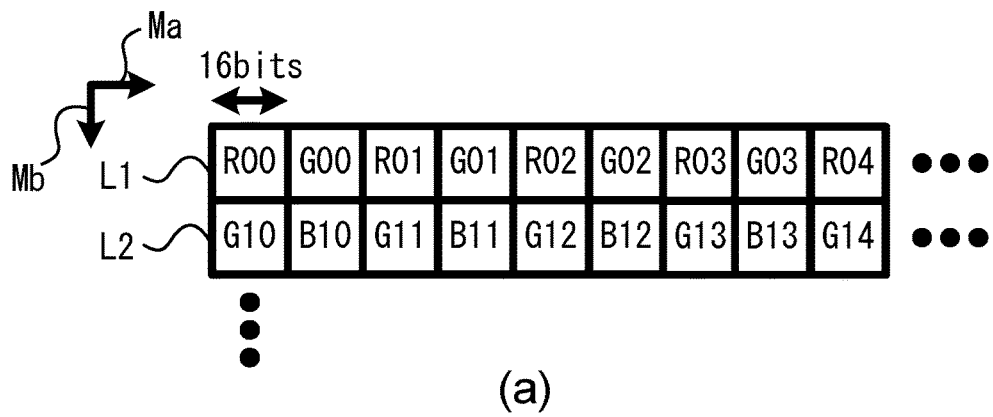
FIG. 11 is a view for illustrating an example of RAW data output using a transmission format for YUV data in a third variation.
Figure 11:
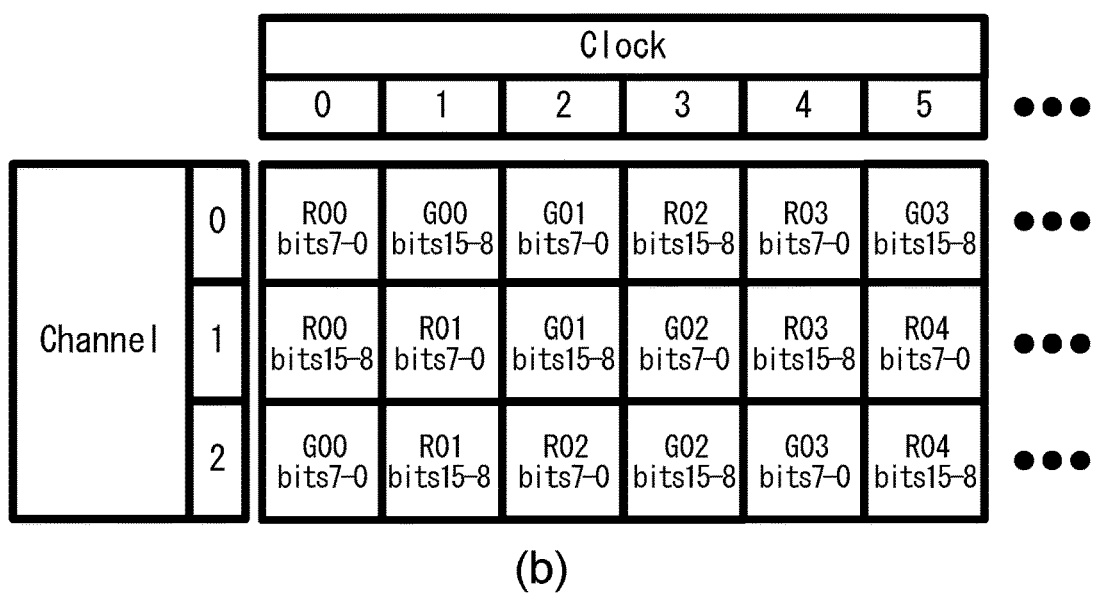
Figure 11:
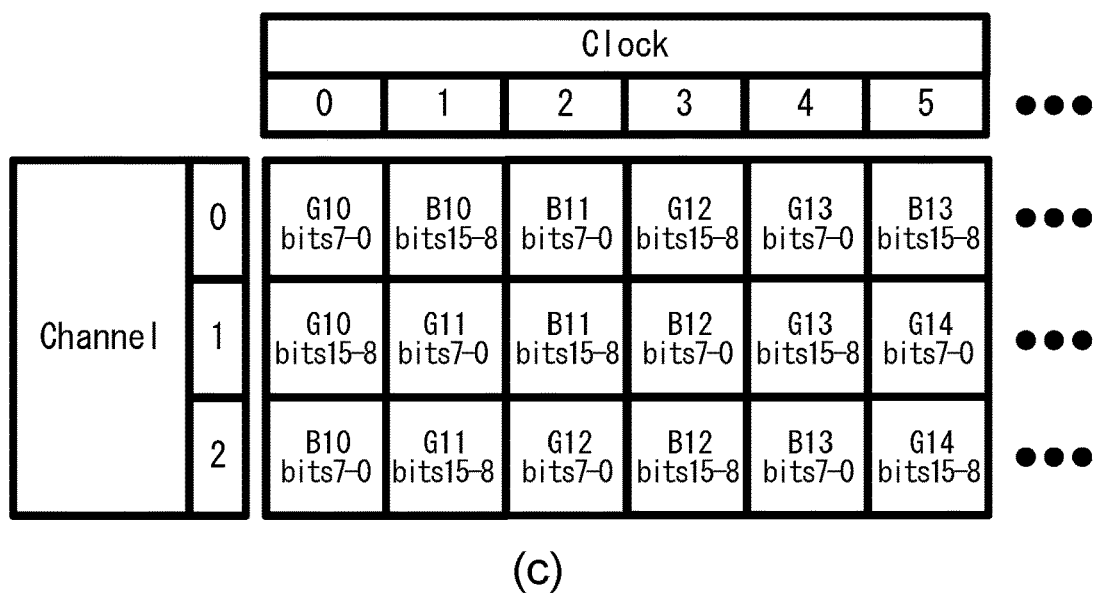

(3) FIG. 11 is a view for illustrating an example of a transmission format in a case where the RAW data 241 is output from an image-capturing device 20 in a third variation via the HDMI cable 30. FIG. 11(*a*) shows an example of an arrangement of R pixel data 4, G pixel data 5, and B pixel data 6 of the RAW data 241, each pixel data having 16 bits, in the data memory 24 in a pixel interleaving format in a case where the RAW data 241 is stored instead of the YUV444 data configured of 8-bit components for transmission in the YUV444 format 24-bit mode. As shown, in a row L1, pixel data of the 16-bit pixels R00, G00, R01, G01, R02, G02, R03, G03, and R04 are arranged in sequence in the horizontal direction Ma. Further, as shown, in a row L2 subsequent to the row L1, pixel data of the 16-bit pixels G10, B10, G11, B11, G12, B12, G13, B13, and G14 are arranged in sequence in the horizontal direction Ma.

In FIGS. 11(*b*) and 11(*c*), a total of 24 bits of data can be contained in each clock section. As with the example of the YUV444 format 24-bit mode, 24 bits of data for a total of one and a half pixels each having 16 bits constituting the RAW data 241 are contained in a total of three fields in transmission channels each containing 8 bits during one clock section.

In the example shown in FIG. 11(*b*), bits 0 to 7 of the 16-bit pixel data of the pixel R00 arranged in the row L1 are contained in the channel 0 during the clock section 0 and bits 8 to 15 of the 16-bit pixel data of the pixel R00 are contained in the channel 1 during the clock section 0. Bits 0 to 7 of the 16-bit pixel data of the pixel G00 arranged in the row L1 are contained in the channel 2 during the clock section 0 and bits 8 to 15 of the 16-bit pixel data of the pixel G00 are contained in the channel 0 during the clock section 1. Bits 0 to 7 of the 16-bit pixel data of the pixel R01 arranged in the row L1 are contained in the channel 1 during the clock section 1 and bits 8 to 15 of the 16-bit pixel data of the pixel R01 are contained in the channel 2 during the clock section 1. Pixel data of the pixels G01, R02, G02, R03, G03, and R04 arranged in the row L1 are also subjected to the same mapping processing as that for pixel data of the pixels R00, G00, R01, G01, and R01.

In the example shown in FIG. 11(*c*), bits 0 to 7 of the 16-bit pixel data of the pixel G10 arranged in the row L2 are contained in the channel 0 during the clock section 0 and bits 8 to 15 of the 16-bit pixel data of the pixel G10 are contained in the channel 1 during the clock section 0. Bits 0 to 7 of the 16-bit pixel data of the pixel B10 arranged in the row L2 are contained in the channel 2 during the clock section 0 and bits 8 to 15 of the 16-bit pixel data of the pixel B10 are contained in the channel 0 during the clock section 1. Bits 0 to 7 of the 16-bit pixel data of the pixel G11 arranged in the row L2 are contained in the channel 1 during the clock section 1 and bits 8 to 15 of the 16-bit pixel data of the pixel G11 are contained in the channel 2 during the clock section 1. Pixel data of the pixels B11, G12, B12, G13, B13, and G14 arranged in the row L2 are also subjected to the same mapping processing as that for pixel data of the pixels G10, B10, and G11. According to the third variation, the image-capturing device 20 can efficiently output the RAW data 241 to the outside, using the existing HDMI cable 30.

Figure 12:
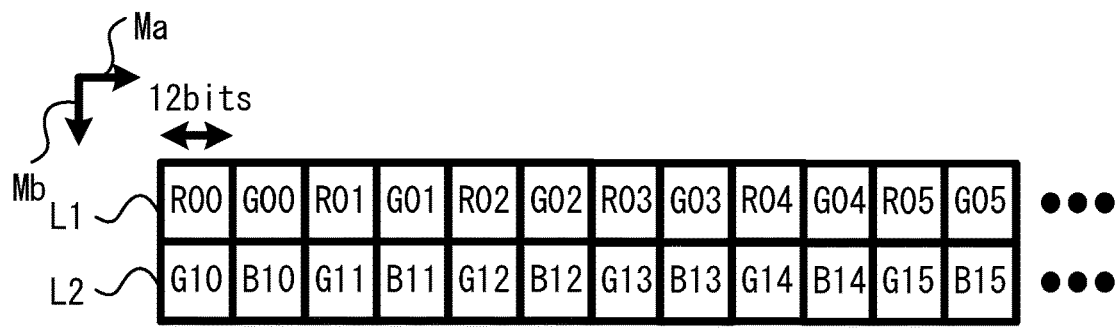
FIG. 12 is a view for illustrating an example of RAW data output using a transmission format for YUV data in a fourth variation.
Figure 12:
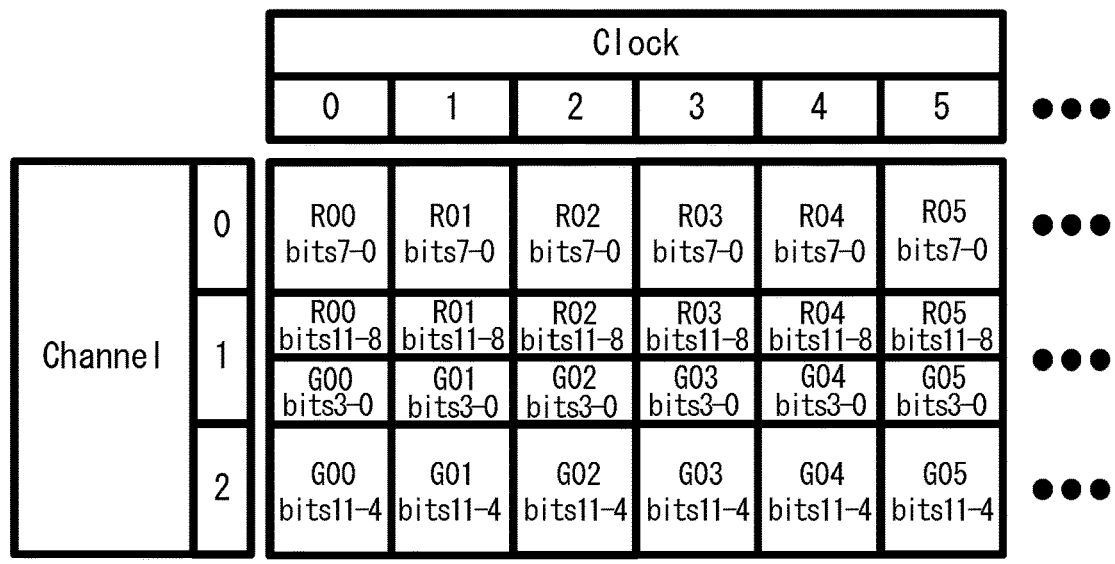
Figure 12:
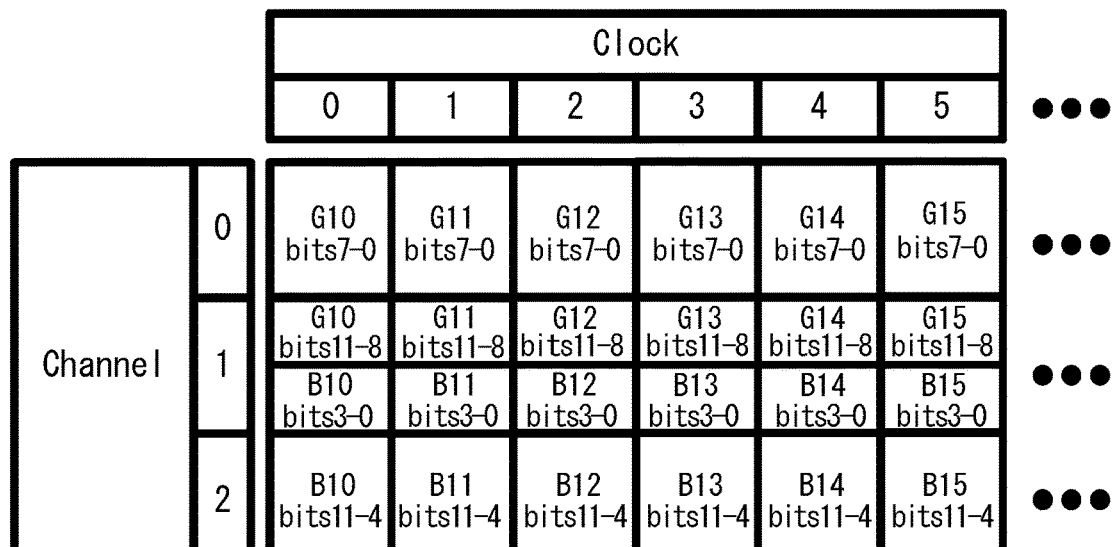

(4) FIG. 12 is a view for illustrating an example of a transmission format in a case where the RAW data 241 is output from an image-capturing device 20 in a fourth variation via the HDMI cable 30. FIG. 12(*a*) shows an example of an arrangement of R pixel data 4, G pixel data 5, and B pixel data 6 of the RAW data 241, each pixel data having 12 bits, in the data memory 24 in a pixel interleaving format in a case where the RAW data 241 is stored instead of the YUV444 data configured of 8-bit components for transmission in the YUV444 format 24-bit mode. As shown, in a row L1, pixel data of the 12-bit pixels R00, G00, R01, G01, R02, G02, R03, G03, R04, G04, R05, and G05 are arranged in sequence in the horizontal direction Ma. As shown, in a row L2 subsequent to the row L1, pixel data of the 12-bit pixels G10, B10, G11, B11, G12, B12, G13, B13, G14, B14, G15, and B15 are arranged in sequence in the horizontal direction Ma.

In FIGS. 12(*b*) and 12(*c*), a total of 24 bits of data can be contained in each clock section. As with the example of the YUV444 format 24-bit mode, 24 bits of data for a total of two pixels each having 12 bits constituting the RAW data 241 are contained in fields in transmission channels each containing 8 bits during one clock section.

In the example shown in FIG. 12(*b*), bits 0 to 7 of the 12-bit pixel data of the pixel R00 arranged in the row L1 are contained in the channel 0 during the clock section 0 and bits 8 to 11 of the 12-bit pixel data of the pixel R00 are contained in the channel 1 during the clock section 0. Bits 0 to 3 of the 12-bit pixel data of the pixel G00 arranged in the row L1 are contained in the channel 1 during the clock section 0 and bits 4 to 11 of the 12-bit pixel data of the pixel G00 are contained in the channel 2 during the clock section 0. Pixel data of the pixels R01, G01, R02, G02, R03, G03, R04, G04, R05, and G05 arranged in the row L1 are also subjected to the same mapping processing as that for pixel data of the pixels R00 and G00.

In the example shown in FIG. 12(*c*), bits 0 to 7 of the 12-bit pixel data of the pixel G10 arranged in the row L2 are contained in the channel 0 during the clock section 0 and bits 8 to 11 of the 12-bit pixel data of the pixel G10 are contained in the channel 1 during the clock section 0. Bits 0 to 3 of the 12-bit pixel data of the pixel B10 arranged in the row L2 are contained in the channel 1 during the clock section 0 and bits 4 to 11 of the 12-bit pixel data of the pixel B10 are contained in the channel 2 during the clock section 0. Pixel data of the pixels G11, B11, G12, B12, G13, B13, G14, B14, G15, and B15 arranged in the row L2 are also subjected to the same mapping processing as that for pixel data of the pixels G10 and B10.

According to the fourth variation, the image-capturing device 20 can efficiently output the RAW data 241 to the outside, using the existing HDMI cable 30. Further, positions of container boundaries between pixel data of the RAW data 241 are included in positions of container boundaries between pixel data of the development data 242 in the YUV444 format 24-bit mode. The image-capturing device 20 and the image recording device 40 can support the transmission process of the RAW data 241 as long as they support the transmission format for the development data 242.

Figure 13:
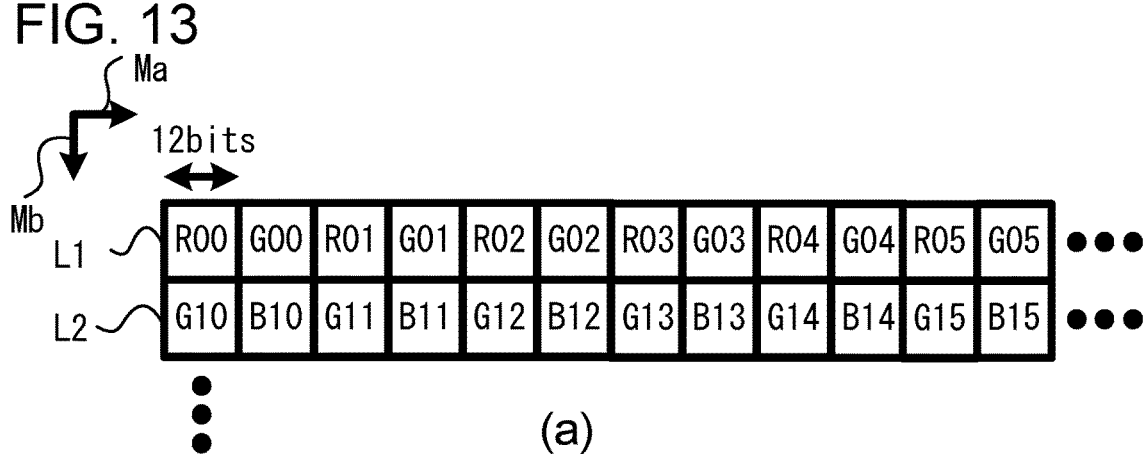
FIG. 13 is a view for illustrating an example of RAW data output using a transmission format for YUV data in a fifth variation.
Figure 13:
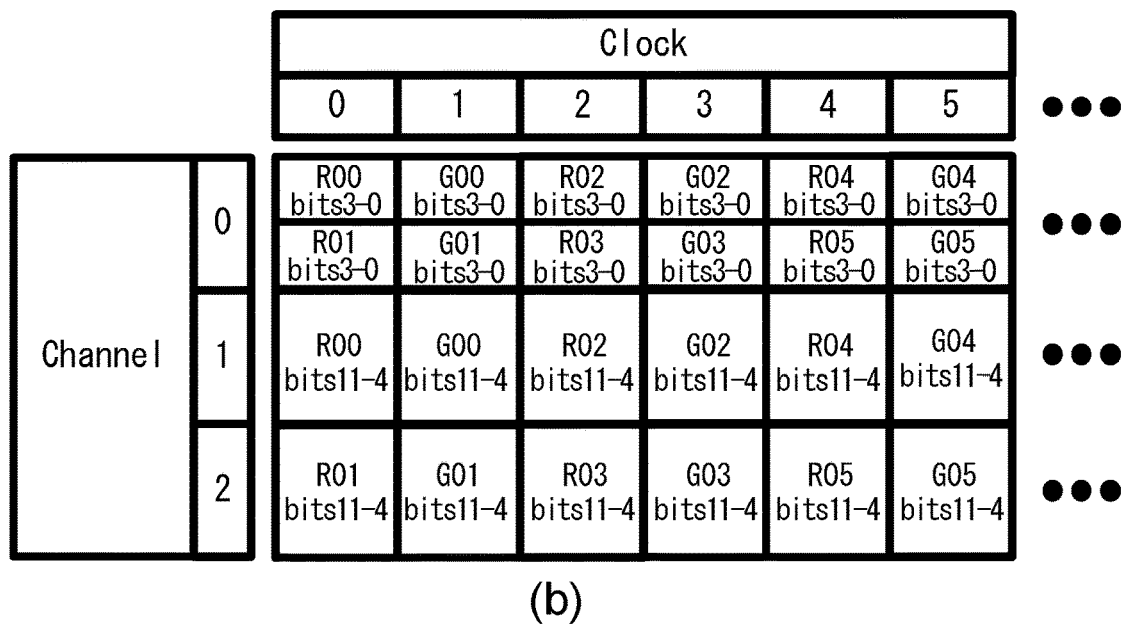
Figure 13:
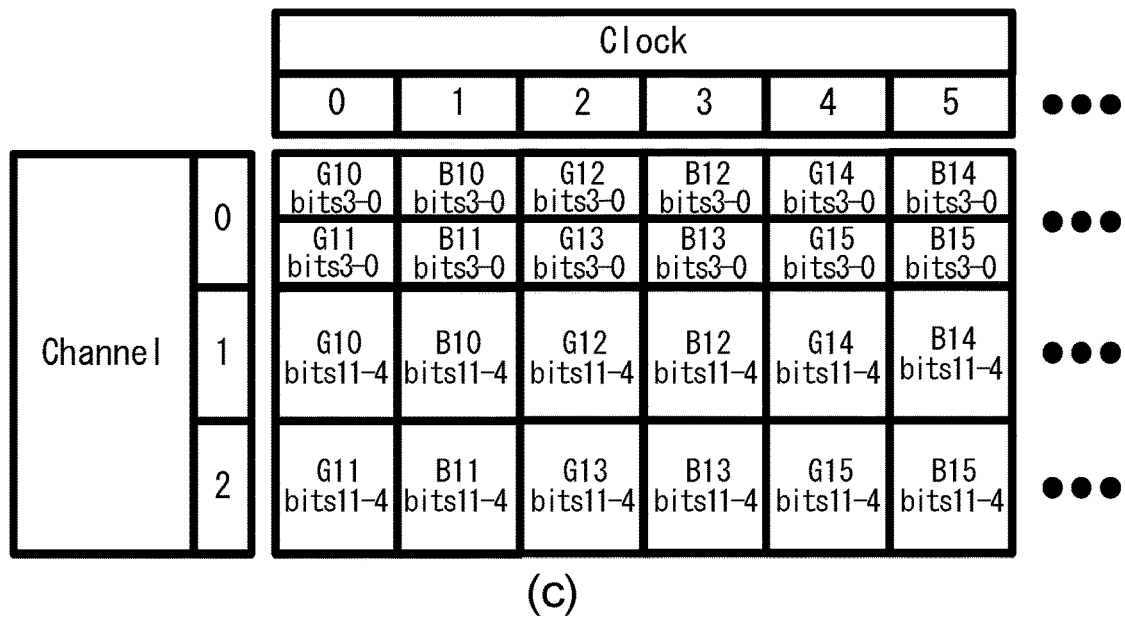

(5) FIG. 13 is a view for illustrating an example of a transmission format in a case where the RAW data 241 is output from an image-capturing device 20 in a fifth variation via the HDMI cable 30. FIG. 13(*a*) shows an example of an arrangement of R pixel data 4, G pixel data 5, and B pixel data 6 of the RAW data 241, each pixel data having 12 bits, in the data memory 24 in a pixel interleaving format in a case where the RAW data 241 is stored instead of the YUV422 data configured of 12-bit components for transmission in the YUV422 format 24-bit mode. As shown, in a row L1, pixel data of the 12-bit pixels R00, G00, R01, G01, R02, G02, R03, G03, R04, G04, R05, and G05 are arranged in sequence in the horizontal direction Ma. As shown, in a row L2 subsequent to the row L1, pixel data of the 12-bit pixels G10, B10, G11, B11, G12, B12, G13, B13, G14, B14, G15, and B15 are arranged in sequence in the horizontal direction Ma.

In FIGS. 13(*b*) and 13(*c*), a total of 24 bits of data can be contained in each clock section. As with the example of the YUV422 format 24-bit mode, 24 bits of data for a total of two pixels each having 12 bits constituting the RAW data 241 are contained in fields in transmission channels each containing 8 bits during one clock section.

In the example shown in FIG. 13(*b*), bits 0 to 3 of the 12-bit pixel data of the pixel R00 arranged in the row L1 are contained in the channel 0 during the clock section 0 and bits 4 to 11 of the 12-bit pixel data of the pixel R00 are contained in the channel 1 during the clock section 0. Bits 0 to 3 of the 12-bit pixel data of the pixel R01 arranged in the row L1 are contained in the channel 0 during the clock section 0 and bits 4 to 11 of the 12-bit pixel data of the pixel R01 are contained in the channel 2 during the clock section 0. Bits 0 to 3 of the 12-bit pixel data of the pixel G00 arranged in the row L1 are contained in the channel 0 during the clock section 1 and bits 4 to 11 of the 12-bit pixel data of the pixel G00 are contained in the channel 1 during the clock section 1. Bits 0 to 3 of the 12-bit pixel data of the pixel G01 arranged in the row L1 are contained in the channel 0 during the clock section 1 and bits 4 to 11 of the 12-bit pixel data of the pixel G01 are contained in the channel 2 during the clock section 1. Pixel data of the pixels R02, G02, R03, G03, R04, G04, R05, and G05 arranged in the row L1 are also subjected to the same mapping processing as that for pixel data of the pixels R00, G00, R01, and G01.

In the example shown in FIG. 13(*c*), bits 0 to 3 of the 12-bit pixel data of the pixel G10 arranged in the row L2 are contained in the channel 0 during the clock section 0 and bits 4 to 11 of the 12-bit pixel data of the pixel G10 are contained in the channel 1 during the clock section 0. Bits 0 to 3 of the 12-bit pixel data of the pixel G11 arranged in the row L2 are contained in the channel 0 during the clock section 0 and bits 4 to 11 of the 12-bit pixel data of the pixel G11 are contained in the channel 2 during the clock section 0. Bits 0 to 3 of the 12-bit pixel data of the pixel B10 arranged in the row L2 are contained in the channel 0 during the clock section 1 and bits 4 to 11 of the 12-bit pixel data of the pixel B10 are contained in the channel 1 during the clock section 1. Bits 0 to 3 of the 12-bit pixel data of the pixel B11 arranged in the row L2 are contained in the channel 0 during the clock section 1 and bits 4 to 11 of the 12-bit pixel data of the pixel B11 are contained in the channel 2 during the clock section 1. Pixel data of the pixels G12, B12, G13, B13, G14, B14, G15, and B15 arranged in the row L2 are also subjected to the same mapping processing as that for pixel data of the pixels G10, B10, G11, and B11.

According to the fifth variation, the image-capturing device 20 can efficiently output the RAW data 241 to the outside, using the existing HDMI cable 30. Further, positions of container boundaries between pixel data of the RAW data 241 are included in positions of container boundaries between pixel data of the development data 242 in the YUV422 format 24-bit mode. The image-capturing device 20 and the image recording device 40 can support the transmission process of the RAW data 241 as long as they support the transmission format for the development data 242.

Figure 14:
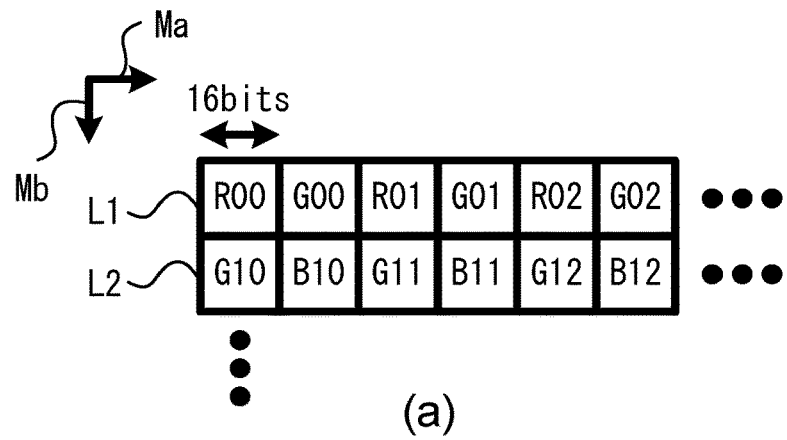
FIG. 14 is a view for illustrating an example of RAW data output using a transmission format for YUV data in a sixth variation.
Figure 14:
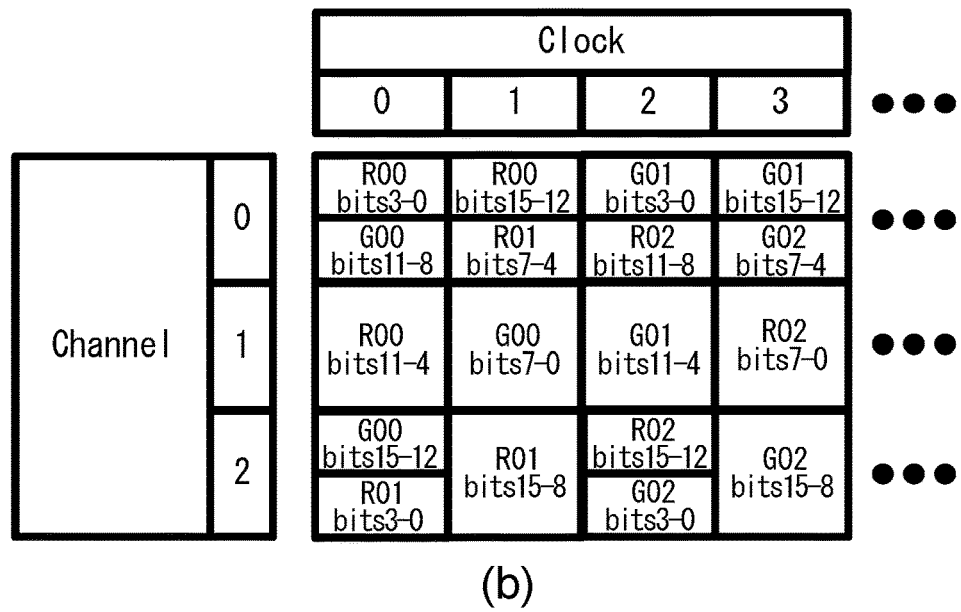
Figure 14:
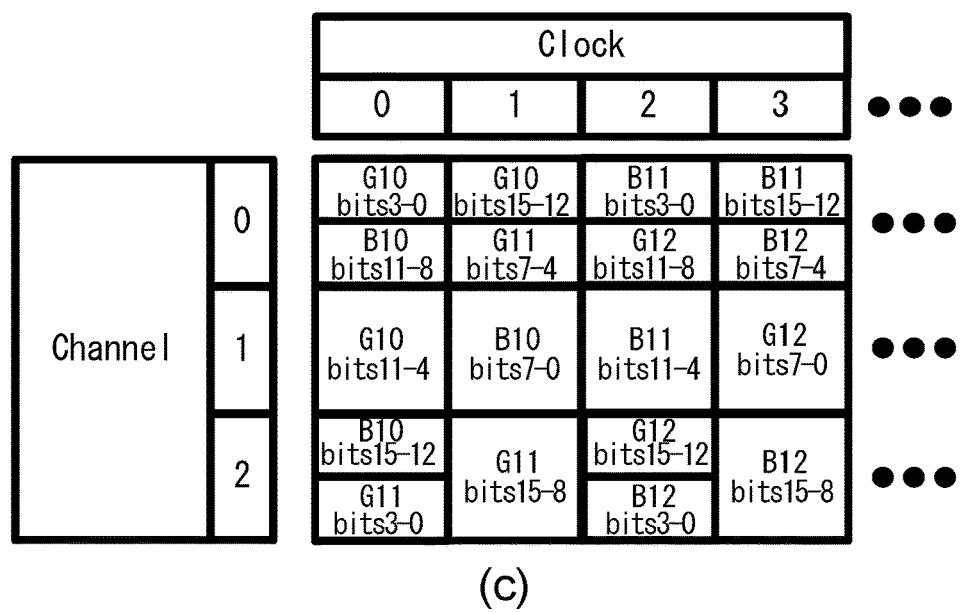

(6) FIG. 14 is a view for illustrating an example of a transmission format in a case where the RAW data 241 is output from an image-capturing device 20 in a sixth variation via the HDMI cable 30. FIG. 14(a) shows an example of an arrangement of R pixel data 4, G pixel data 5, and B pixel data 6 of the RAW data 241, each pixel data having 16 bits, in the data memory 24 in a pixel interleaving format in a case where the RAW data 241 is stored instead of the YUV422 data configured of 12-bit components for transmission in the YUV422 format 24-bit mode. As shown, in a row L1, pixel data of the 16-bit pixels R00, G00, R01, G01, R02, and G02 are arranged in sequence in the horizontal direction Ma. As shown, in a row L2 subsequent to the row L1, pixel data of the 16-bit pixels G10, B10, G11, B11, G12, and B12 are arranged in sequence in the horizontal direction Ma.

In FIGS. 14(b) and 14(c), a total of 24 bits of data can be contained in each clock section. As with the example of the YUV422 format 24-bit mode, 24 bits of data for a total of one and a half pixels each having 16 bits constituting the RAW data 241 are contained in a total of three fields in transmission channels each containing 8 bits during one clock section.

In the example shown in FIG. 14(b), bits 0 to 3 of the 16-bit pixel data of the pixel R00 arranged in the row L1 are contained in the channel 0 during the clock section 0, bits 4 to 11 of the 16-bit pixel data of the pixel R00 are contained in the channel 1 during the clock section 0, and bits 12 to 15 of the 16-bit pixel data of the pixel R00 are contained in the channel 0 during the clock section 1. Bits 0 to 7 of the 16-bit pixel data of the pixel G00 arranged in the row L1 are contained in the channel 1 during the clock section 1, bits 8 to 11 of the 16-bit pixel data of the pixel G00 are contained in the channel 0 during the clock section 0, and bits 12 to 15 of the 16-bit pixel data of the pixel G00 are contained in the channel 2 during the clock section 0. Bits 0 to 3 of the 16-bit pixel data of the pixel R01 arranged in the row L1 are contained in the channel 2 during the clock section 0, bits 4 to 7 of the 16-bit pixel data of the pixel R01 are contained in the channel 0 during the clock section 1, and bits 8 to 15 of the 16-bit pixel data of the pixel R01 are contained in the channel 2 during the clock section 1. Pixel data of the pixels G01, R02, and G02 arranged in the row L1 are also subjected to the same mapping processing as that for pixel data of the pixels R00, G00, and R01.

In the example shown in FIG. 14(c), bits 0 to 3 of the 16-bit pixel data of the pixel G10 arranged in the row L2 are contained in the channel 0 during the clock section 0, bits 4 to 11 of the 16-bit pixel data of the pixel G10 are contained in the channel 1 during the clock section 0, and bits 12 to 15 of the 16-bit pixel data of the pixel G10 are contained in the channel 0 during the clock section 1. Bits 0 to 7 of the 16-bit pixel data of the pixel B10 arranged in the row L2 are contained in the channel 1 during the clock section 1, bits 8 to 11 of the 16-bit pixel data of the pixel B10 are contained in the channel 0 during the clock section 0, and bits 12 to 15 of the 16-bit pixel data of the pixel B10 are contained in the channel 2 during the clock section 0. Bits 0 to 3 of the 16-bit pixel data of the pixel G11 arranged in the row L2 are contained in the channel 2 during the clock section 0, bits 4 to 7 of the 16-bit pixel data of the pixel G11 are contained in the channel 0 during the clock section 1, and bits 8 to 15 of the 16-bit pixel data of the pixel G11 are contained in the channel 2 during the clock section 1. Pixel data of the pixels B11, G12, and B12 arranged in the row L2 are also subjected to the same mapping processing as that for pixel data of the pixels G10, B10, and G11. According to the sixth variation, the image-capturing device 20 can efficiently output the RAW data 241 to the outside, using the existing HDMI cable 30.

Figure 15:
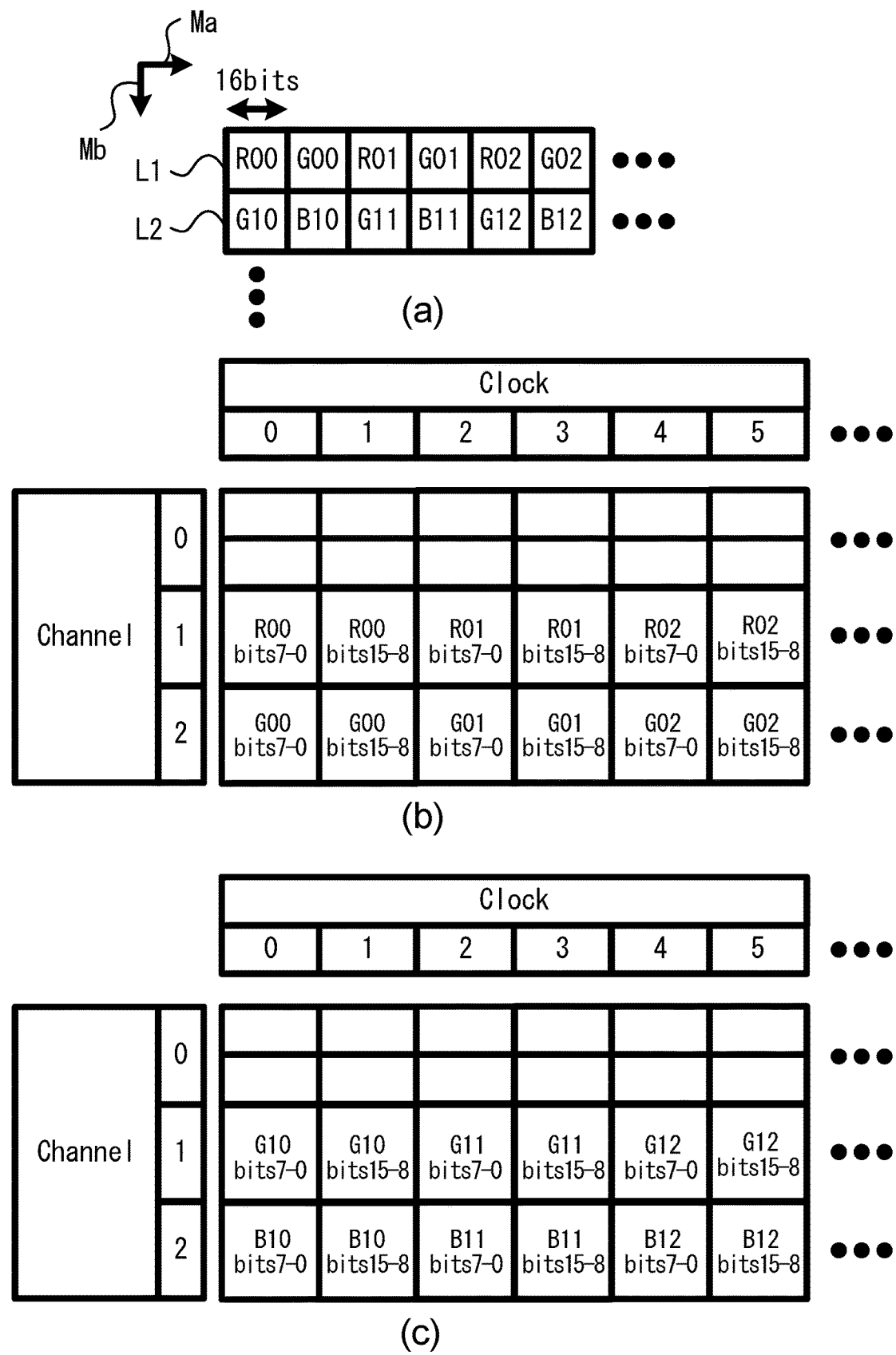
FIG. 15 is a view for illustrating an example of RAW data output using a transmission format for YUV data in a seventh variation.

(7) FIG. 15 is a view for illustrating an example of a transmission format in a case where the RAW data 241 is output from an image-capturing device 20 in a seventh variation via the HDMI cable 30. FIG. 15(a) shows an example of an arrangement of R pixel data 4, G pixel data 5, and B pixel data 6 of the RAW data 241, each pixel data having 16 bits, in the data memory 24 in a pixel interleaving format in a case where the RAW data 241 is stored instead of the YUV422 data configured of 8-bit components for transmission in the YUV422 format 16-bit mode. As shown, in a row L1, pixel data of the 16-bit pixels R00, G00, R01, G01, R02, and G02 are arranged in sequence in the horizontal direction Ma. As shown, in a row L2 subsequent to the row L1, pixel data of the 16-bit pixels G10, B10, G11, B11, G12, and B12 are arranged in sequence in the horizontal direction Ma.

In FIGS. 15(b) and 15(c), a total of 24 bits of data can be contained in each clock section. As with the example of the YUV422 format 16-bit mode, 16 bits of data for a total of one pixel having 16 bits constituting the RAW data 241 are contained in a total of two fields each containing 8 bits, in two channels except for the transmission channel 0 during one clock section.

In the example shown in FIG. 15(b), bits 0 to 7 of the 16-bit pixel data of the pixel R00 arranged in the row L1 are contained in the channel 1 during the clock section 0 and bits 8 to 15 of the 16-bit pixel data of the pixel R00 are contained in the channel 1 during the clock section 1. Bits 0 to 7 of the 16-bit pixel data of the pixel G00 arranged in the row L1 are contained in the channel 2 during the clock section 0 and bits 8 to 15 of the 16-bit pixel data of the pixel G00 are contained in the channel 2 during the clock section 1. Pixel data of the pixels R01, G01, R02, and G02 arranged in the row L1 are also subjected to the same mapping processing as that for pixel data of the pixels R00 and G00.

In the example shown in FIG. 15(c), bits 0 to 7 of the 16-bit pixel data of the pixel G10 arranged in the row L2 are contained in the channel 1 during the clock section 0 and bits 8 to 15 of the 16-bit pixel data of the pixel G10 are contained in the channel 1 during the clock section 1. Bits 0 to 7 of the 16-bit pixel data of the pixel B10 arranged in the row L2 are contained in the channel 2 during the clock section 0 and bits 8 to 15 of the 16-bit pixel data of the pixel B10 are contained in the channel 2 during the clock section 1. Pixel data of the pixels G11, B11, G12, and B12 arranged in the row L2 are also subjected to the same mapping processing as that for pixel data of the pixels G10 and B10.

According to the seventh variation, positions of container boundaries between pixel data of the RAW data 241 are included in positions of container boundaries between pixel data of the development data 242 in the YUV422 format 16-bit mode. The image-capturing device 20 and the image recording device 40 can support the transmission process of the RAW data 241 as long as they support the transmission format for the development data 242.

Figure 16:
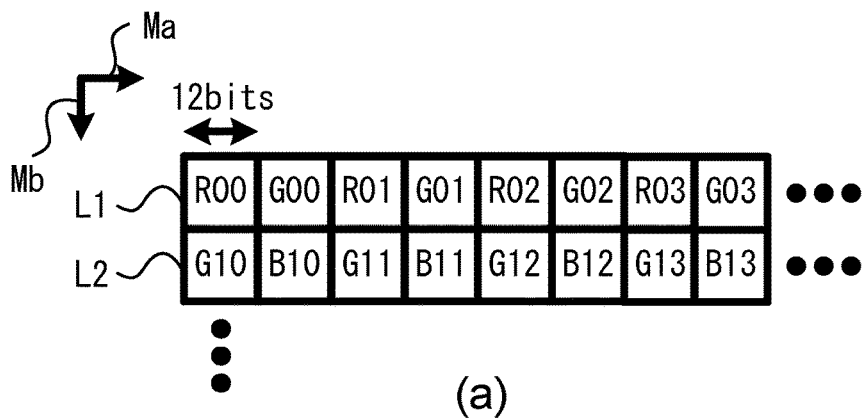
FIG. 16 is a view for illustrating an example of RAW data output using a transmission format for YUV data in an eighth variation.
Figure 16:
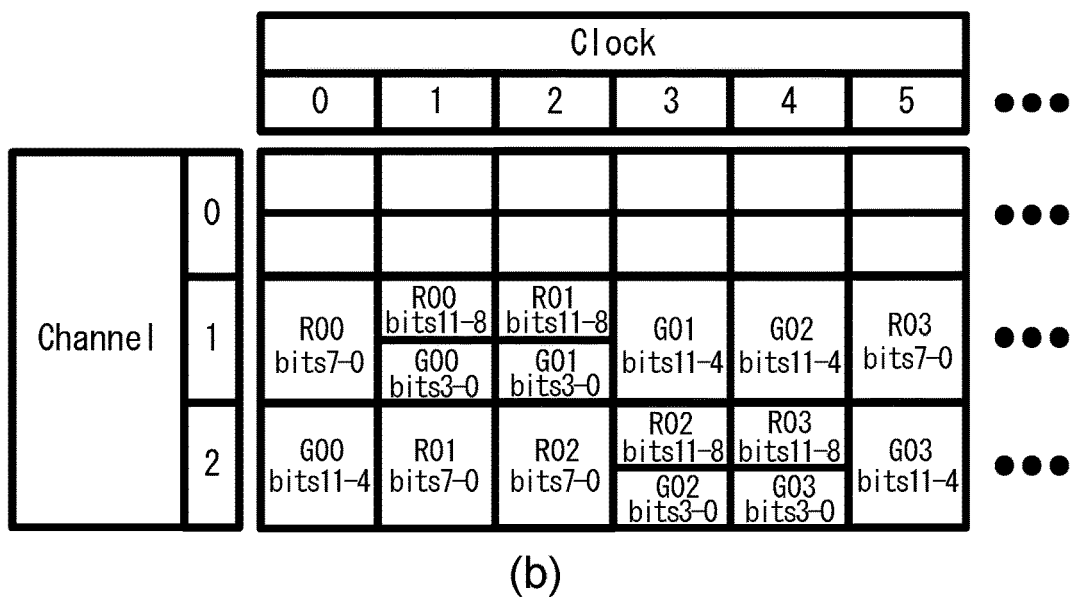
Figure 16:
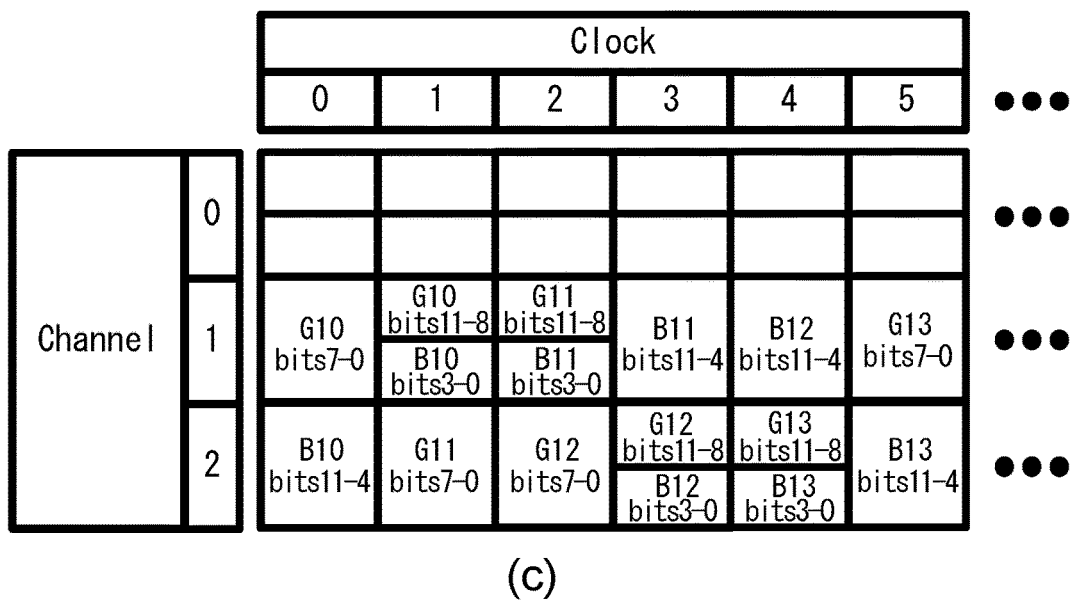

(8) FIG. 16 is a view for illustrating an example of a transmission format in a case where the RAW data 241 is output from an image-capturing device 20 in an eighth variation via the HDMI cable 30. FIG. 16(*a*) shows an example of an arrangement of R pixel data 4, G pixel data 5, and B pixel data 6 of the RAW data 241, each pixel data having 12 bits, in the data memory 24 in a pixel interleaving format in a case where the RAW data 241 is stored instead of the YUV422 data configured of 8-bit components for transmission in the YUV422 format 16-bit mode. As shown, in a row L1, pixel data of the 12-bit pixels R00, G00, R01, G01, R02, G02, R03, and G03 are arranged in sequence in the horizontal direction Ma. As shown, in a row L2 subsequent to the row L1, pixel data of the 12-bit pixels G10, B10, G11, B11, G12, B12, G13, and B13 are arranged in sequence in the horizontal direction Ma.

In FIGS. 16(*b*) and 16(*c*), a total of 24 bits of data can be contained in each clock section. As with the example of the YUV422 format 16-bit mode, 16 bits of data, that is 12 bits for one pixel constituting the RAW data 241 and remaining 4 bits, are contained in a total of two fields each containing 8 bits, in two channels except for the transmission channel 0 during one clock section.

In the example shown in FIG. 16(*b*), bits 0 to 7 of the 12-bit pixel data of the pixel R00 arranged in the row L1 are contained in the channel 1 during the clock section 0 and bits 8 to 11 of the 12-bit pixel data of the pixel R00 are contained in the channel 1 during the clock section 1. Bits 4 to 11 of the 12-bit pixel data of the pixel G00 arranged in the row L1 are contained in the channel 2 during the clock section 0 and bits 0 to 3 of the 12-bit pixel data of the pixel G00 are contained in the channel 1 during the clock section 1. Bits 0 to 7 of the 12-bit pixel data of the pixel R01 arranged in the row L1 are contained in the channel 2 during the clock section 1 and bits 8 to 11 of the 12-bit pixel data of the pixel R01 are contained in the channel 1 during the clock section 2. Bits 0 to 3 of the 12-bit pixel data of the pixel G01 arranged in the row L1 are contained in the channel 1 during the clock section 2 and bits 4 to 11 of the 12-bit pixel data of the pixel G01 are contained in the channel 1 during the clock section 3.

Bits 0 to 7 of the 12-bit pixel data of the pixel R02 arranged in the row L1 are contained in the channel 2 during the clock section 2 and bits 8 to 11 of the 12-bit pixel data of the pixel R02 are contained in the channel 2 during the clock section 3. Bits 0 to 3 of the 12-bit pixel data of the pixel G02 arranged in the row L1 are contained in the channel 2 during the clock section 3 and bits 4 to 11 of the 12-bit pixel data of the pixel G02 are contained in the channel 1 during the clock section 4. Bits 8 to 11 of the 12-bit pixel data of the pixel R03 arranged in the row L1 are contained in the channel 2 during the clock section 4 and bits 0 to 7 of the 12-bit pixel data of the pixel R03 are contained in the channel 1 during the clock section 5. Bits 0 to 3 of the 12-bit pixel data of the pixel G03 arranged in the row L1 are contained in the channel 2 during the clock section 4 and bits 4 to 11 of the 12-bit pixel data of the pixel G03 are contained in the channel 2 during the clock section 5.

In the example shown in FIG. 16(*c*), bits 0 to 7 of the 12-bit pixel data of the pixel G10 arranged in the row L2 are contained in the channel 1 during the clock section 0 and bits 8 to 11 of the 12-bit pixel data of the pixel G10 are contained in the channel 1 during the clock section 1. Bits 4 to 11 of the 12-bit pixel data of the pixel B10 arranged in the row L2 are contained in the channel 2 during the clock section 0 and bits 0 to 3 of the 12-bit pixel data of the pixel B10 are contained in the channel 1 during the clock section 1. Bits 0 to 7 of the 12-bit pixel data of the pixel G11 arranged in the row L2 are contained in the channel 2 during the clock section 1 and bits 8 to 11 of the 12-bit pixel data of the pixel G11 are contained in the channel 1 during the clock section 2. Bits 0 to 3 of the 12-bit pixel data of the pixel B11 arranged in the row L2 are contained in the channel 1 during the clock section 2 and bits 4 to 11 of the 12-bit pixel data of the pixel B11 are contained in the channel 1 during the clock section 3.

Bits 0 to 7 of the 12-bit pixel data of the pixel G12 arranged in the row L2 are contained in the channel 2 during the clock section 2 and bits 8 to 11 of the 12-bit pixel data of the pixel G12 are contained in the channel 2 during the clock section 3. Bits 0 to 3 of the 12-bit pixel data of the pixel B12 arranged in the row L2 are contained in the channel 2 during the clock section 3 and bits 4 to 11 of the 12-bit pixel data of the pixel B12 are contained in the channel 1 during the clock section 4. Bits 8 to 11 of the 12-bit pixel data of the pixel G13 arranged in the row L2 are contained in the channel 2 during the clock section 4 and bits 0 to 7 of the 12-bit pixel data of the pixel G13 are contained in the channel 1 during the clock section 5. Bits 0 to 3 of the 12-bit pixel data of the pixel B13 arranged in the row L2 are contained in the channel 2 during the clock section 4 and bits 4 to 11 of the 12-bit pixel data of the pixel B13 are contained in the channel 2 during the clock section 5. According to the eighth variation, the image-capturing device 20 can efficiently output the RAW data 241 to the outside, using the existing HDMI cable 30.

Figure 17:
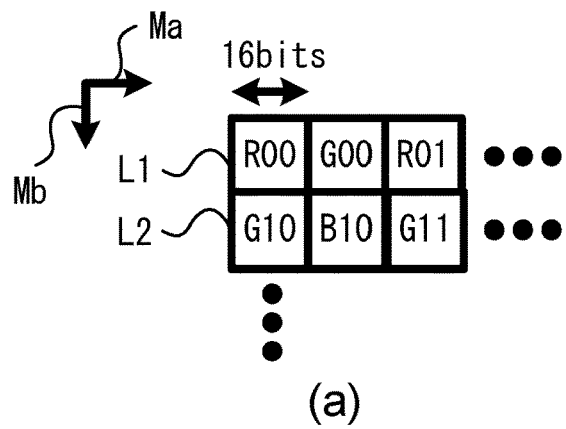
FIG. 17 is a view for illustrating an example of RAW data output using a transmission format for YUV data in a ninth variation.
Figure 17:
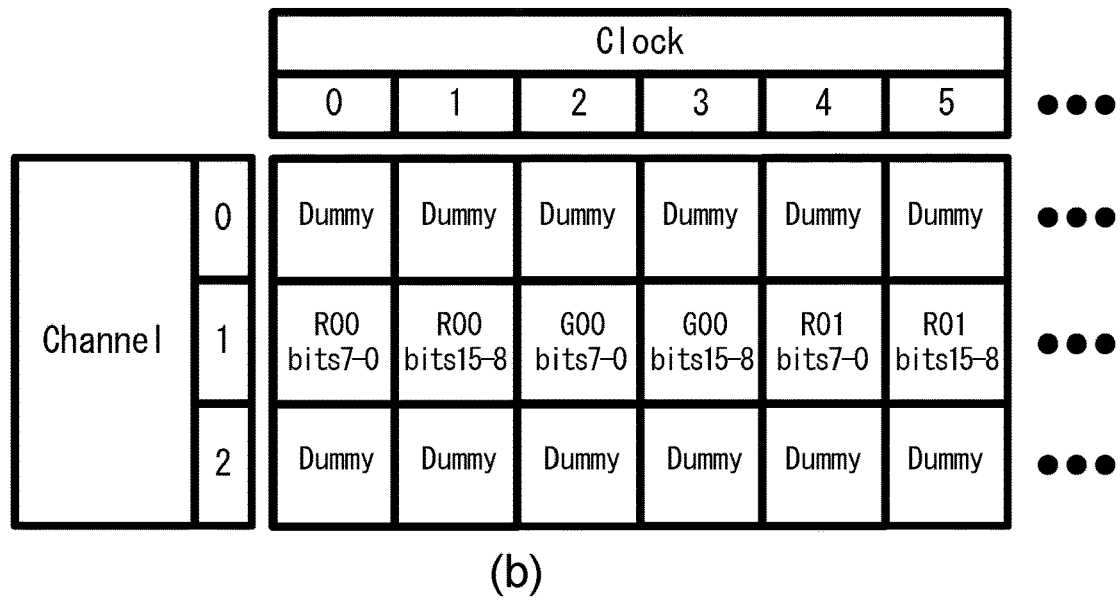
Figure 17:
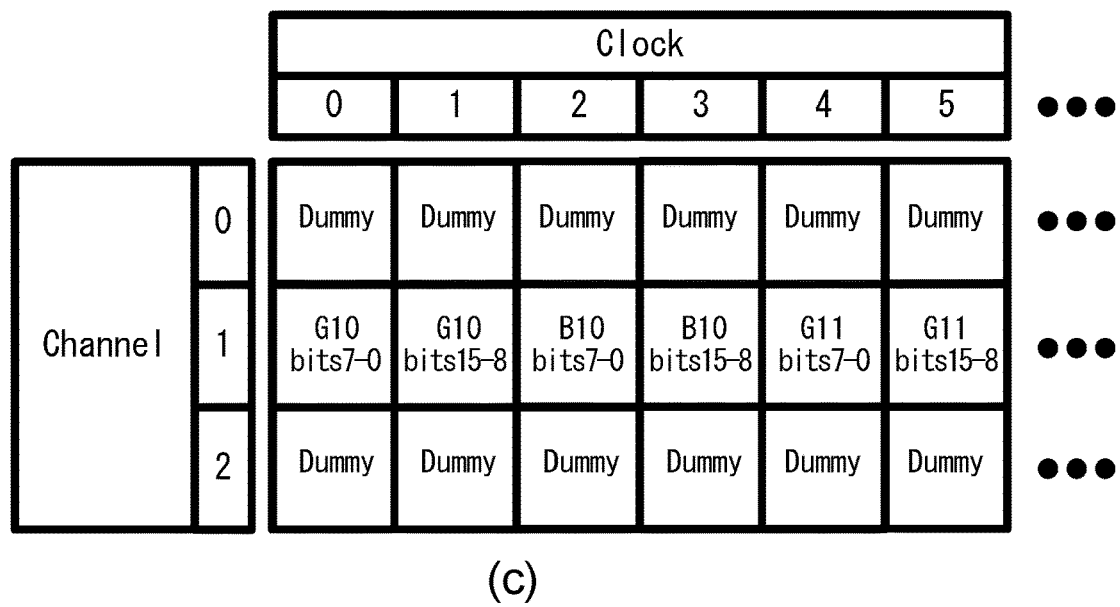

(9) FIG. 17 is a view for illustrating an example of a transmission format in a case where the RAW data 241 is output from an image-capturing device 20 in a ninth variation via the HDMI cable 30. FIG. 17(*a*) shows an example of an arrangement of R pixel data 4, G pixel data 5, and B pixel data 6 of the RAW data 241, each pixel data having 16 bits, in the data memory 24 in a planar format or a semi-planar format in a case where the RAW data 241 is stored instead of the YUV422 data configured of 8-bit components for transmission in the YUV422 format 16-bit mode. Note that an example of an arrangement of the D pixel data 7, which is dummy data, is omitted in the figure. As shown, in a row L1, pixel data of the 16-bit pixels R00, G00, and R01 are arranged in sequence in the horizontal direction Ma. Further, as shown, in a row L2 subsequent to the row L1, pixel data of the 16-bit pixels G10, B10, and G11 are arranged in sequence in the horizontal direction Ma.

In FIGS. 17(*b*) and 17(*c*), a total of 24 bits of data can be contained in each clock section. As with the example of the YUV422 format 16-bit mode, two clock sections are used to contain 16 bits of data for a total of one pixel having 16 bits constituting the RAW data 241 in a total of two fields each containing 8 bits in one channel, i.e., the transmission channel 1.

In the example shown in FIG. 17(*b*), bits 0 to 7 of the 16-bit pixel data of the pixel R00 arranged in the row L1 are contained in the channel 1 during the clock section 0 and bits 8 to 15 of the 16-bit pixel data of the pixel R00 are contained in the channel 1 during the clock section 1. Bits 0 to 7 of the 16-bit pixel data of the pixel G00 arranged in the row L1 are contained in the channel 1 during the clock section 2 and bits 8 to 15 of the 16-bit pixel data of the pixel G00 are contained in the channel 1 during the clock section 3. Bits 0 to 7 of the 16-bit pixel data of the pixel R01 arranged in the row L1 are contained in the channel 1 during the clock section 4 and bits 8 to 15 of the 16-bit pixel data of the pixel R01 are contained in the channel 1 during the clock section 5.

In the example shown in FIG. 17(c), bits 0 to 7 of the 16-bit pixel data of the pixel G10 arranged in the row L2 are contained in the channel 1 during the clock section 0 and bits 8 to 15 of the 16-bit pixel data of the pixel G10 are contained in the channel 1 during the clock section 1. Bits 0 to 7 of the 16-bit pixel data of the pixel B10 arranged in the row L2 are contained in the channel 1 during the clock section 2 and bits 8 to 15 of the 16-bit pixel data of the pixel B10 are contained in the channel 1 during the clock section 3. Bits 0 to 7 of the 16-bit pixel data of the pixel G11 arranged in the row L2 are contained in the channel 1 during the clock section 4 and bits 8 to 15 of the 16-bit pixel data of the pixel G11 are contained in the channel 1 during the clock section 5.

According to the ninth variation, positions of container boundaries between pixel data of the RAW data 241 are included in positions of container boundaries between pixel data of the development data 242 in the YUV422 format 16-bit mode. The image-capturing device 20 and the image recording device 40 can support the transmission process of the RAW data 241 as long as they support the transmission format for the development data 242.

Figure 18:
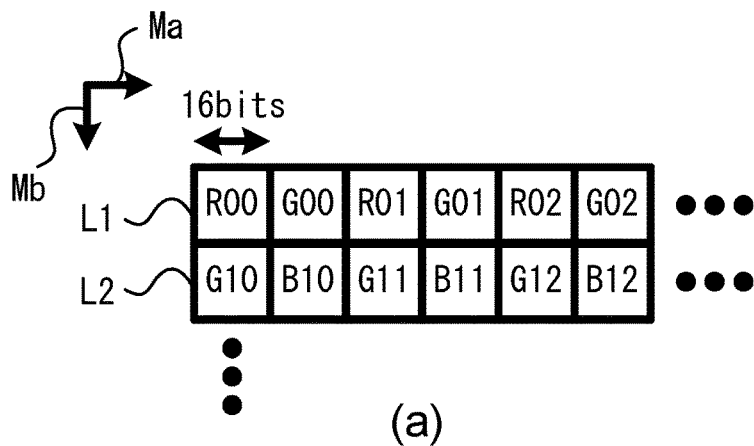
FIG. 18 is a view for illustrating an example of RAW data output using a transmission format for YUV data in a tenth variation.
Figure 18:
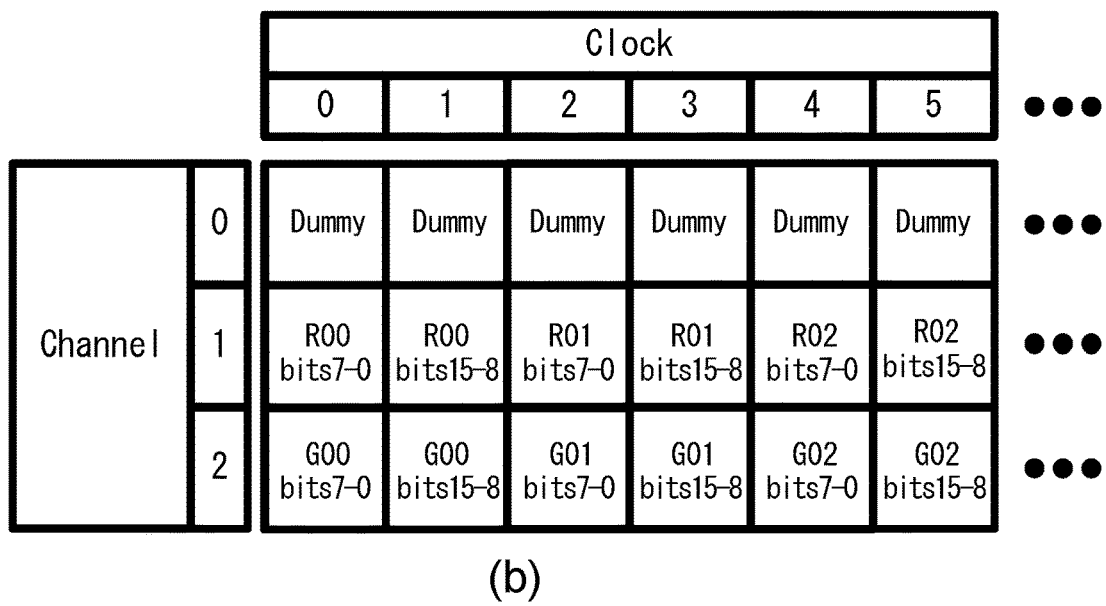
Figure 18:
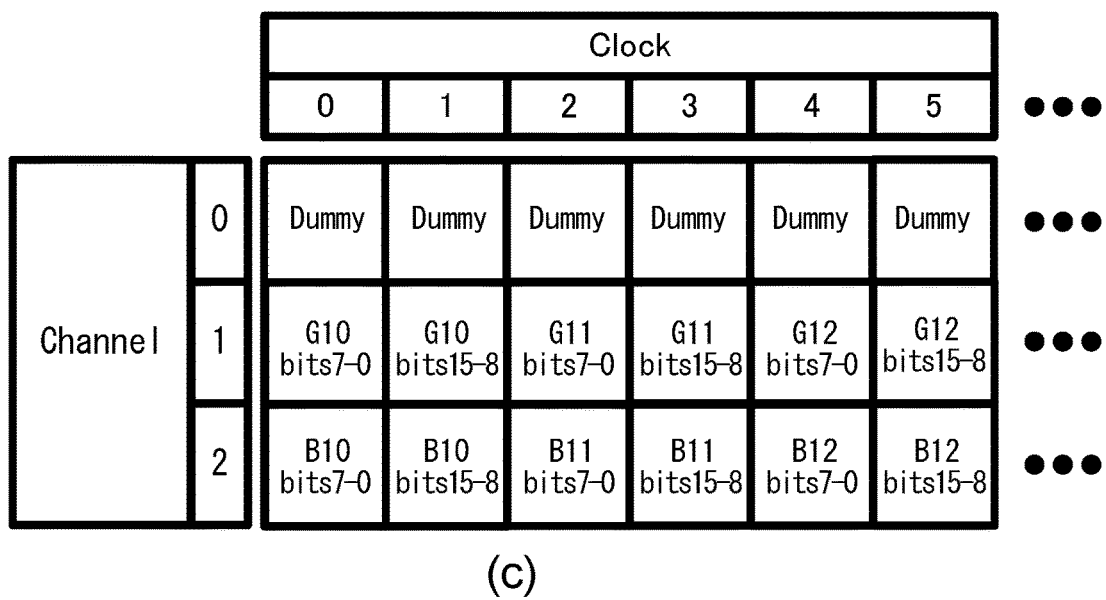

(10) FIG. 18 is a view for illustrating an example of a transmission format in a case where the RAW data 241 is output from an image-capturing device 20 in a tenth variation via the HDMI cable 30. FIG. 18(a) shows an example of an arrangement of R pixel data 4, G pixel data 5, and B pixel data 6 of the RAW data 241, each pixel data having 16 bits, in the data memory 24 in a planar format or a semi-planar format in a case where the RAW data 241 is stored instead of the YUV420 data configured of 16-bit components for transmission in the YUV420 format 48-bit mode. Note that an example of an arrangement of the D pixel data 7, which is dummy data, is omitted in the figure. As shown, in a row L1, pixel data of the 16-bit pixels R00, G00, R01, G01, R02, and G02 are arranged in sequence in the horizontal direction Ma. As shown, in a row L2 subsequent to the row L1, pixel data of the 16-bit pixels G10, B10, G11, B11, G12, and B12 are arranged in sequence in the horizontal direction Ma.

In FIGS. 18(b) and 18(c), a total of 24 bits of data can be contained in each clock section. As with the example of the YUV420 format 48-bit mode, 16 bits of data for a total of one pixel having 16 bits constituting the RAW data 241 are contained in a total of two fields each containing 8 bits, in two channels except for the transmission channel 0 during one clock section.

In the example shown in FIG. 18(b), bits 0 to 7 of the 16-bit pixel data of the pixel R00 arranged in the row L1 are contained in the channel 1 during the clock section 0 and bits 8 to 15 of the 16-bit pixel data of the pixel R00 are contained in the channel 1 during the clock section 1. Bits 0 to 7 of the 16-bit pixel data of the pixel G00 arranged in the row L1 are contained in the channel 2 during the clock section 0 and bits 8 to 15 of the 16-bit pixel data of the pixel G00 are contained in the channel 2 during the clock section 1. Pixel data of the pixels R01, G01, R02, and G02 arranged in the row L1 are also subjected to the same mapping processing as that for pixel data of the pixels R00 and G00.

In the example shown in FIG. 18(c), bits 0 to 7 of the 16-bit pixel data of the pixel G10 arranged in the row L2 are contained in the channel 1 during the clock section 0 and bits 8 to 15 of the 16-bit pixel data of the pixel G10 are contained in the channel 1 during the clock section 1. Bits 0 to 7 of the 16-bit pixel data of the pixel B10 arranged in the row L2 are contained in the channel 2 during the clock section 0 and bits 8 to 15 of the 16-bit pixel data of the pixel B10 are contained in the channel 2 during the clock section 1. Pixel data of the pixels G11, B11, G12, and B12 arranged in the row L2 are also subjected to the same mapping processing as that for pixel data of the pixels G10 and B10.

According to the tenth variation, positions of container boundaries between pixel data of the RAW data 241 are included in positions of container boundaries between pixel data of the development data 242 in the YUV420 format 48-bit mode. The image-capturing device 20 and the image recording device 40 can support the transmission process of the RAW data 241 as long as they support the transmission format for the development data 242.

Figure 19:
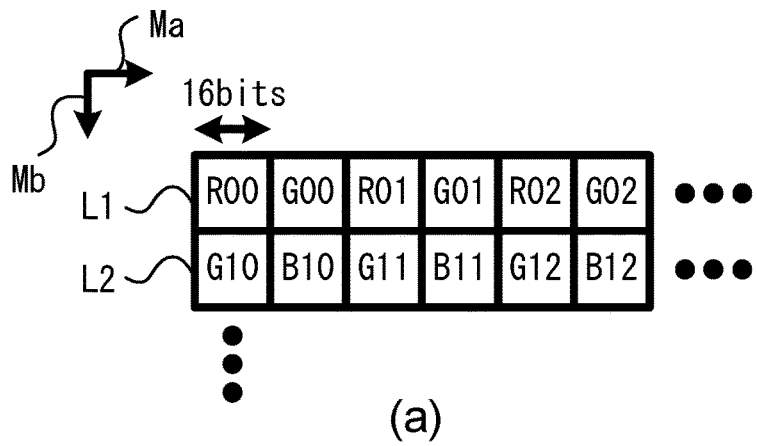
FIG. 19 is a view for illustrating an example of RAW data output using a transmission format for YUV data in an eleventh variation.
Figure 19:
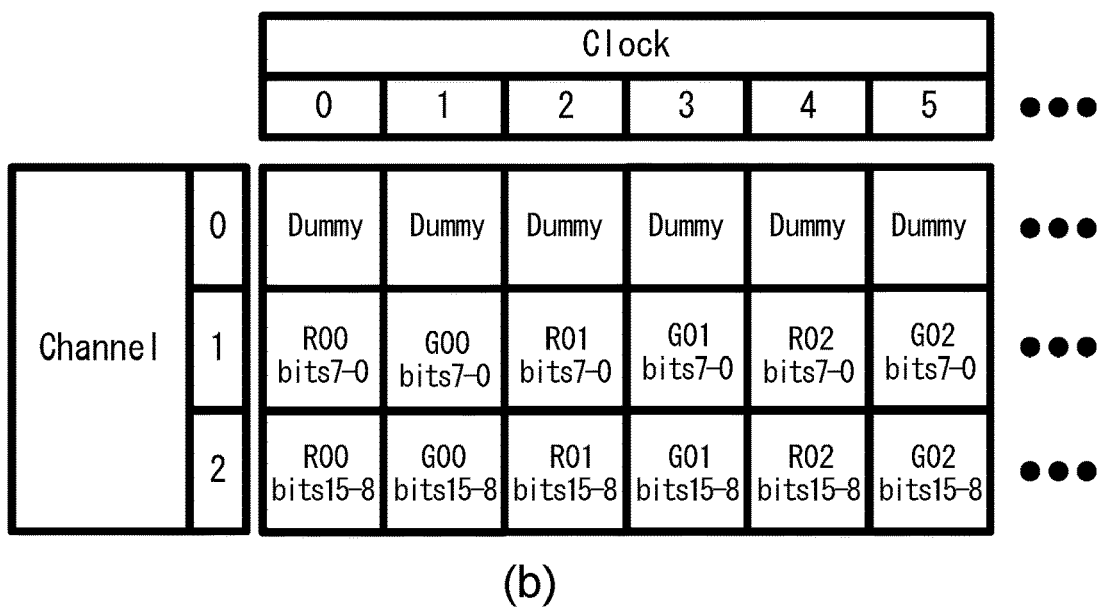
Figure 19:
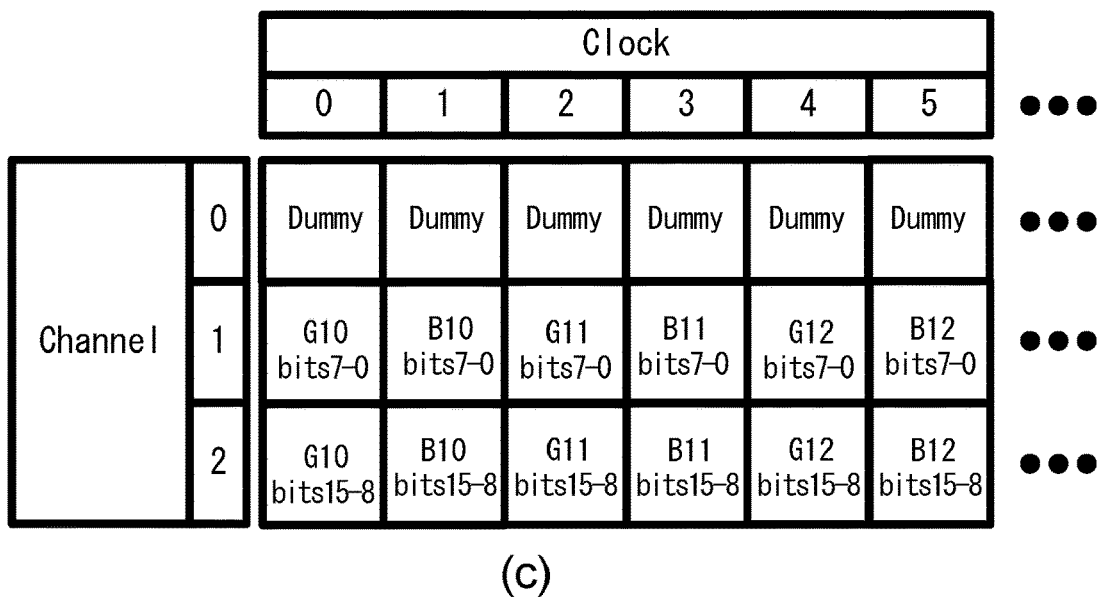

(11) FIG. 19 is a view for illustrating an example of a transmission format in a case where the RAW data 241 is output from an image-capturing device 20 in an eleventh variation via the HDMI cable 30. FIG. 19(a) shows an example of an arrangement of R pixel data 4, G pixel data 5, and B pixel data 6 of the RAW data 241, each pixel data having 16 bits, in the data memory 24 in a planar format or a semi-planar format in a case where the RAW data 241 is stored instead of the YUV420 data configured of 8-bit components for transmission in the YUV420 format 24-bit mode. Note that an example of an arrangement of the D pixel data 7, which is dummy data, is omitted in the figure. As shown, in a row L1, pixel data of the 16-bit pixels R00, G00, R01, G01, R02, and G02 are arranged in sequence in the horizontal direction Ma. Further, as shown, in a row L2 subsequent to the row L1, pixel data of the 16-bit pixels G10, B10, G11, B11, G12, and B12 are arranged in sequence in the horizontal direction Ma.

In FIGS. 19(b) and 19(c), a total of 24 bits of data can be contained in each clock section. As with the example of the YUV420 format 24-bit mode, 16 bits of data for a total of one pixel having 16 bits constituting the RAW data 241 are contained in a total of two fields each containing 8 bits, in two channels except for the transmission channel 0 during one clock section.

In the example shown in FIG. 19(b), bits 0 to 7 of the 16-bit pixel data of the pixel R00 arranged in the row L1 are contained in the channel 1 during the clock section 0 and bits 8 to 15 of the 16-bit pixel data of the pixel R00 are contained in the channel 2 during the clock section 0. Bits 0 to 7 of the 16-bit pixel data of the pixel G00 arranged in the row L1 are contained in the channel 1 during the clock section 1 and bits 8 to 15 of the 16-bit pixel data of the pixel G00 are contained in the channel 2 during the clock section 1. Pixel data of the pixels R01, G01, R02, and G02 arranged in the row L1 are also subjected to the same mapping processing as that for pixel data of the pixels R00 and G00.

In the example shown in FIG. 19(c), bits 0 to 7 of the 16-bit pixel data of the pixel G10 arranged in the row L2 are contained in the channel 1 during the clock section 0 and bits 8 to 15 of the 16-bit pixel data of the pixel G10 are contained in the channel 2 during the clock section 0. Bits 0 to 7 of the 16-bit pixel data of the pixel B10 arranged in the row L2 are contained in the channel 1 during the clock section 1 and bits 8 to 15 of the 16-bit pixel data of the pixel B10 are contained in the channel 2 during the clock section 1. Pixel data of the pixels G11, B11, G12, and B12 arranged in the row L2 are also subjected to the same mapping processing as that for pixel data of the pixels G10 and B10.

According to the eleventh variation, positions of container boundaries between pixel data of the RAW data 241 are included in positions of container boundaries between pixel data of the development data 242 in the YUV420 format 24-bit mode. The image-capturing device 20 and the image recording device 40 can support the transmission process of the RAW data 241 as long as they support the transmission format for the development data 242.

Figure 20:
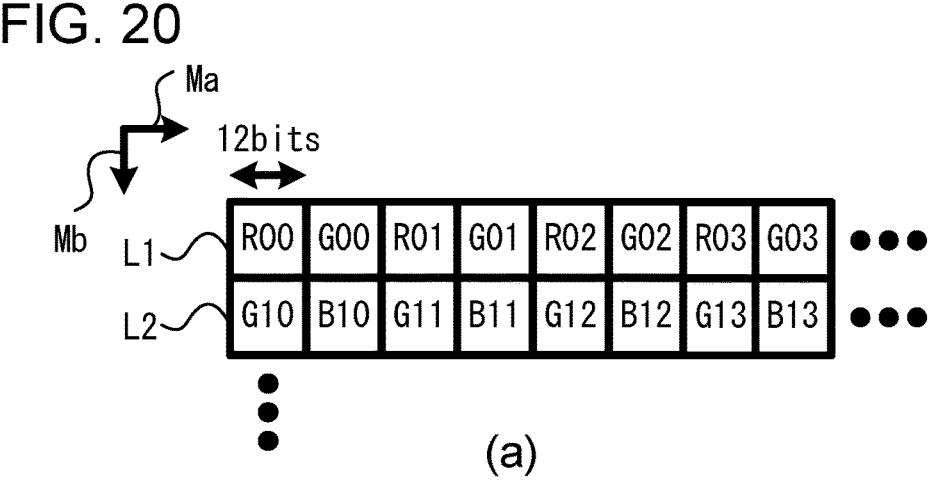
FIG. 20 is a view for illustrating an example of RAW data output using a transmission format for YUV data in a twelfth variation.
Figure 20:
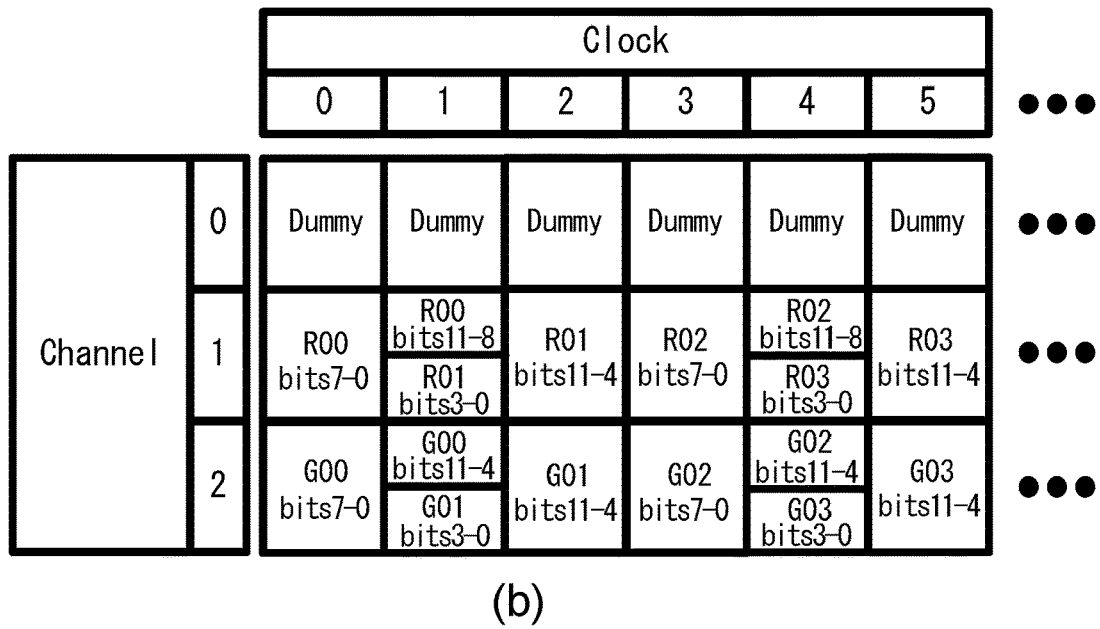
Figure 20:
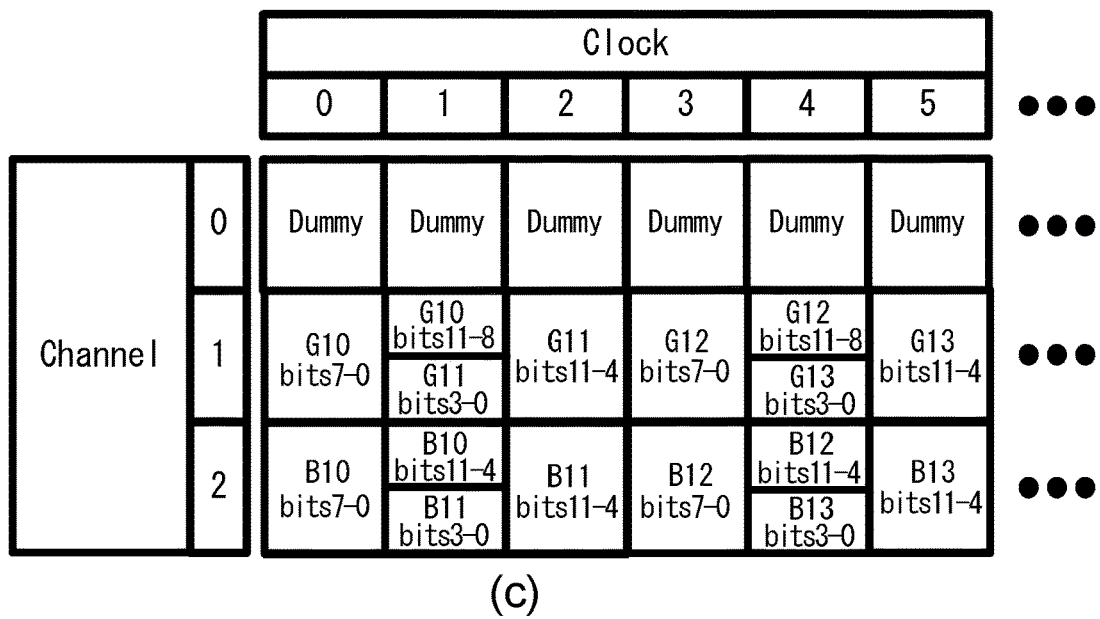

(12) FIG. 20 is a view for illustrating an example of a transmission format in a case where the RAW data 241 is output from an image-capturing device 20 in a twelfth variation via the HDMI cable 30. FIG. 20(a) shows an example of an arrangement of R pixel data 4, G pixel data 5, and B pixel data 6 of the RAW data 241, each pixel data having 12 bits, in the data memory 24 in a planar format or a semi-planar format in a case where the RAW data 241 is stored instead of the YUV420 data configured of 12-bit components for transmission in the YUV420 format 36-bit mode. Note that an example of an arrangement of the D pixel data 7, which is dummy data, is omitted in the figure. As shown, in a row L1, pixel data of the 12-bit pixels R00, G00, R01, G01, R02, G02, R03, and G03 are arranged in sequence in the horizontal direction Ma. As shown, in a row L2 subsequent to the row L1, pixel data of the 12-bit pixels G10, B10, G11, B11, G12, B12, G13, and B13 are arranged in sequence in the horizontal direction Ma.

In FIGS. 20(b) and 20(c), a total of 24 bits of data can be contained in each clock section. As with the example of the YUV420 format 36-bit mode, 48 bits of data for a total of four pixels each having 12 bits constituting the RAW data 241 are contained in a total of six fields in two channels each containing 8 bits except for the transmission channel 0 in each of successive three clock sections.

In the example shown in FIG. 20(b), bits 0 to 7 of the 12-bit pixel data of the pixel R00 arranged in the row L1 are contained in the channel 1 during the clock section 0 and bits 8 to 11 of the 12-bit pixel data of the pixel R00 are contained in the channel 1 during the clock section 1. Bits 0 to 7 of the 12-bit pixel data of the pixel G00 arranged in the row L1 are contained in the channel 2 during the clock section 0 and bits 8 to 11 of the 12-bit pixel data of the pixel G00 are contained in the channel 2 during the clock section 1.

Bits 0 to 3 of the 12-bit pixel data of the pixel R01 arranged in the row L1 are contained in the channel 1 during the clock section 1 and bits 4 to 11 of the 12-bit pixel data of the pixel R01 are contained in the channel 1 during the clock section 2. Bits 0 to 3 of the 12-bit pixel data of the pixel G01 arranged in the row L1 are contained in the channel 2 during the clock section 1 and bits 4 to 11 of the 12-bit pixel data of the pixel G01 are contained in the channel 2 during the clock section 2. Pixel data of the pixels R02, G02, R03, and G03 arranged in the row L1 are also subjected to the same mapping processing as that for pixel data of the pixels R00, G00, R01, and G01.

In the example shown in FIG. 20(c), bits 0 to 7 of the 12-bit pixel data of the pixel G10 arranged in the row L2 are contained in the channel 1 during the clock section 0 and bits 8 to 11 of the 12-bit pixel data of the pixel G10 are contained in the channel 1 during the clock section 1. Bits 0 to 7 of the 12-bit pixel data of the pixel B10 arranged in the row L2 are contained in the channel 2 during the clock section 0 and bits 8 to 11 of the 12-bit pixel data of the pixel B10 are contained in the channel 2 during the clock section 1.

Bits 0 to 3 of the 12-bit pixel data of the pixel G11 arranged in the row L2 are contained in the channel 1 during the clock section 1 and bits 4 to 11 of the 12-bit pixel data of the pixel G11 are contained in the channel 1 during the clock section 2. Bits 0 to 3 of the 12-bit pixel data of the pixel B11 arranged in the row L2 are contained in the channel 2 during the clock section 1 and bits 4 to 11 of the 12-bit pixel data of the pixel B11 are contained in the channel 2 during the clock section 2. Bits 0 to 3 of the 12-bit pixel data of the pixel B11 arranged in the row L2 are contained in the channel 2 during the clock section 1 and bits 4 to 11 of the 12-bit pixel data of the pixel B11 are contained in the channel 2 during the clock section 2. Pixel data of the pixels G12, B12, G13, and B13 arranged in the row L2 are also subjected to the same mapping processing as that for pixel data of the pixels G10, B10, G11, and B11.

According to the twelfth variation, positions of container boundaries between pixel data of the RAW data 241 are included in positions of container boundaries between pixel data of the development data 242 in the YUV420 format 36-bit mode. The image-capturing device 20 and the image recording device 40 can support the transmission process of the RAW data 241 as long as they support the transmission format for the development data 242.

Figure 21:
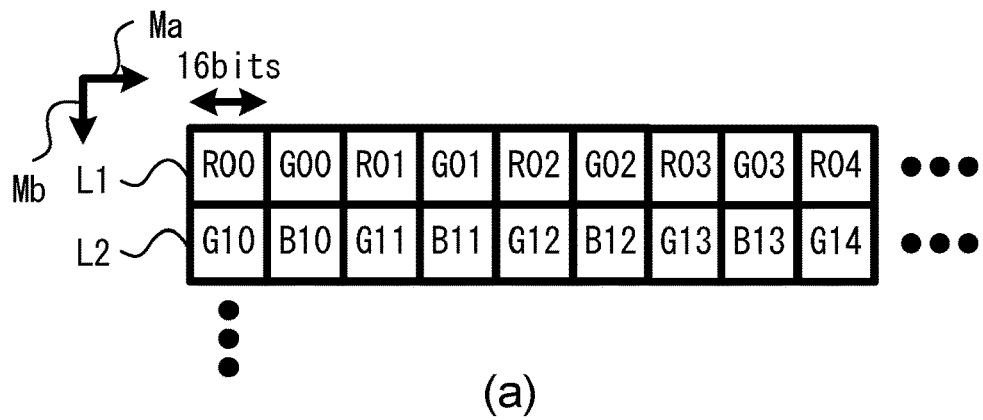
FIG. 21 is a view for illustrating an example of RAW data output using a transmission format for YUV data in a thirteenth variation.
Figure 21:
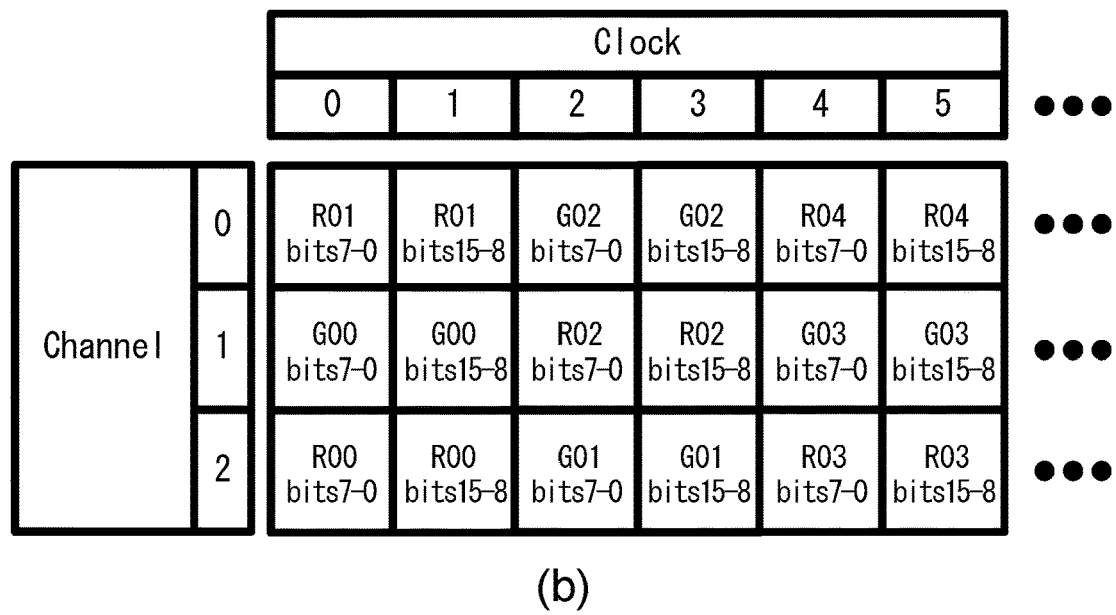
Figure 21:
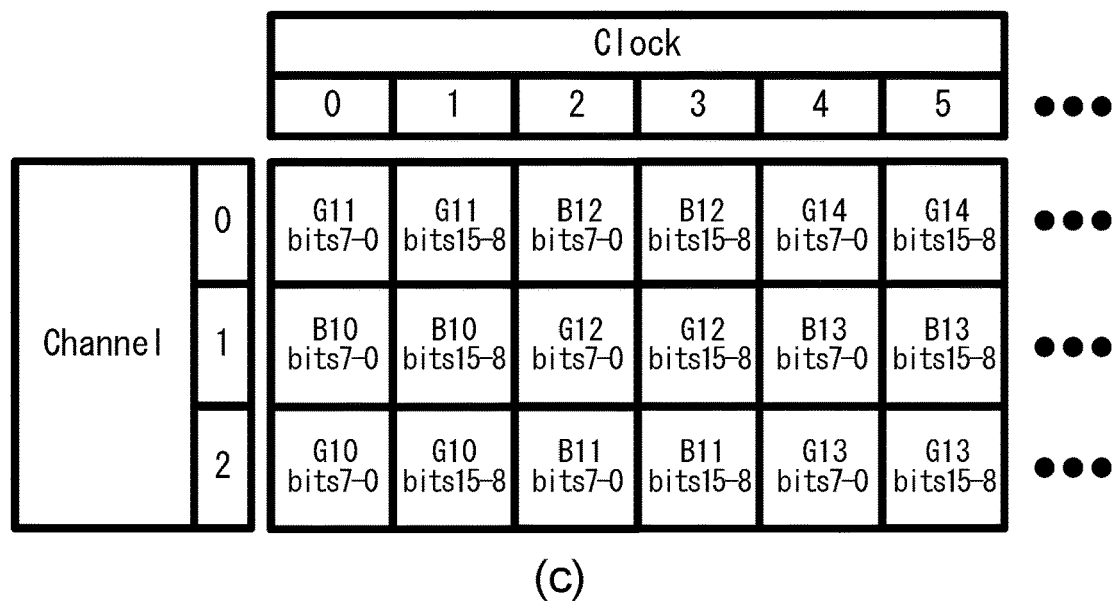
Figure 22:
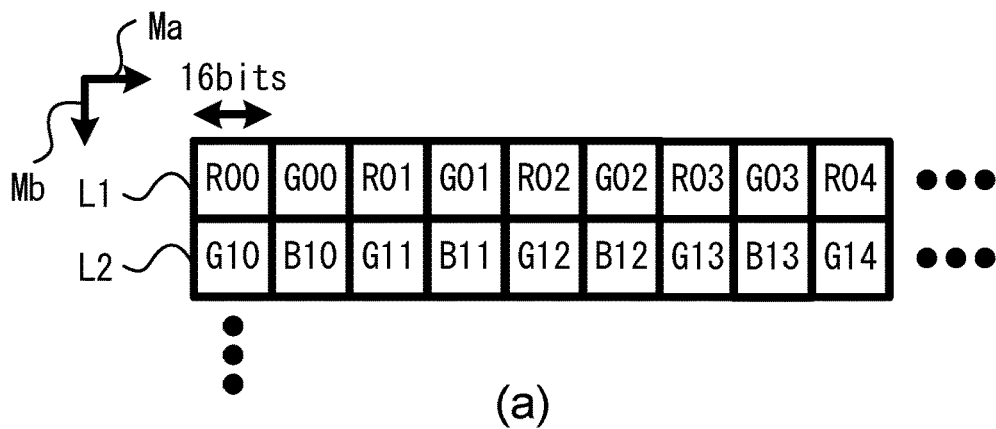
FIG. 22 is a view for illustrating an example of RAW data output using a transmission format for YUV data in a thirteenth variation.
Figure 22:
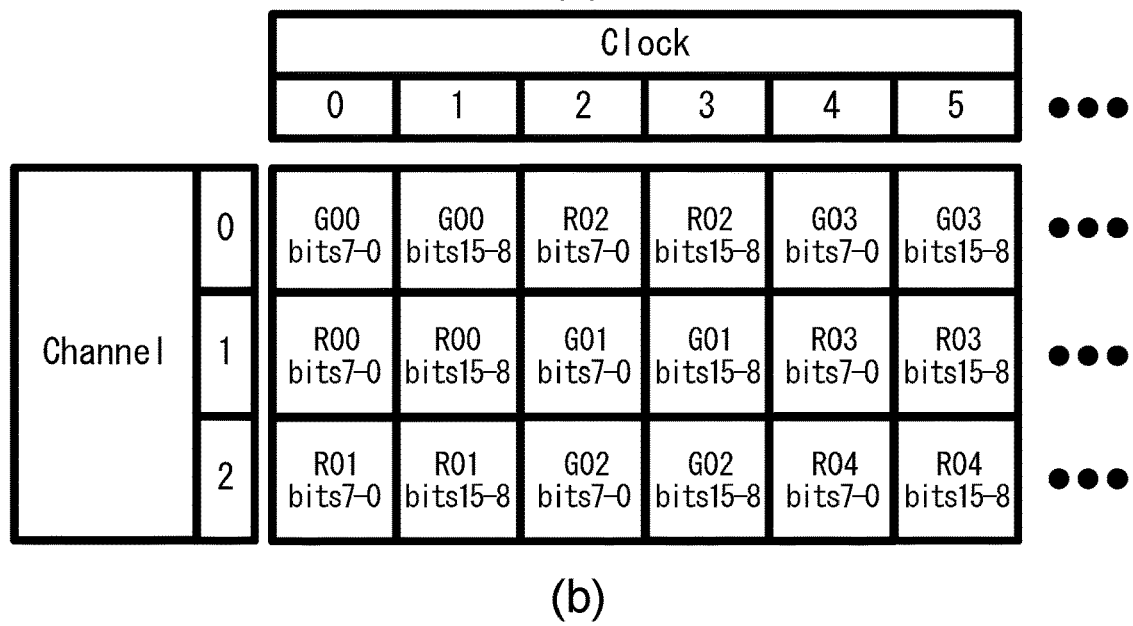
Figure 22:
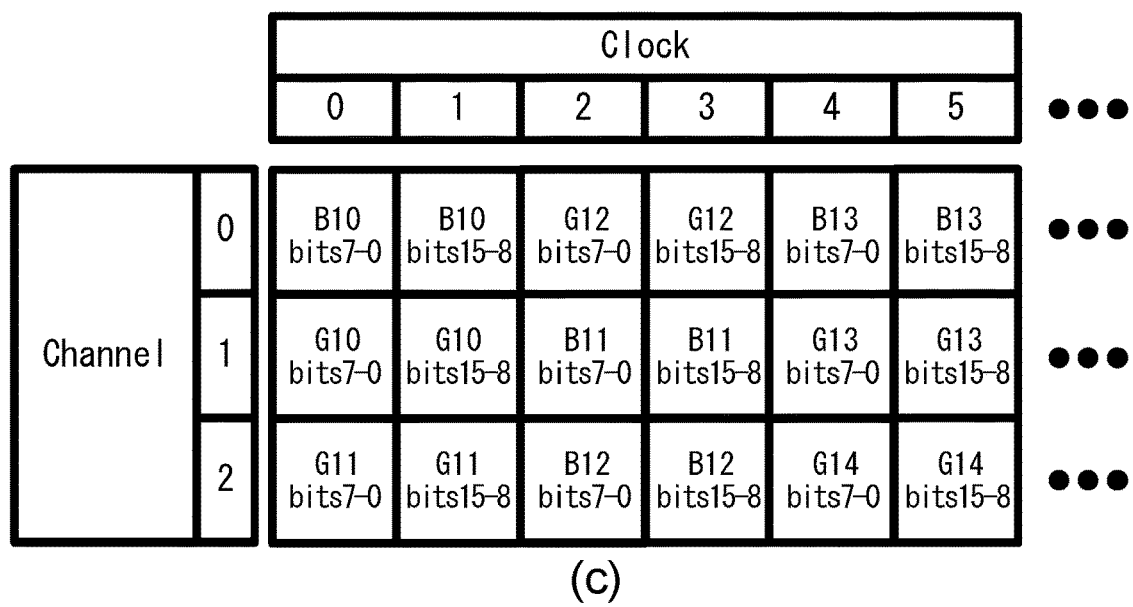

(13) In the above-described embodiments and variations, three transmission channels 0 to 2 are provided in each clock section of the transmission format when the RAW data 241 is output from the image-capturing device 20 via the HDMI cable 30, and a field assigned to each channel can contain 8 bits of data. In the above-described embodiments and variations, when a total of 24 bits of data are contained in the three channels 0 to 2 in each clock section, channels 0, 1, and 2 are used in this order. However, the order of the transmission channels is not limited thereto. The order may be channels 2, 1, and 0 or channels 1, 0, and 2, for example. With reference to the first embodiment as an example, as shown in FIG. 7, when a total of 24 bits of data are contained in the three channels 0 to 2 in each clock section, the channels 0, 1, and 2 are used in this order. However, the order may be channels 2, 1, and 0 as shown in FIG. 21 or channels 1, 0, and 2 as shown in FIG. 22. The same applies to the second embodiment and other variations.

(14) In the above-described embodiments and variations, the transmission format of the RAW data 241 corresponds to a transmission format of the YUV data such as the YUV444 format 48-bit mode or the YUV422 format 24-bit mode. However, it is not necessary for the transmission format of the RAW data 241 to correspond to the transmission format of the YUV data. The transmission format of the RAW data 241 may correspond to the transmission format of the RGB data. Alternatively, the transmission format of the RAW data 241 may be such that the RAW data 241 is freely contained in the three channels 0 to 2 in each clock section or a plurality of clock sections. In this case, sizes of the R pixel data 4, the G pixel data 5, and the B pixel data 6 constituting the RAW data 241 may be sizes, for example 14 bits, other than 16 bits and 12 bits used in the above-described embodiments and variations.

(15) In the above-described embodiments and variations, the connecting member that connects the image-capturing device 20 to the image recording device 40 is the HDMI cable 30. Therefore, the transmission format of the RAW data 241 is the HDMI transmission format. However, the connecting member that connects the image-capturing device 20 to the image recording device 40 may be an SDI cable. In this case, the transmission format of the RAW data 241 may be a SDI transmission format.

Although various embodiments and variations have been described above, the present invention is not limited thereto. Other aspects conceivable within the scope of the technical idea of the present invention are also included within the scope of the present invention.

The disclosure of the following priority application is herein incorporated by reference: Japanese Patent Application No. 2018-74272 (filed on Apr. 6, 2018)

REFERENCE SIGNS LIST

1 . . . Y pixel data, 2 . . . U pixel data, 3 . . . V pixel data, 4 . . . R pixel data, 5 . . . G pixel data, 6 . . . B pixel data, 7 . . . D pixel data, 10 . . . image transmission recording system, 11 . . . image transmission recording system, 20 . . . image-capturing device, 21 . . . image-capturing device control unit, 22 . . . image sensor, 23 . . . sensor data input circuit, 24 . . . data memory, 25 . . . development processing unit, 26 . . . output control unit, 27 . . . display unit, 30 . . . HDMI cable, 40 . . . image recording device, 41 . . . image recording device control unit, 42 . . . external input control unit, 43 . . . image processing unit, 44 . . . storage device, 45 . . . display output control unit, 46 . . . display unit, 241 . . . RAW data, 242 . . . development data, 261 . . . display output control unit, 262 . . . external output control unit

The invention claimed is:

1. An image-capturing device, comprising:
an image sensor that captures an image of a subject to output an image-capturing signal;
a development processing unit that generates development data based on the image-capturing signal; and
an output control unit that outputs the development data to an external device in a predetermined transmission format via a connecting member that connects the image-capturing device to the external device, wherein:
the output control unit outputs the image-capturing signal to the external device via the connecting member in the predetermined transmission format, and
the output control unit arranges:
a first pixel data in at least one field on the predetermined transmission format for outputting the development data; and
a second pixel data in the at least one field corresponding to a position of the first pixel data in the development data for outputting the image-capturing signal.

2. The image-capturing device according to claim 1, wherein:
a pixel data a container position in a case where the image-capturing signal is output using the predetermined transmission format is included in pixel data container positions of the development data in a case where the development data is output using the predetermined transmission format.

3. An image transmission recording system, comprising:
the image-capturing device according to claim 1; and
an image recording device, wherein:
the image recording device is the external device connected to the image-capturing device via the connection member and records the development data and the image-capturing signal output from the image-capturing device.

4. The image-capturing device according to claim 1, wherein:
a plurality of channels are provided on the predetermined transmission format;
the at least one field includes a plurality of fields respectively assigned to different channels among the plurality of channels; and
the output control unit arranges the second pixel data to be divided in the plurality of fields.

5. The image-capturing device according to claim 1, wherein:
the output control unit arranges:
a third pixel data in another field different from any of the plurality of fields on the predetermined transmission format for outputting the development data; and
a fourth pixel data in the another field corresponding to a position of the third pixel data in the development data for outputting the image-capturing signal.

6. The image-capturing device according to claim 5, wherein:
the output control unit arranges dummy data in the another field as the fourth pixel data.

* * * * *